(12) United States Patent
Uhm et al.

(10) Patent No.: US 12,476,078 B2
(45) Date of Patent: Nov. 18, 2025

(54) PLASMA GENERATION DEVICE AND CONTROL METHOD THEREFOR

(71) Applicant: EN2CORE TECHNOLOGY INC., Daejeon (KR)

(72) Inventors: Sae Hoon Uhm, Hwaseong (KR); Yun Seong Lee, Daejeon (KR); Yeong Hoon Sohn, Daejeon (KR); Se Hong Park, Daejeon (KR)

(73) Assignee: EN2CORE TECHNOLOGY INC., Daejeon (KR)

( * ) Notice: Subject to any disclaimer, the term of this patent is extended or adjusted under 35 U.S.C. 154(b) by 397 days.

(21) Appl. No.: 17/997,420

(22) PCT Filed: Jun. 29, 2021

(86) PCT No.: PCT/KR2021/008137
§ 371 (c)(1),
(2) Date: Oct. 28, 2022

(87) PCT Pub. No.: WO2022/005150
PCT Pub. Date: Jan. 6, 2022

(65) Prior Publication Data
US 2023/0170185 A1    Jun. 1, 2023

(30) Foreign Application Priority Data
Jun. 30, 2020   (KR) .................. 10-2020-0080596

(51) Int. Cl.
*H01J 37/32*   (2006.01)

(52) U.S. Cl.
CPC ..... *H01J 37/3211* (2013.01); *H01J 37/32183* (2013.01); *H01J 37/3244* (2013.01); *H01J 2237/334* (2013.01)

(58) Field of Classification Search
None
See application file for complete search history.

(56) References Cited

U.S. PATENT DOCUMENTS

| 6,447,636 B1 | 9/2002 | Qian et al. |
| 10,056,232 B2 | 8/2018 | Oba et al. |

(Continued)

FOREIGN PATENT DOCUMENTS

| CN | 102256430 A | 11/2011 |
| CN | 111312574 A | 6/2020 |

(Continued)

OTHER PUBLICATIONS

International Search Report and Written Opinion for PCT/KR2021/008137, dated Oct. 25, 2021, 7 pages.

(Continued)

*Primary Examiner* — Kenneth B Wells
(74) *Attorney, Agent, or Firm* — Perkins Coie LLP

(57) ABSTRACT

According to one embodiment of the present specification, there can be provided an apparatus for generating plasma, comprising: a chamber configured to provide a generating space for the plasma; an antenna module placed adjacent to the chamber and configured to be connected to a first power source and generate induced electric field in the chamber; an electrode placed adjacent to the chamber and configured to be connected to a second power source and assist in a generation of the plasma; a sensor configured to obtain sensing information related to a status of the plasma; and a controller configured to control the first power source and the second power source.

16 Claims, 35 Drawing Sheets

(56) References Cited

U.S. PATENT DOCUMENTS

| | | | |
|---|---|---|---|
| 10,109,459 B1 | 10/2018 | Rhee et al. | |
| 2011/0198511 A1 | 8/2011 | Graupera et al. | |
| 2012/0032092 A1 | 2/2012 | Graupera et al. | |
| 2013/0213573 A1 | 8/2013 | Valcore et al. | |
| 2016/0056017 A1* | 2/2016 | Kim | H01J 37/321 |
| | | | 156/345.28 |
| 2017/0047200 A1* | 2/2017 | Lee | H01J 37/32532 |
| 2018/0114675 A1 | 4/2018 | Lee et al. | |
| 2019/0103253 A1 | 4/2019 | Lill et al. | |
| 2021/0375602 A1* | 12/2021 | Sasagawa | H01L 21/6831 |

FOREIGN PATENT DOCUMENTS

| | | |
|---|---|---|
| EP | 2362410 A2 | 8/2011 |
| EP | 3537471 A1 | 9/2019 |
| JP | 2004158247 A | 6/2004 |
| JP | 2011204672 A | 10/2011 |
| JP | 2013191554 A | 9/2013 |
| JP | 2017174730 A | 9/2017 |
| JP | 6401839 B1 | 9/2018 |
| KR | 20100098097 A | 9/2010 |
| KR | 10-1812743 B1 | 1/2018 |
| KR | 10-1826883 B1 | 2/2018 |
| KR | 10-2019-0000625 A | 8/2019 |
| KR | 10-2019-0085635 A | 9/2019 |
| KR | 10-2017-0028289 A | 7/2021 |
| TW | 201833975 A | 9/2018 |
| TW | 201907440 A | 2/2019 |
| TW | 201933420 A | 8/2019 |
| WO | 2018209085 A1 | 11/2018 |
| WO | 2019055193 A | 3/2019 |

OTHER PUBLICATIONS

Notice of Allowance of JP Patent Application No. 2022-570386 issued on Sep. 17, 2024, 5 pages.

Office Action of CN Patent Application No. 202180043709.8 issued on Oct. 19, 2024, 25 pages.

Extended European Search Report from European Patent Application No. 21834603.9 dated Apr. 26, 2024.

2nd Office Action of CN Patent Application No. 202180043709.8 issued on Apr. 17, 2025.

Office Action of TW Patent Application No. 110123798 dated Apr. 10, 2025.

* cited by examiner (a)

(b)

(a)

(b)

(a)

(b)

(a)

(b)

(a)

(b)

(a)

(b)

PLASMA GENERATION DEVICE AND CONTROL METHOD THEREFOR

CROSS-REFERENCE TO RELATED APPLICATION

This present application is a 371 of International Application No. PCT/KR2021/008137, filed Jun. 29, 2021 which claims Paris Convention priority of Korean Patent Application No. 10-2020-0080596, filed Jun. 30, 2020 the entire content of which is incorporated herein by reference.

TECHNICAL FIELD

The present disclosure relates to a device for generating plasma and a method of controlling the device. More particularly, the present disclosure relates to a device for generating plasma and a method of controlling the device, the device and the method assisting initial discharge of plasma.

BACKGROUND ART

Plasma discharge is used in many industrial application fields and scientific application fields, and through plasma discharge, active species of various gases used in various industrial fields, such as semiconductor wafer processing, are generated or processing of by-products produced in industrial processes is achieved.

A plasma source for performing plasma discharge largely uses an inductively coupled plasma method or a capacitively coupled plasma method. The inductively coupled plasma method is a method of forming an induced electric field by applying RF power to a coil and of performing plasma discharge through the induced electric field.

Methods used for initial discharge (ignition) of plasma include using an ignitor or inputting more power. However, there is a problem in that a device is damaged because of ignition assistance methods not considering an occurrence state of plasma and impurities are introduced to generated active species. Therefore, it is required to develop a method of assisting initial discharge of plasma while minimizing damage to a device and production of impurities.

The foregoing is intended merely to aid in the understanding of the background of the present disclosure, and is not intended to mean that the present disclosure falls within the purview of the related art that is already known to those skilled in the art.

DISCLOSURE

Technical Problem

The present disclosure is directed to providing a device for generating plasma or a method of controlling the device, the device and the method assisting initial discharge of plasma.

In addition, the present disclosure is directed to providing a device for generating plasma or a method of controlling the device, the device and the method minimizing damage to the device due to initial discharge of plasma.

Technical problems to be solved by the present disclosure are not limited to the aforementioned technical problems and other technical problems which are not mentioned will be clearly understood by those skilled in the art from the present disclosure and the accompanying drawings.

Technical Solution

According to one embodiment of the present specification, there can be provided an apparatus for generating plasma, comprising: a chamber configured to provide a generating space for the plasma; an antenna module placed adjacent to the chamber and configured to be connected to a first power source and generate induced electric field in the chamber; an electrode placed adjacent to the chamber and configured to be connected to a second power source and assist in a generation of the plasma; a sensor configured to obtain sensing information related to a status of the plasma; and a controller configured to control the first power source and the second power source, wherein the controller is further configured to: apply an RF voltage to a load including the antenna module via the first power source from a first time point, obtain the sensing information related to the status of the plasma according to the applying the RF voltage, control the second power source based on the sensing information from a second time point when is after a predetermined time from the first time point, wherein the controller, when the sensing information of the second time point does not satisfy a predetermined condition, is further configured to apply a pulsed voltage to the electrode via the second power source, and the controller, when the sensing information of the second time point satisfies the predetermined condition, is further configured not to apply the pulsed voltage to the electrode via the second power source.

According to one embodiment of the present specification, there can be provided a method of controlling a plasma generating apparatus, wherein the plasma generating apparatus comprises a chamber providing a generating space for plasma, an antenna module placed adjacent to the chamber and configured to be connected to a first power source and generate induced electric field in the chamber, an electrode placed adjacent to the chamber and configured to be connected to a second power source and assist in a generation of the plasma, a sensor configured to obtain sensing information related to a status of the plasma, and a controller configured to control the first power source and the second power source, the method comprising: applying, by the controller, an RF voltage to a load comprising the antenna module via the first power source from a first time point; obtaining, by the controller, the sensing information related to the status of the plasma according to applying the RF voltage; and controlling, by the controller, the second power source based on the sensing information from a second time point when is after a predetermined time from the first time point, wherein the controlling, by the controller, the second power source comprises: not applying a pulsed voltage to the electrode via the second power source when the sensing information of the second time point satisfies a predetermined condition; and applying the pulsed voltage to the electrode via the second power source when the sensing information of the second time point does not satisfy the predetermined condition.

Technical solutions to the problems according to the present specification may not be limited to the solutions described above, and other technical solutions which are not described herein should be clearly understood by those skilled in the art, to which the present invention belongs, from the present specification and the accompanying drawings.

Advantageous Effects

According to the present disclosure, a device for generating plasma with initial discharge of plasma achieved rapidly can be provided.

According to the present disclosure, a device for generating plasma with inhibited production of impurities due to assistance with initial discharge of plasma can be provided.

Effects of the present disclosure are not limited to the aforementioned effects, and other effects which are not described herein should be clearly understood by those skilled in the art from the disclosure and the accompanying drawings.

BEST MODE FOR INVENTION

Figure 1:
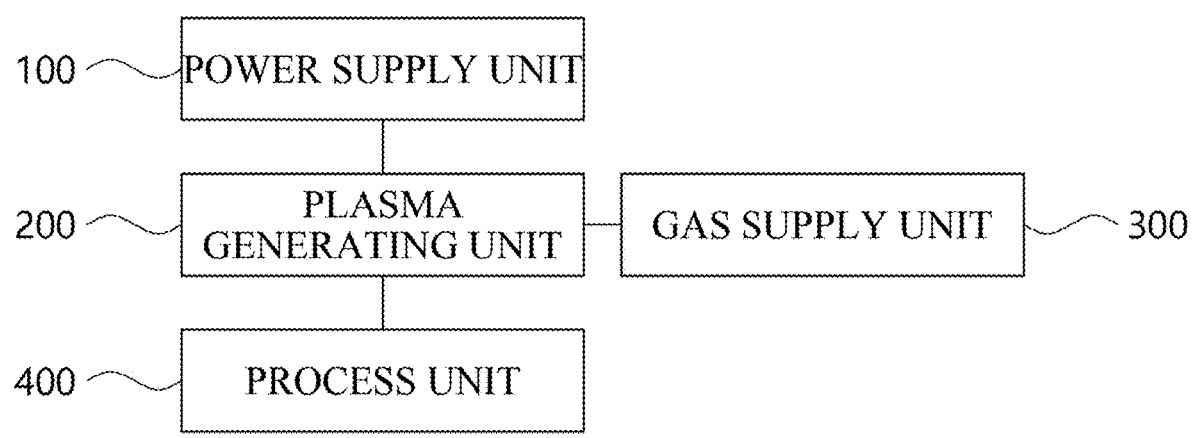
FIG. 1 is a diagram illustrating a plasma generation system according to an embodiment of the present disclosure.

According to one embodiment of the present specification, there can be provided an apparatus for generating plasma, comprising: a chamber configured to provide a generating space for the plasma; an antenna module placed adjacent to the chamber and configured to be connected to a first power source and generate induced electric field in the chamber; an electrode placed adjacent to the chamber and configured to be connected to a second power source and assist in a generation of the plasma; a sensor configured to obtain sensing information related to a status of the plasma; and a controller configured to control the first power source and the second power source, wherein the controller is further configured to: apply an RF voltage to a load including the antenna module via the first power source from a first time point, obtain the sensing information related to the status of the plasma according to the applying the RF voltage, control the second power source based on the sensing information from a second time point when is after a predetermined time from the first time point, wherein the controller, when the sensing information of the second time point does not satisfy a predetermined condition, is further configured to apply a pulsed voltage to the electrode via the second power source, and the controller, when the sensing information of the second time point satisfies the predetermined condition, is further configured not to apply the pulsed voltage to the electrode via the second power source.

According to one embodiment of the present specification, according to the predetermined condition, the controller may be configured to apply the pulsed voltage to the electrode via the second power source when the sensing information indicates that the plasma is not generated in the chamber, and not to apply the pulsed voltage to the electrode when the sensing information indicates that the plasma is generated in the chamber.

According to one embodiment of the present specification, the sensing information obtained by the sensor may indicate a power supplied to the load via the first power source.

According to one embodiment of the present specification, the controller, when the sensing information of the second time point indicates that a power supplied to the load is less than a reference power, may be configured to apply the pulsed voltage to the electrode, and the controller, when the sensing information of the second time point indicates that a power supplied to the load is more than or equal to the reference power, is configured not to apply the pulsed voltage to the electrode.

According to one embodiment of the present specification, the first power source may comprise a DC power source and an inverter configured to convert a DC power from the DC power source into a RF power, wherein the sensor is placed between the DC power source and the inverter and configured to obtain a first voltage output from the DC power source and a first current output from the DC power source, and wherein the controller is configured to apply the pulsed voltage to the electrode based on a power supplied to the load which is determined based on the first voltage and the first current.

According to one embodiment of the present specification, the sensor may be configured to obtain the sensing information based on a second current which flows through the antenna module.

According to one embodiment of the present specification, when a phase difference between the second current and the RF voltage at the second time point does not satisfy the predetermined condition, may be configured to apply the pulsed voltage to the electrode, and the controller, when a phase difference between the second current and the RF voltage at the second time point at the second time point satisfies the predetermined condition, may be configured not to apply the pulsed voltage to the electrode.

According to one embodiment of the present specification, when the sensing information does not satisfy the predetermined condition at the second time point, may be configured to apply a first pulsed voltage to the electrode via the second power source such that the electrode provides a first power, and the controller, when the sensing information does not satisfy the predetermined condition at a third time point after the second time point, may be configured to apply a second pulsed voltage to the electrode such that the electrode provides a second power larger than the first power.

According to one embodiment of the present specification, the controller, when the sensing information does not satisfy the predetermined condition at the second time point, may be configured to apply a first pulsed voltage having a first voltage value to the electrode via the second power source, and the controller, when the sensing information does not satisfy the predetermined condition at a third time point after the second time point, may be configured to apply a second pulsed voltage having a second voltage value which is larger than the first voltage value to the electrode via the second power source.

According to one embodiment of the present specification, the controller, when the sensing information does not satisfy the predetermined condition at the second time point, may be configured to apply the pulsed voltage to the electrode in a first period and the controller, when the sensing information does not satisfy the predetermined condition at a third time point when is after a first time from the second time point, may be configured to apply the pulsed voltage in a second period which is shorter than the first period.

According to one embodiment of the present specification, the controller may be configured to apply an RF voltage having a first magnitude to the load via the first power source from the first time point, and to apply an RF voltage having a second magnitude lager than the first magnitude to the load when the sensing information does not satisfy the predetermined condition at a third time point when is after the first time point and before the second time point.

According to one embodiment of the present specification, the controller, when the sensing information does not satisfy the predetermined condition at the second time point, may be configured to apply the pulsed voltage of first voltage value to the electrode via the second power source, and the controller, when the sensing information satisfied the predetermined condition at a third time point after the second time point, may be configured to stop applying the pulsed voltage.

According to one embodiment of the present specification, there can be provided a method of controlling a plasma generating apparatus, wherein the plasma generating apparatus comprises a chamber providing a generating space for plasma, an antenna module placed adjacent to the chamber and configured to be connected to a first power source and generate induced electric field in the chamber, an electrode placed adjacent to the chamber and configured to be connected to a second power source and assist in a generation of the plasma, a sensor configured to obtain sensing information related to a status of the plasma, and a controller configured to control the first power source and the second power source, the method comprising: applying, by the controller, an RF voltage to a load comprising the antenna module via the first power source from a first time point; obtaining, by the controller, the sensing information related to the status of the plasma according to applying the RF voltage; and controlling, by the controller, the second power source based on the sensing information from a second time point when is after a predetermined time from the first time point, wherein the controlling, by the controller, the second power source comprises: not applying a pulsed voltage to the electrode via the second power source when the sensing information of the second time point satisfies a predetermined condition; and applying the pulsed voltage to the electrode via the second power source when the sensing information of the second time point does not satisfy the predetermined condition.

According to one embodiment of the present specification, the controlling, by the controller, the second power source may comprise: applying the pulsed voltage to the electrode via the second power source when the sensing information indicates that the plasma is not generated in the chamber; and not applying the pulsed voltage to the electrode when the sensing information indicates that the plasma is generated in the chamber.

According to one embodiment of the present specification, the sensing information obtained by the sensor may indicate a power supplied to the load via the first power source.

According to one embodiment of the present specification, the controlling, by the controller, the second power source may comprise: applying the pulsed voltage to the electrode when the sensing information of the second time point indicates that a power supplied to the load is less than to a reference power, and not applying the pulsed voltage to the electrode when the sensing information of the second time point indicates that a power supplied to the load is more than or equal to the reference power.

According to one embodiment of the present specification, the first power source may comprise a DC power source and an inverter configured to convert a DC power from the DC power source into a RF power, wherein the sensor is placed between the DC power source and the inverter and configured to obtain a first voltage output from the DC power source and a first current output from the DC power source, and wherein the controlling, by the controller, the second power source comprises controlling the second power source based on a power supplied to the load which is determined based on the first voltage and the first current.

According to one embodiment of the present specification, the sensor may be configured to obtain the sensing information based on a second current which flows through the antenna module.

According to one embodiment of the present specification, the controlling, by the controller, the second power source may comprise: applying the pulsed voltage to the electrode when a phase difference between the second current and the RF voltage at the second time point does not satisfy the predetermined condition, and not applying the pulsed voltage to the electrode when a phase difference between the second current and the RF voltage at the second time point at the second time point satisfies the predetermined condition.

According to one embodiment of the present specification, the controlling, by the controller, the second power source may comprise: applying a first pulsed voltage to the electrode via the second power source such that the electrode provides a first power when the sensing information does not satisfy the predetermined condition at the second time point, and applying a second pulsed voltage to the electrode such that the electrode provides a second power larger than the first power when the sensing information does not satisfy the predetermined condition at a third time point after the second time point.

According to one embodiment of the present specification, the controlling, by the controller, the second power source may comprise: applying a first pulsed voltage of a first voltage value to the electrode via the second power source when the sensing information does not satisfy the predetermined condition at the second time point or not applying the first pulsed voltage to the electrode when the sensing information satisfies the predetermined condition; and applying a second pulsed voltage of a second voltage value which is larger than the first voltage value via the second power source when the sensing information does not satisfy the predetermined condition at a third time point after the second time point.

According to one embodiment of the present specification, the controlling, by the controller, the second power source may comprise: applying the pulsed voltage to the electrode in a first period when the sensing information does not satisfy the predetermined condition at the second time point, and applying the pulsed voltage to the electrode in a second period which is shorter than the first period when the sensing information does not satisfy the predetermined condition at a third time point when is after a first time from the second time point.

According to one embodiment of the present specification, applying, by the controller, the RF voltage to a load via the first power source may comprise: applying an RF voltage having a first magnitude to the load from the first time point, applying an RF voltage having a second magnitude larger than the first magnitude when the sensing information does not satisfy the predetermined condition at a third time point after than the second time point.

According to one embodiment of the present specification, the controlling, by the controller, the second power source may comprise: applying the pulsed voltage of first voltage value to the electrode via the second power source when the sensing information does not satisfy the predetermined condition at the second time point, and stopping applying the pulsed voltage having the first voltage value when the sensing information satisfied the predetermined condition at a third time point after the second time point.

MODE FOR INVENTION

The above-described objectives, features, and advantages of the present disclosure will be more apparent from the following description in conjunction with the accompanying drawings. The present disclosure may be modified in various ways and implemented by various embodiments, so that specific embodiments are shown in the drawings and will be described in detail.

In the drawings, the thicknesses of layers and regions are exaggerated for clarity. In addition, it should be understood that when an element or layer is referred to as being on another element or layer, it may be disposed directly on the other element or layer or may be disposed on the other element with an intervening layer or element therebetween. Throughout the specification, the same reference numerals denote the same elements in principle. In addition, in the drawings of each embodiment, the elements having the same function within the same scope are described using the same reference numerals.

The numbers (for example, first, second, etc.) used in describing the present disclosure are only identification symbols for distinguishing one element from other elements.

In addition, the words "module" and "unit" for elements used in the following description are given or mixed and used considering only easiness in preparing a specification, and do not have a meaning or role distinguished from each other in themselves.

A method according to an embodiment may be realized as program instructions executable by various computer means and may be recorded on a computer-readable medium. The computer-readable medium may include program instructions, data files, data structures, and the like separately or in combinations. The program instructions recorded on the medium may be specially designed and configured for the present disclosure or may be well-known to and usable by those skilled in the art of computer software. Examples of the computer-readable recording medium include: magnetic media such as hard disks, floppy disks, and magnetic tapes; optical media such as CD-ROMs, and DVDs; magneto-optical media such as floptical disks; and hardware devices, such as ROM, RAM, and flash memory, which are particularly structured to store and execute program instructions. Examples of the program instructions may include mechanical language codes made by a compiler, as well as high level language codes executable by a computer using an interpreter, etc. The above-described hardware devices may be configured to act as one or more software modules in order to perform the operation of an embodiment, or vice versa.

1. Plasma Discharge

In the present disclosure, a device, system, or method for performing plasma discharge will be described. In the present disclosure, a device, system, or method for assisting initial discharge of plasma by generating ignition in a plasma discharge space before performing main discharge of plasma so as to assist plasma discharge will be described with reference to several embodiments.

1.1 System

According to an embodiment, a plasma discharge system may be provided.

FIG. 1 is a diagram illustrating a plasma discharge system. Referring to FIG. 1, the plasma generation system may include: a power supply unit 100 providing power; a plasma generating unit 200 acquiring power from the power supply unit and generating plasma; and a gas supply unit 300 supplying gas to the plasma generating unit 200. The plasma generation system may further include a process unit 400 performing a process using the generated plasma.

The power supply unit 100 may supply power required for generating plasma. The power supply unit 100 may supply power to the plasma generating unit. The power supply unit 100 may include a DC power source and/or an RF power source. The power supply unit 100 may provide a high-voltage pulse to the plasma generating unit 200 through the DC power source. The power supply unit 100 may provide RF power to the plasma generating unit 200 through the RF power source.

The plasma generating unit 200 may perform plasma discharge. The plasma generating unit 200 may acquire a discharge gas and may perform plasma discharge through the discharge gas. The plasma generating unit 200 may perform inductively coupled plasma discharge or capacitively coupled plasma discharge.

The plasma generating unit 200 may be a remote plasma source. The plasma generating unit 200 may form active species, and provide the formed active species to the process unit 400.

The plasma generating unit 200 may include a normal-pressure plasma device performing plasma discharge at atmospheric pressure (normal pressure). For example, the plasma generating unit 200 may include a normal-pressure plasma device performing plasma discharge at several hundreds of Torr to atmospheric pressure (750 Torr).

The plasma generating unit 200 may include a low-pressure plasma device performing low-pressure plasma discharge. For example, the plasma generating unit 200 may include a low-pressure plasma device that creates an environment with an initial vacuum degree (base pressure) of $10^{-5}$ to $10^{-7}$ Torr or less and generates plasma at a process pressure of several mTorr to several Torr by using a desired process gas.

The plasma generating unit 200 may perform a low-temperature plasma discharge operation at several ten to several hundred degrees Celsius. For example, the plasma generating unit 200 may perform a low-pressure and low-temperature plasma discharge operation, such as cleaning, etching, deposition, surface treatment, and material synthesis of a process for a semiconductor and a display. In addition, for example, the plasma generating unit 200 may perform a normal-pressure and low-temperature plasma discharge operation for a cleaning process of a glass substrate, reforming of a hydrophilic/hydrophobic surface, nanotechnology, sterilization, removal of harmful substances, and reduction of carbon dioxide.

The plasma generating unit 200 may perform, at a high temperature of several thousand to several tens of thousand degrees Celsius, a high-temperature plasma discharge operation for plasma welding, cutting, and plasma metallurgy.

The plasma generating unit 200 may generate a seed charge in order to generate plasma. In particular, when the plasma generating unit 200 performs normal-pressure plasma discharge, the plasma generating unit 200 generates a seed charge for initial discharge. The plasma generating unit 200 includes a DC electrode, and generates a seed charge when a DC high-voltage pulse is provided to the DC electrode.

The plasma generating unit 200 may perform initial discharge and main discharge to generate plasma. The plasma generating unit 200 may perform initial discharge according to a capacitively coupled mode (mode E) or may perform main discharge according to an inductively coupled mode (mode H). The plasma generating unit 200 includes an inductively coupled antenna including a coil, and may perform initial discharge or main discharge as RF power is provided to the inductively coupled antenna.

A detailed configuration and operation of the plasma generating unit 200 will be described below.

The gas supply unit 300 may supply the plasma generating unit 200 with gas for plasma discharge. The gas supply unit 300 may supply the plasma generating unit 200 with a reactive gas or a process gas. The gas supply unit 300 may supply gas selected according to the function or use of the plasma generating unit 200 or the process unit 400.

For example, the gas supply unit 300 may supply the plasma generating unit 200 with any one gas of the following or a gas mixture of gas and air:nitrogen trifluoride gas ($NF_3$ gas), argon gas (Ar gas), xenon gas (Xe gas), krypton gas (Kr gas), nitrogen gas ($N_2$ gas), oxygen gas ($O_2$ gas), hydrogen gas ($H_2$ gas), helium gas (He gas), neon gas (Ne gas), monosilane gas ($SiH_4$ gas), ammonia gas ($NH_3$ gas), phosphine gas ($PH_3$ gas), diborane gas ($B_2H_6$ gas), dichlorosilane gas (DCS gas), octafluorocyclopentene gas ($C_5F_8$ gas), carbon tetrafluoride gas ($CF_4$ gas), hydrogen bromide gas (HBr gas), chlorine gas ($Cl_2$ gas), sulfur hexafluoride gas ($SF_6$ gas), and methane gas ($CH_4$ gas). The gas supply unit 300 may supply gas to the plasma generating unit through a liquid precursor, such as tetra-ethyl-ortho-silicate (TEOS), Tetrakis (ethylmethylamino) zirconium, trimethyl aluminum, and hexamethyldisiloxane.

The process unit 400 may perform a process before or after plasma discharge. The process unit may perform a purpose process through the plasma generated by the plasma generating unit 200. Alternatively, the process unit 400 may transmit a material generated by performing the purpose process to the plasma generating unit.

The purpose process may be the following: a cleaning process of removing a fine oil film on a surface of a material to be processed, through collision of the surface and plasma ions/radicals; an etching process of generating plasma by using a reactive etching gas according to a process and of selectively removing materials by using the plasma; a deposition process of injecting a deposition gas appropriate for the purpose and an additional gas for plasma discharge and of depositing materials on the surface; a reforming process of changing the characteristics of the surface by using plasma; and a material decomposition process of decomposing a target material through plasma discharge.

The process unit 400 may perform a purpose operation related to processing of a semiconductor substrate. For example, the process unit 400 may receive active species (for example, hydrogen active species) from the plasma generating unit and may perform a process of cleaning inside a process chamber.

The process unit 400 may include: a process chamber; a substrate holder provided inside the process chamber and at which a semiconductor substrate (for example, a silicon semiconductor substrate) to be processed is positioned; a shower head located above the substrate holder and for supplying a substrate processing material into the process chamber; and/or a vacuum pump for discharging air from the process chamber.

Figure 2:
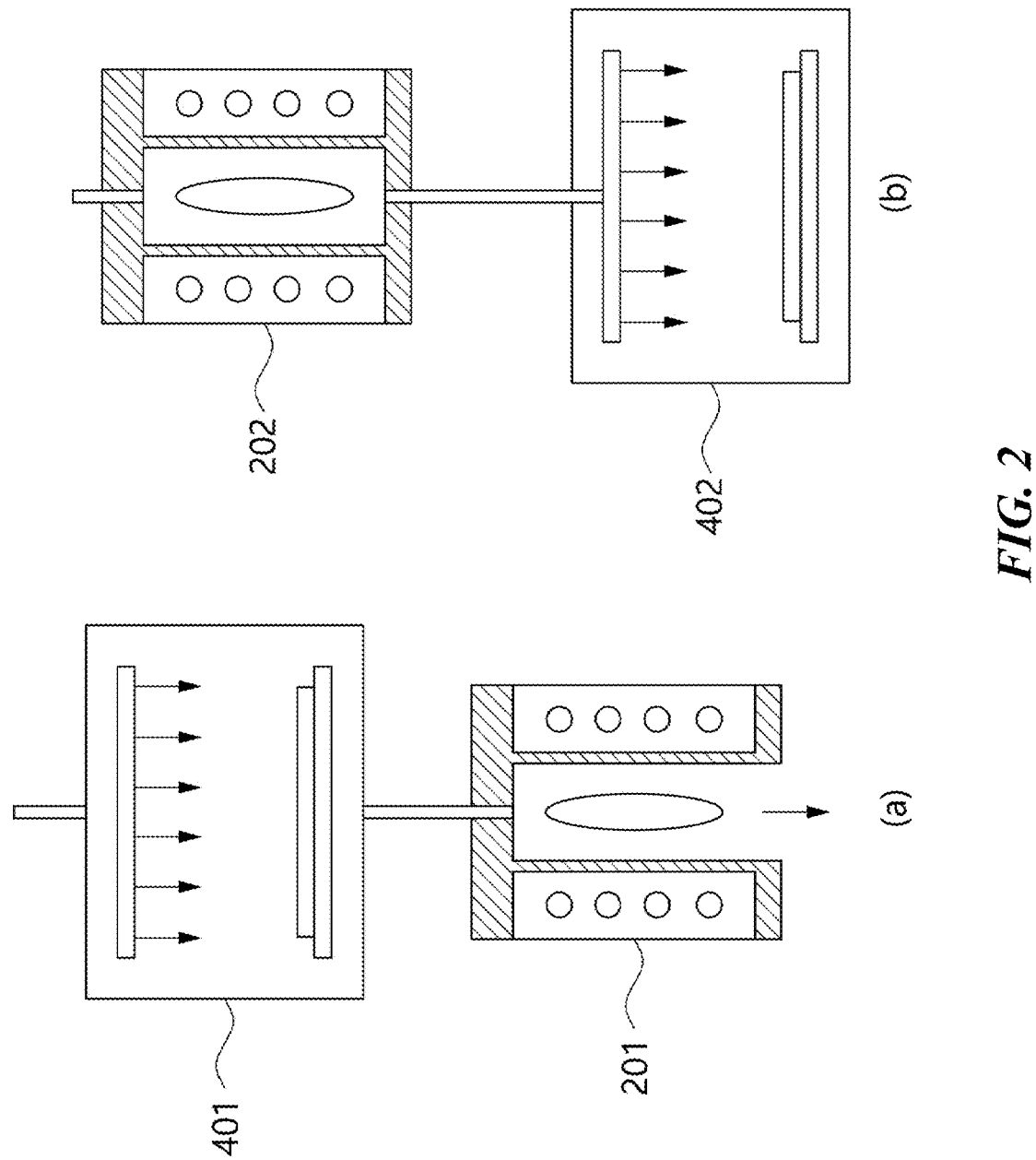
FIG. 2 is a diagram illustrating a plasma generation system according to an embodiment of the present disclosure.

The plasma generation system may be realized such that the process unit 400 performs the purpose process through the plasma generated by the plasma generating unit or that a by-product produced because of the purpose process of the process unit 400 is processed by the plasma generating unit 200. FIG. 2 is a diagram illustrating a plasma generation system according to several embodiments.

Referring to (a) of FIG. 2, a plasma generation system according to an embodiment may include a process unit 401 and a plasma generating unit 201 processing materials generated by the process unit 401. For example, referring to (a) of FIG. 2, the plasma generation system may include a gas scrubber device. The process unit 401 is a device that performs a semiconductor manufacturing process. The plasma generating unit 201 may perform processing of a persistent gas, for example, sulfur hexafluoride ($SF_6$), carbon tetrafluoride ($CF_4$), and perfluorocarbon (PFC) gas, generated in the semiconductor manufacturing process of the process unit 401.

Referring to (b) of FIG. 2, a plasma generation system according to an embodiment may include: a plasma generating unit 202 generating active species and supplying the active species to a process unit 402; and the process unit 402 performing a process using active species. For example, the plasma generating unit 202 may generate active species through plasma discharge of gas such as $NF_3$, $H_2$, $N_2$, $O_2$, $C_3F_8$, $CF_4$, $C_2$, $SiH_4$, and Ar. The process unit 402 may perform operations, such as dry etching, PECVD, PVD, ashing, and cleaning, through the active species generated by the plasma generating unit 202.

1.2 Plasma Discharge Apparatus 1.2.1 Structure of Plasma Discharge Apparatus

According to an embodiment, a device for performing plasma discharge may be provided.

Figure 3:
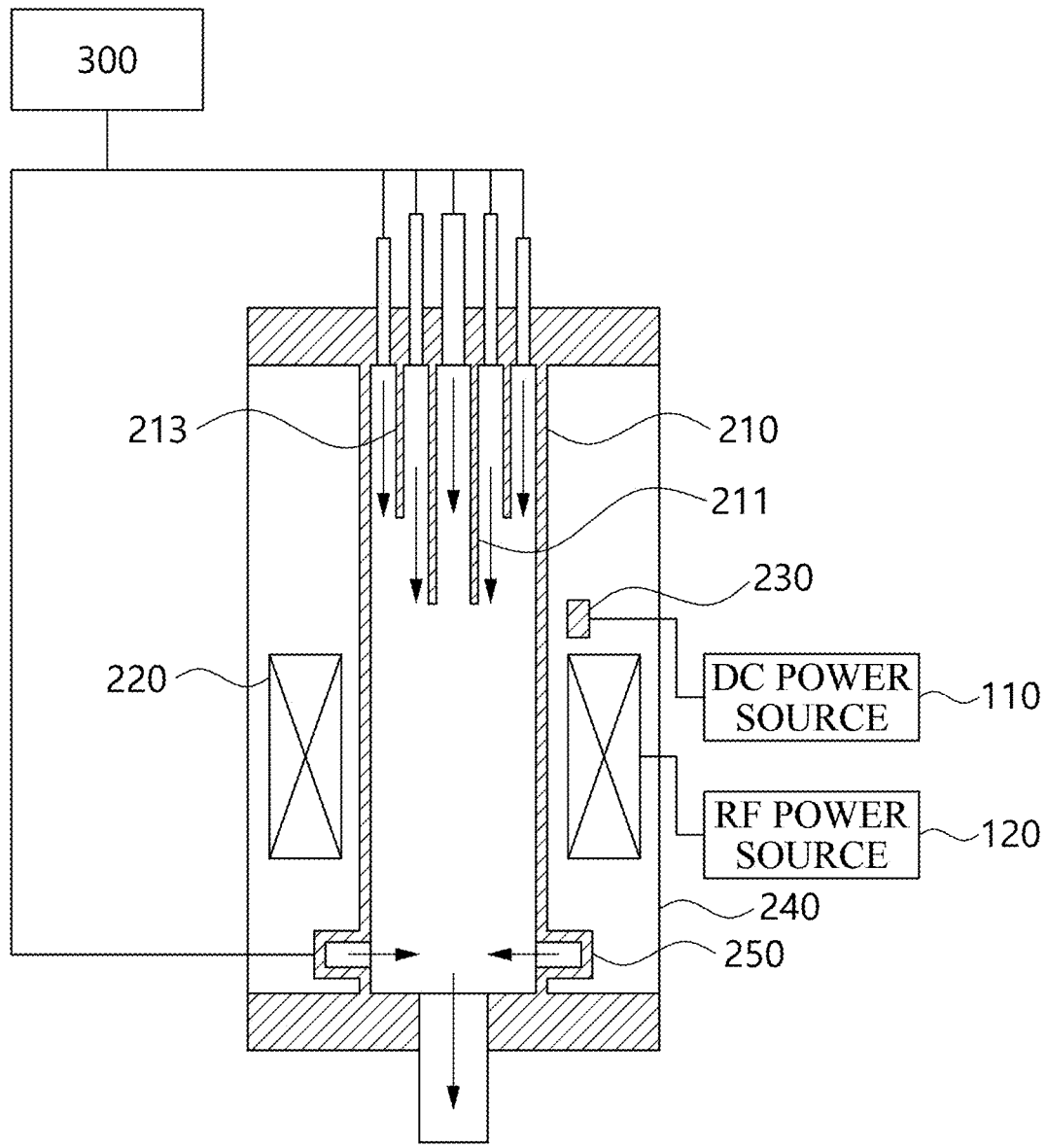
FIG. 3 is a diagram illustrating a device for generating plasma according to an embodiment of the present disclosure.

FIG. 3 is a diagram illustrating a device for generating plasma according to an embodiment. Referring to FIG. 3, a device for generating plasma according to an embodiment may include: an RF power source 120 capable of changing frequency; and a plasma generating unit 240 receiving power from the RF power source 120 and generating plasma. Referring to FIG. 3, the plasma generating unit may include: a discharge tube 210; a gas tube 211, 213 located inside the discharge tube 210; and an antenna module 220 including an antenna that is provided near the discharge tube 210, receives power from an RF power source unit 120, forms an induced electric field, and generates plasma inside the discharge tube 210. The device for generating plasma may include an electrode 230 to which a high-voltage pulse is applied by a DC power source 110. The device for generating plasma may further include an auxiliary gas supply nozzle 250.

The RF power source 120 may change the driving frequency within a variable-frequency range. The RF power source 120 may have a variable-frequency range of several hundreds of kHz to several tens of MHz and power of several tens of kW or greater. For example, the RF power source 120 may provide power of 8 kW or less. For example, the RF power source 120 may be an AC power source that provides power at a frequency in a range of 100 kHz to 5 MHz.

The RF power source 120 may perform impedance matching by changing the driving frequency. The RF power source 120 may change the driving frequency so that the plasma generating unit operates in a resonance state.

The RF power source 120 may include: a rectifier converting commercial AC power into DC power; a controller controlling a driving frequency and power by providing a switching signal; and an inverter converting DC power into RF power based on the switching signal of the controller.

The discharge tube 210 may be provided in the form of a cylindrical tube. The outer diameter of the discharge tube 210 may be several centimeters to several ten centimeters. The inner diameter of the discharge tube 210 may be smaller than the outer diameter thereof by several millimeters to several centimeters.

The discharge tube 210 may be a dielectric discharge tube. The discharge tube 210 may be made of a non-conductive material such as ceramic (for example, alumina or AlN), sapphire, and quartz.

The discharge tube 210 may provide a discharge region in which plasma is located. The internal pressure of the discharge tube 210 may be adjusted differently from the external pressure. As needed, the internal pressure of the discharge tube 210 is adjusted to an ultra-low pressure equivalent to vacuum, or to a low pressure of several mTorr to a normal pressure equal to or higher than atmospheric pressure.

The gas tube 211, 213 may provide a path for providing gas to the discharge tube 210 and the inside of the discharge tube 210. The gas tube 211, 213 may inhibit plasma from being in contact with the inner wall of the discharge tube 210 and may secure plasma stability.

The gas tube 211, 213 may be one or more in number. The gas tube may include a first gas tube 211 and a second gas tube 213. The first gas tube 211 and the second gas tube 213 may have a concentric structure. The first gas tube 211 may provide an input path for a first gas (for example, gas for reaction such as methane gas). The second gas tube 213 may provide an input path for a second gas (for example, gas containing carbon dioxide as a main ingredient) having composition different from that of the first gas.

The first gas tube 211 and the second gas tube 213 may provide swirl flow. For example, the first gas tube 211 may provide inner swirl flow, and the second gas tube 213 may provide outer swirl flow.

The device for generating plasma may include the antenna module 220. The antenna module 220 may receive power from the RF power source 120 and may cause plasma discharge inside the discharge tube 210. The antenna module 220 will be described in more detail with reference to FIG. 12.

The antenna module 220 may receive power from the RF power source 120 and may induce plasma discharge inside the discharge tube 210. The antenna module 220 may receive RF power from the RF power source 120 and may generate capacitively coupled plasma and/or inductively coupled plasma inside the discharge tube 210.

The antenna module 220 may include a solenoid coil wound around the discharge tube 210 continuously several times. The antenna module 220 may include multiple turns wound around the discharge tube 210, and an auxiliary capacitor provided between each of the turns.

The device for generating plasma may include a DC electrode 230 located near the antenna module 220. The device for generating plasma may include one or more electrodes connected to the DC power source 110. The DC electrode 230 will be described in detail below.

The auxiliary gas supply nozzle 250 may supply an auxiliary gas into the discharge tube 210. The auxiliary gas supply nozzle 250 may be located close to an end of the discharge tube 210 and to another end thereof facing the end, wherein gas is input through the ends. The auxiliary gas supply nozzle 250 may be provided near the discharge tube 210 and may be provided between the antenna module 220 and a gas discharge hole (an outlet of the discharge tube 210).

The device for generating plasma may further include a safety case for securing safety that shields the discharge tube 210 and the antenna module 220 and blocks external influences.

1.2.2 DC Power Source and DC Electrode

A plasma discharge apparatus according to an embodiment may include an electrode to which a high voltage is applied. The plasma discharge apparatus according to an embodiment may include a DC electrode to which a high voltage is applied by a DC power source. The DC electrode forms an electric field inside a discharge tube when a high voltage is applied to the electrode by the DC power source. When a high voltage is applied to the DC electrode by the DC power source, the DC electrode forms a strong electric field in a predetermined direction and provides a seed charge inside the discharge tube. The DC electrode provides the seed charge inside the discharge tube to induce, promote, or assist plasma discharge.

The DC electrode may obtain a high voltage from the DC power source. The DC power source may apply a high-voltage pulse to the DC electrode. The DC power source may apply a high-voltage pulse to the DC electrode at predetermined time intervals. The intensity and amplitude of the high-voltage pulse may be given as predetermined values.

The plasma discharge apparatus may apply a high voltage (or high-voltage pulse) to an electrode (or DC electrode) through a power source (or DC power source). Throughout the present disclosure, it may be understood that a high voltage applied to an electrode includes various types of DC voltage signals. The high voltage applied to the electrode may include various types of DC voltage signals except alternating current. For example, the high voltage applied to the electrode may have a square or rectangular pulse waveform. In addition, for example, the high voltage applied to the electrode may have a pulse waveform according to a part (for example, half period) of a sine wave.

According to an embodiment, the plasma discharge apparatus may change a signal of a voltage (or high-voltage pulse) applied to an electrode (or DC electrode) as needed. The plasma discharge apparatus may gradually or sequentially increase or decrease the magnitude of the voltage applied to the electrode.

Hereinafter, a DC electrode and a DC power source according to several embodiments will be described.

Figure 4:
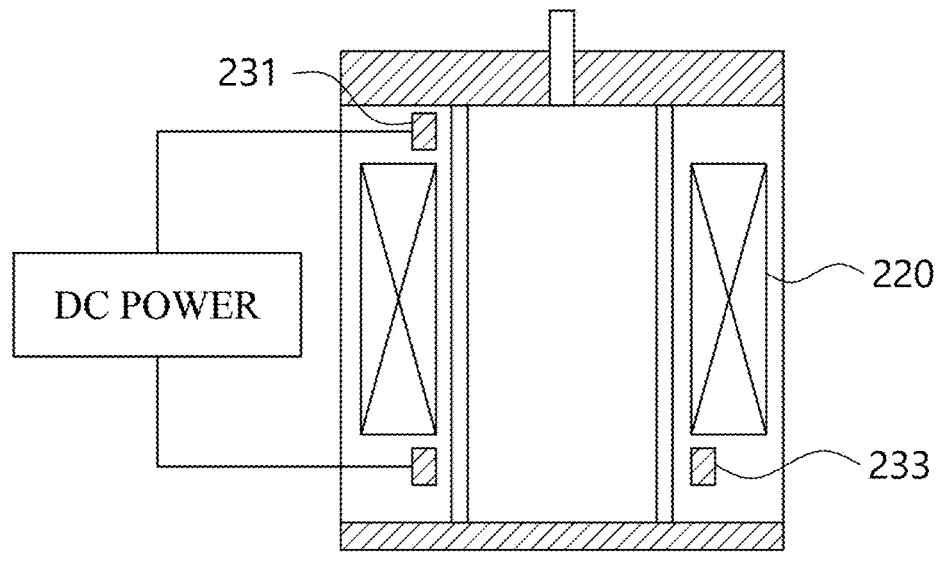
FIG. 4 is a diagram illustrating a DC electrode according to an embodiment of the present disclosure.
Figure 4:
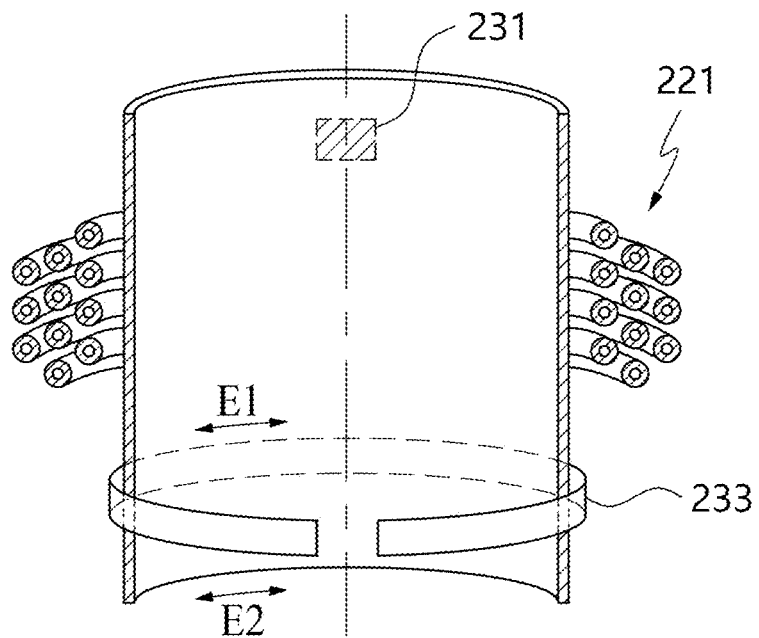

FIG. 4 is a diagram illustrating a DC electrode according to an embodiment.

Referring to (a) of FIG. 4, a device for generating plasma according to an embodiment may include one or more electrodes that are located near an antenna module 220 causing plasma discharge and are connected to a DC power source. The device for generating plasma may include: a first electrode 231 located above the antenna module 220; and a second electrode 233 located below the antenna module 220.

Referring to (b) of FIG. 4, the device for generating plasma may include: the first electrode 231 located at an outer surface of a discharge tube and located above an induction coil 221 of the antenna module 220; and the second electrode 233 provided to surround the outer surface of the discharge tube and located below the induction coil 221. Referring to (b) of FIG. 4, the first electrode 231 may have the shape of a quadrangular plate. The second electrode 233 may have the shape of letter "C". Alternatively, the second electrode 233 may include multiple slits. In order to prevent eddy currents from flowing through the second electrode 233 due to the influence of induced electric fields E1 and E2 formed by the induction coil, the second electrode 233 may have an open loop structure that does not completely surround the outer wall of the discharge tube.

The DC power source may apply a positive high voltage to the first electrode 231 and may apply a negative high voltage to the second electrode 233. When a high-voltage pulse is applied between the first electrode 231 and the second electrode 233 by the DC power source, capacitively coupled plasma discharge, for example, vertical streamer discharge, occurs between the first electrode 231 and the second electrode 233.

Figure 5:
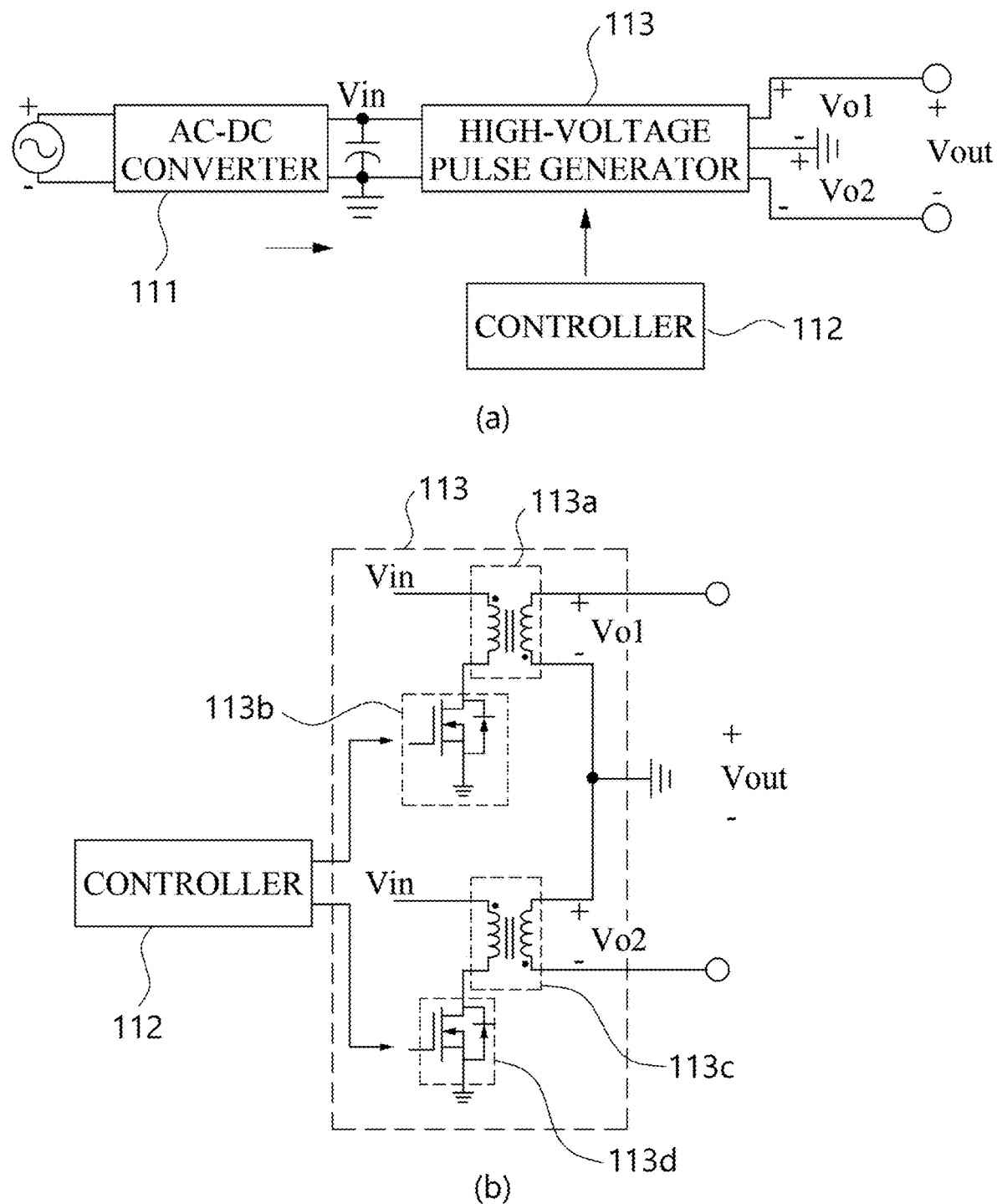
FIG. 5 is a diagram illustrating a DC power source according to an embodiment of the present disclosure.

FIG. 5 is a diagram illustrating a DC power source according to an embodiment.

Referring to (a) of FIG. 5, a DC power source may include: an AC-DC converter 111 converting commercial AC power to a DC voltage; a high-voltage pulse generator 113 generating a positive DC high-voltage pulse through the DC voltage; and a controller 112 controlling the high-voltage pulse generator.

(b) of FIG. 5 is a diagram illustrating an embodiment of the high-voltage pulse generator shown in (a) of FIG. 5.

Referring to (b) of FIG. 5, the high-voltage pulse generator 113 according to an embodiment may include: a first transformer 113*a* including a primary coil acquiring a DC voltage from the AC-DC converter and a secondary coil generating a positive DC high-voltage pulse; a first power transistor 113*b* connected to the primary coil of the first transformer 113*a*; a second transformer 113*c* including a primary coil acquiring a DC voltage from the AD-DC converter and a secondary coil generating a negative DC high-voltage pulse; and a second power transistor 113*d* connected to the primary coil of the second transformer. The controller 112 may control the gate of the first transistor 113*b* and the gate of the second transistor 113*d*. One end of the secondary coil of the first transformer 113*a* is grounded and another end of the secondary coil of the first transformer 113*a* may output a positive DC high-voltage pulse Vo1. One end of the secondary coil of the second transformer 113*c* is grounded and another end of the secondary coil of the second transformer 113c may output a negative DC high-voltage pulse Vo2.

The DC voltage Vin may be a DC power of 12 to 24 V. The controller 112 may perform control in a manner that synchronizes the on-time of the first power transistor 113b and the second power transistor 113d with a repetition frequency. A voltage of the DC high-voltage pulse may be several tens of kV, for example, 10 to 50 kV. A repetition frequency of the DC high-voltage pulse may be several kHz to several tens of kHz, for example, 10 kHz to 100 kHz.

Figure 6:
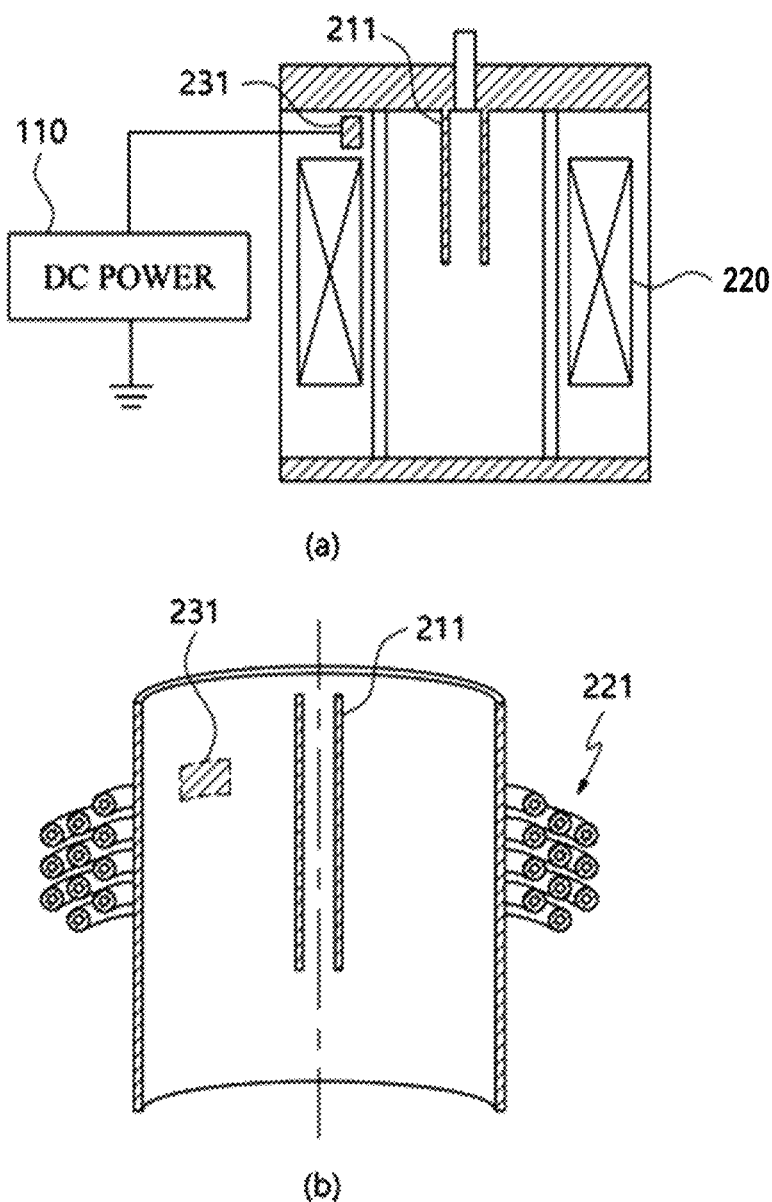
FIG. 6 is a diagram illustrating a DC electrode according to an embodiment of the present disclosure.

FIG. 6 is a diagram illustrating a discharge electrode according to another embodiment.

Referring to (a) of FIG. 6, a device for generating plasma according to an embodiment may include an electrode 231 that is located near an antenna module 220 causing plasma discharge and is connected to a DC power source 110.

The device for generating plasma may apply a high voltage to the electrode 231 through the DC power source 110, and may cause capacitively coupled discharge between the electrode 231 and a nearby object (for example, a metal object located inside/outside the discharge tube). The device for generating plasma may apply a high voltage to the electrode 231 through the DC power source 110, and may cause capacitively coupled discharge between the electrode 231 and the gas tube 211 that is located inside the discharge tube and is grounded. The device for generating plasma may cause discharge between the gas tube 211 and the electrode 231 to provide a seed charge. That is, the gas tube 211 may serve as a counter electrode. However, this is only an example, another grounded conductor located near the discharge tube or inside the discharge tube may serve as a counter electrode.

Referring to (b) of FIG. 6, the device for generating plasma may include the electrode 231 located at an outer surface of the discharge tube and located above an induction coil 221 of the antenna module 220. The electrode 231 may have the shape of a quadrangular plate. The device for generating plasma applies a positive high voltage, through the DC power source, to the electrode 231 that is located at the outer surface of the discharge tube and has the shape of a quadrangular plate so that discharge between the electrode 231 and the gas tube 211 that is located inside the discharge tube and is grounded is induced. When a high-voltage pulse is applied to the electrode 231 by the DC power source, capacitively coupled plasma discharge, for example, streamer discharge, occurs between the electrode 231 and the gas tube 211.

Figure 7:
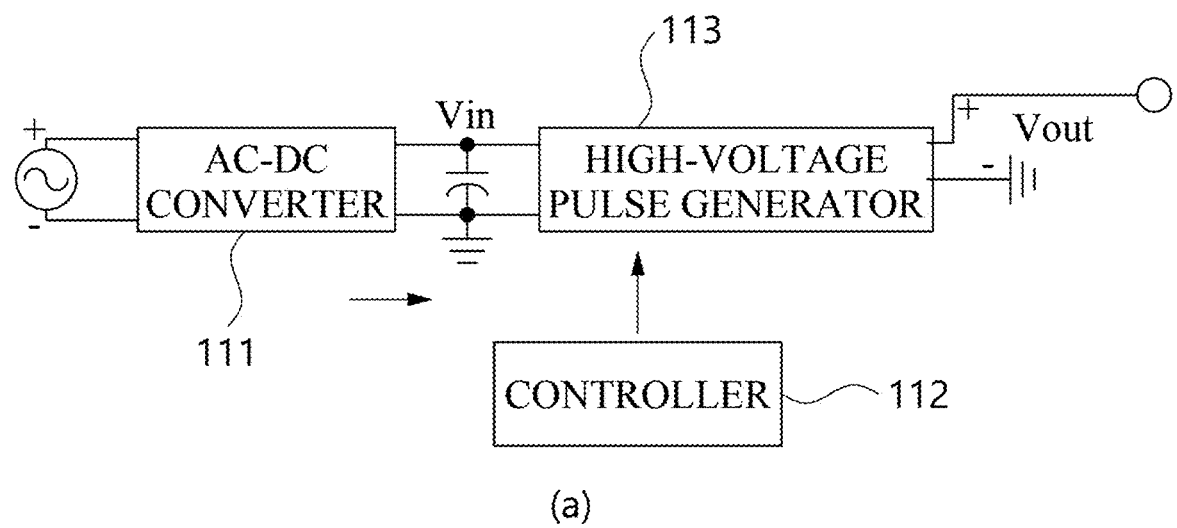
FIG. 7 is a diagram illustrating a DC power source according to an embodiment of the present disclosure.
Figure 7:
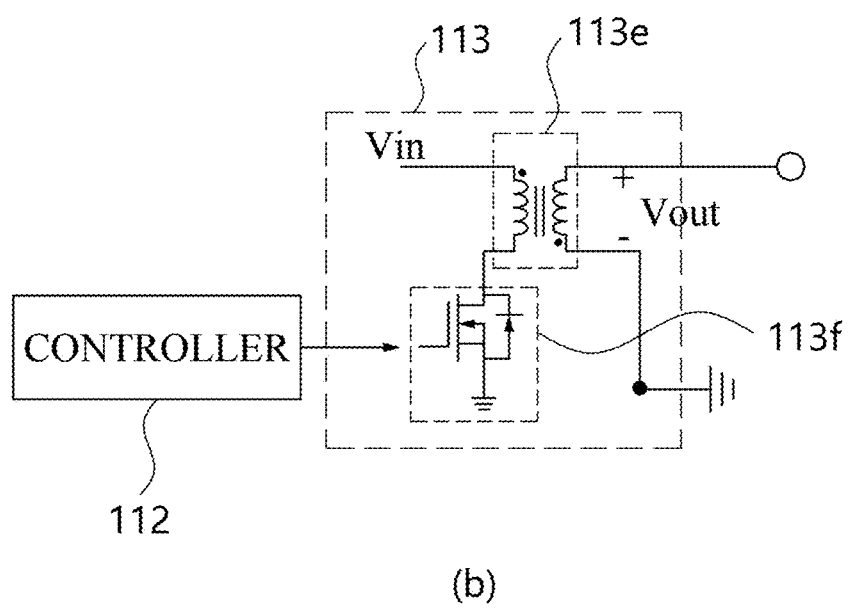

(a) of FIG. 7 is a diagram illustrating a power source according to an embodiment. (b) of FIG. 7 is a diagram illustrating an embodiment of the high-voltage pulse generator shown in (a) of FIG. 7. In FIG. 7 showing the power source and the high-voltage pulse generator respectively, the contents described with reference to FIG. 5 may be similarly applied unless otherwise specifically described.

Referring to (b) of FIG. 7, a high-voltage pulse generator 113 according to an embodiment may include: a transformer 113e including a primary coil acquiring a DC voltage from an AC-DC converter and a secondary coil generating a positive DC high-voltage pulse; and a transistor 113f connected to the primary coil of the transformer 113e. A controller 112 may control the gate of the transistor 113e. One end of the secondary coil of the transformer 113f is grounded and another end of the secondary coil of the transformer 113f may output a positive DC high-voltage pulse Vout.

1.2.3 RF Power Source and Antenna Module

A device for generating plasma may include one or more induction electrodes that causes discharge inside a discharge tube. The device for generating plasma may include one or more antenna modules that causes inductively coupled plasma discharge when power is supplied from an RF power source. The antenna modules may operate differently depending on the form thereof and frequency of an input power signal. Hereinafter, an antenna module according to several embodiments will be described.

1.2.3.1 Antenna Module of First Type

Figure 8:
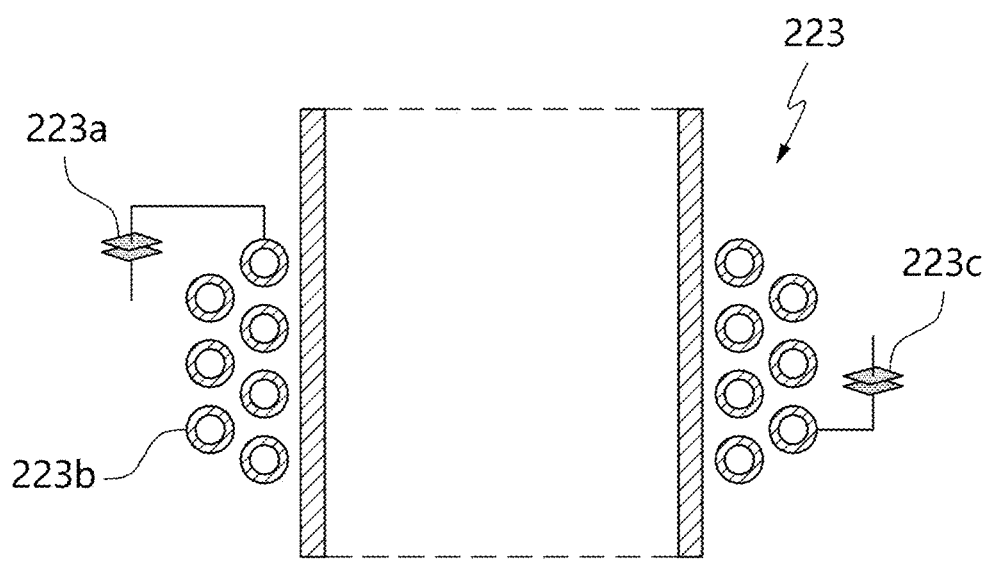
FIG. 8 is a diagram illustrating an antenna module according to an embodiment of the present disclosure.

FIG. 8 is a diagram illustrating a form of an antenna module according to an embodiment. Referring to FIG. 8, an antenna module 223 according to an embodiment may include a first capacitor 223a, an induction coil 223b, and a second capacitor 223c.

The first capacitor 223a may be connected between one end of the induction coil 223b and an RF power source, and the second capacitor 223c may be connected between another end of the induction coil 223b and the RF power source. The first capacitor 223a and the second capacitor 223c may have the same capacitance.

The induction coil 223b may be located between the first capacitor 223a and the second capacitor 223c. The induction coil 223b may be a solenoid coil having a multi-layer structure. The induction coil 223b may be a solenoid coil wound around the outer surface of a discharge tube multiple times and in multiple layers. Unit turns constituting the induction coil 223b may be wound to form a magnetic field that constructively interferes inside the discharge tube in response to an AC power source. The induction coil 223b may be a solenoid coil wound around the outer surface of a discharge tube multiples times in one direction.

The induction coil 223b may be a solenoid coil that is densely wound so that the number of windings per unit length of a discharge tube is maximized. Although shown briefly in FIGS. 5A and 5B, the induction coil 223b may be a solenoid coil having a larger number of windings than that shown in FIG. 8. For example, the induction coil 223b may have a three-layer structure including an inner solenoid coil, an intermediate solenoid coil, and an outer solenoid coil connected to each other.

The induction coil 223b may have the form of a pipe through which a cooling medium flows therein. The induction coil 223b may be provided as a copper pipe. The cross section of the induction coil 223b may be a circular shape or a quadrangular shape.

The first capacitor 223a, the induction coil 223b, and the second capacitor 223c are connected to each other in series and may resonate at a first frequency. The first frequency may be determined by capacitance C1 of each of the first capacitor 223a and the second capacitor 223c, and inductance L1 of the induction coil 223b.

Figure 9:
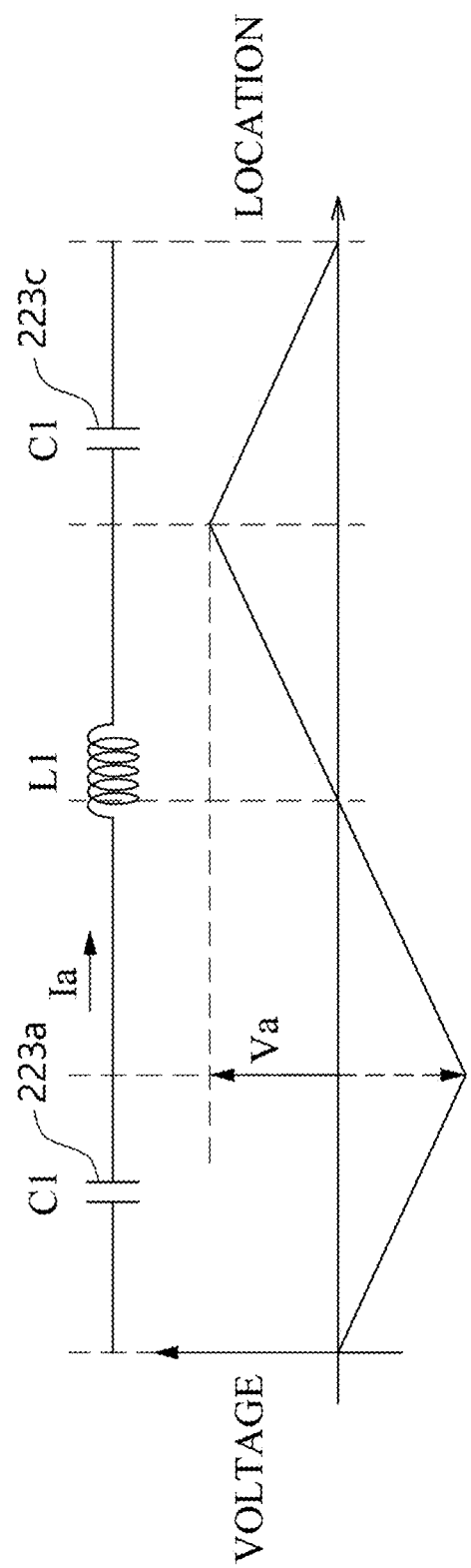
FIG. 9 is a diagram illustrating operation of an antenna module according to an embodiment of the present disclosure.

FIG. 9 is a diagram illustrating operation at a resonance frequency of the antenna module shown in FIG. 8.

Referring to FIG. 9, the antenna module may resonate at the first frequency determined by the capacitance C1 of each of the first capacitor 223a and the second capacitor 223c, and the inductance L1 of the induction coil 223b. When power is supplied at the first frequency, the first capacitor 223a and the second capacitor 223c induce a voltage drop contrary to the induction coil 223b so that the size of the voltage Va induced to the opposite ends of the induction coil 223b is minimized.

In a resonance state, the first capacitor 223a and the second capacitor 223c may cancel the reactance of the induction coil 223b. The device for generating plasma supplies power to the antenna module at the first frequency such that the reactance of the induction coil 223b is canceled by the first capacitor 223a and the second capacitor 223c, thereby performing impedance matching. The first capacitor 223a and the second capacitor 223c may be provided symmetrically with respect to the induction coil 223b in order to reduce the voltage applied to the opposite ends of the induction coil 223b.

1.2.3.2 Antenna Module of Second Type

Figure 10:
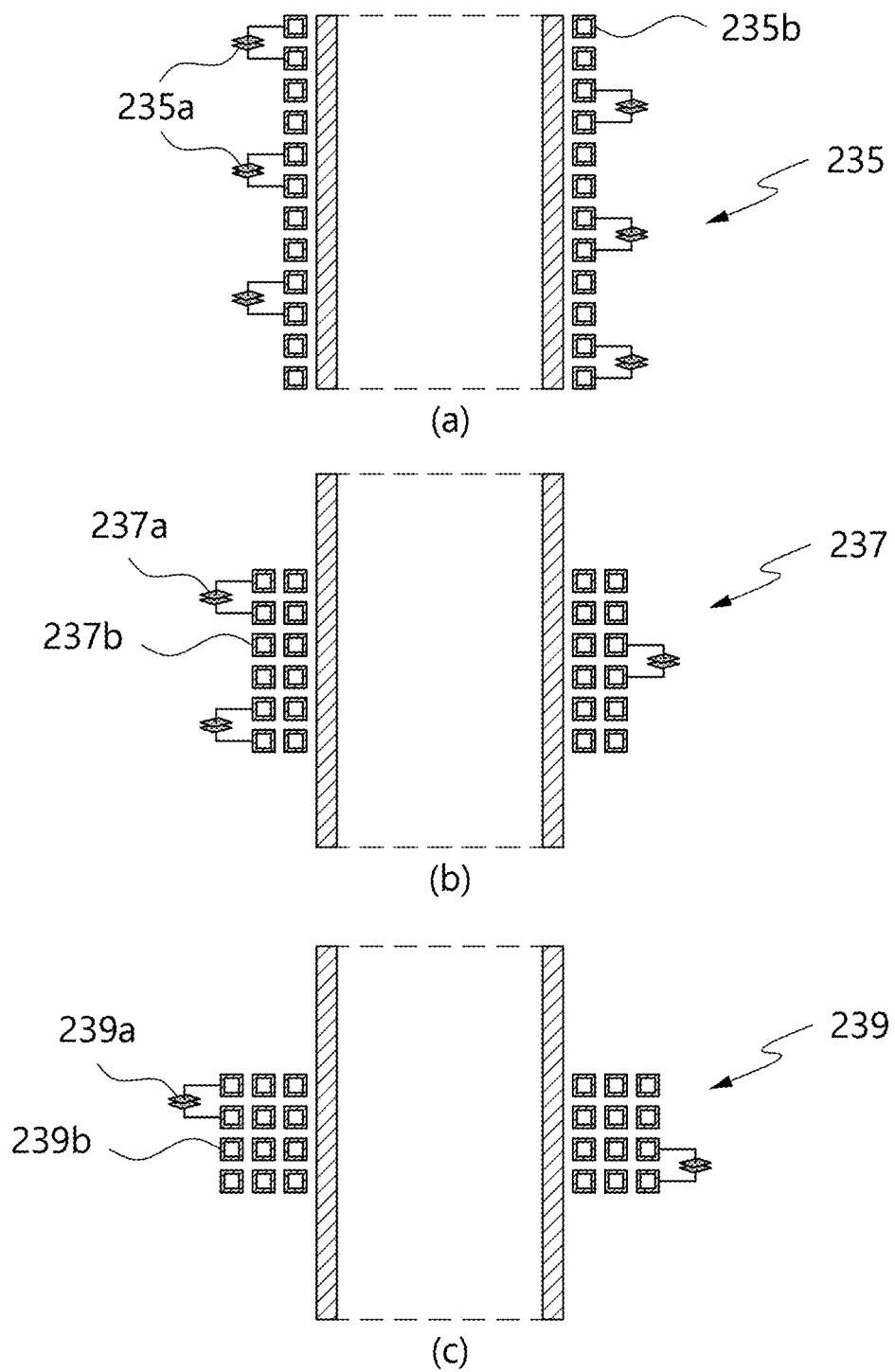
FIG. 10 is a diagram illustrating an antenna module according to an embodiment of the present disclosure.

FIG. 10 is a diagram illustrating forms of antenna modules according to several embodiments. (a), (b), and (c) of FIG. 10 is a diagram illustrating antenna modules having different numbers of turns of induction coils per unit length of the discharge tube. The antenna modules shown in (a), (b), and (c) of FIG. 10 may have different discharge characteristics.

The device for generating plasma may have a characteristic wherein the smaller the number of turns of the induction coil of the antenna module per unit length of the discharge tube, the smaller the energy loss and the narrower the discharge window. The device for generating plasma may have a characteristic wherein the greater the number of turns of the induction coil of the antenna module per unit length of the discharge tube, the wider the discharge window, the more advantageous in maintaining discharge, and the greater the energy loss.

Referring to (a) of FIG. 10, an antenna module 235 may include: unit coils 235b wound by one turn for each layer; and interlayer capacitors 235a connecting the unit coils of the respective layers. The 12*1-turn antenna module 235 shown in (a) of FIG. 10 may be configured such that all of the antenna unit turns are close to the outer surface of the discharge tube. The antenna module 235 shown in (a) of FIG. 10 may have a small number of turns per unit length (N/L), and thus have relatively low discharge efficiency, low energy loss, and relatively high process performance.

Referring to (b) of FIG. 10, an antenna module 237 may include: unit coils 237b wound by two turns for each layer; and interlayer capacitors 237a connecting the unit coils of the respective layers. The 6*2-turn antenna module 237 shown in (b) of FIG. 10 may have a larger number of turns per unit length (N/L) than the antenna module 235 of (a) of FIG. 10. The antenna module 237 shown in (b) of FIG. 10 may have higher discharge efficiency than the antenna module 235 of (a) of FIG. 10. The discharge efficiency may be proportional to the number of turns per unit length (N/L). For example, the antenna module 237 shown in (b) of FIG. 10 may have twice the discharge efficiency of the antenna module 235 of (a) of FIG. 10.

Referring to (c) of FIG. 10, an antenna module 239 may include: unit coils 239b wound by three turns for each layer; and interlayer capacitors 239a connecting the unit coils of the respective layers. The antenna module 239 may have a larger number of turns per unit length (N/L) than the antenna modules 235 and 237 of (a) and (b) of FIG. 10, and may have higher discharge efficiency than the antenna modules 235 and 237 of (a) and (b) of FIG. 10. The antenna module 239 may have a characteristic wherein it is easy to maintain discharge in a gas condition in which discharge is difficult compared to the antenna modules 235 and 237 of (a) and (b) of FIG. 10.

The antenna modules shown in (a), (b), and (c) of FIG. 10 may have different dielectric capacities. The antenna module 235 of (a) of FIG. 10 may have first dielectric capacity, the antenna module 237 of (b) of FIG. 10 may have second dielectric capacity, and the antenna module 239 of (c) of FIG. 10 may have third dielectric capacity. The second dielectric capacity may be greater than the first dielectric capacity and the third dielectric capacity may be greater than the second dielectric capacity.

Figure 11:
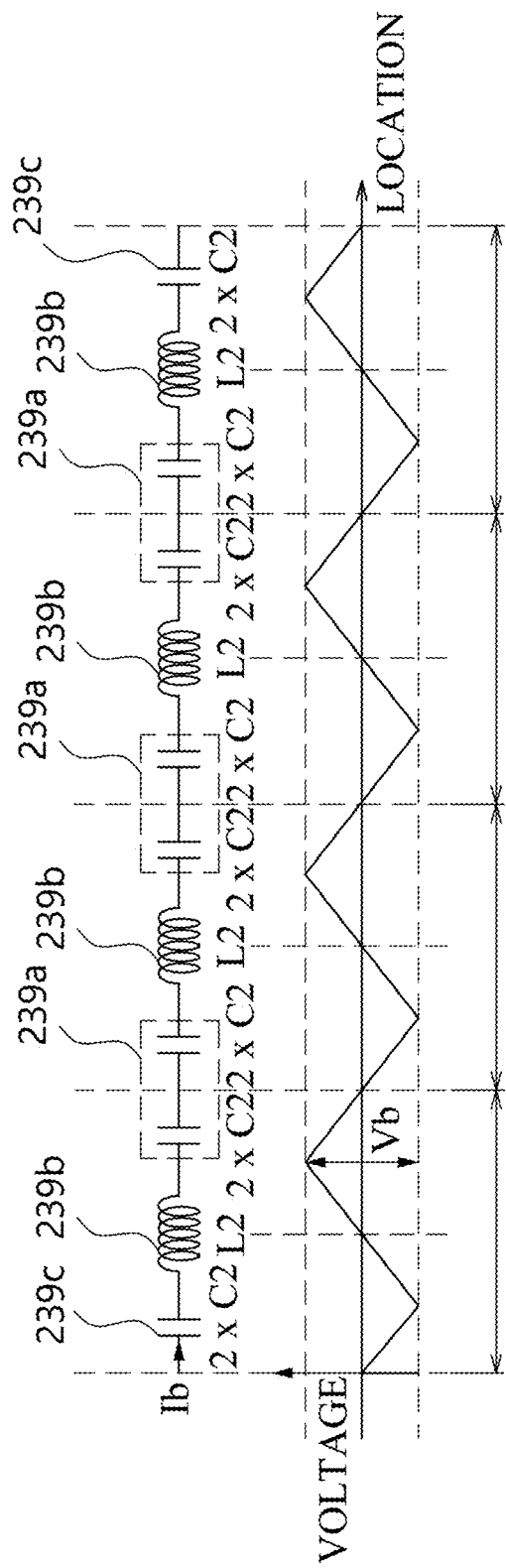
FIG. 11 is a diagram illustrating operation of an antenna module according to an embodiment of the present disclosure.

FIG. 11 is a diagram illustrating operation at a resonance frequency of the antenna module shown in FIG. 11. Hereinafter, with reference to FIG. 11, voltage distribution at the resonance frequency of the antenna module shown in (c) of FIG. 11 will be described.

Referring to FIG. 11, the antenna module according to an embodiment may include: multiple unit coils 239b; interlayer capacitors 239a provided between the multiple unit coils; and terminal capacitors 239c respectively connected to the unit coils respectively located at the upper stage and the lower stage, which are not shown.

The antenna module may resonate at a second frequency determined by capacitance of the interlayer capacitors 239a, inductance of the unit coils 239b, and capacitance of the terminal capacitors 239c.

In order to minimize the voltages applied to the unit coils 239b, the capacitance of the terminal capacitors 239c may be determined to be twice the capacitance of the interlayer capacitors 239a. Herein, the antenna module may resonate at the second frequency determined by capacitance C2 of the interlayer capacitors 239a, inductance L2 of the unit coils 239b, and capacitance 2*C2 of the terminal capacitors 239c. Referring to FIG. 11, it is shown that each of the interlayer capacitors 239a is serial connection of imaginary capacitors in a pair each having capacitance of 2*C2.

In a resonance state, multiple interlayer capacitors 239a and terminal capacitors 239c may reduce the voltages applied to the ends of the unit coils 239b. When power is supplied at the second frequency to the antenna module, the interlayer capacitors 239a and the terminal capacitors 239c induce a voltage drop contrary to the induction coils 239b so that the size of the voltages Vb induced to the opposite ends of the induction coils 239b is minimized.

The interlayer capacitors 239a and the terminal capacitors 239c may cancel the reactance of the induction coils 239b. The device for generating plasma supplies power to the antenna module at the second frequency such that the reactance of the induction coils 239b is canceled by the interlayer capacitors 239a and the terminal capacitors 239c, thereby performing impedance matching. The terminal capacitors 239c may be provided symmetrically with respect to the induction coils 239b in order to reduce the voltages applied to the opposite ends of the induction coils 239b. The interlayer capacitor 239a may be provided between each of layers for the induction coils 239b in order to prevent capacitive coupling by minimizing the interlayer voltage difference between the unit induction coils 239b.

As the reactance of the induction coils 239b is canceled by the interlayer capacitors 239a and/or the terminal capacitors 239c, the voltages at the respective unit coils 239b may have a corresponding relationship. For example, in a resonance state, the voltage between one end and another end of a unit coil 239b may correspond to the voltage between one end and another end of another unit coil 239b. The electric potential at one end of a unit coil 239b may correspond to the electric potential at one end of another unit coil 239b.

As a specific example, an antenna module may include: a first unit coil (or unit turn) having a first end and a second end; a first interlayer capacitor connected to the second end of the first unit coil in series; and a second unit coil having a first end and a second end, wherein the first end of the second unit coil is connected to the first interlayer capacitor in series. When the antenna module is in a resonance state, the electric potential at the first end of the first unit coil corresponds to the electric potential at the first end of the second unit coil. When the antenna module is in a resonance state, the voltage between the first end and the second end of the first unit coil corresponds to the electric potential between the first end and the second end of the second unit coil. When the antenna module is in a resonance state, the voltage between the first end and the second end of the first unit coil corresponds to the voltage between the first end of the first unit coil and the second end of the second unit coil.

Figure 12:
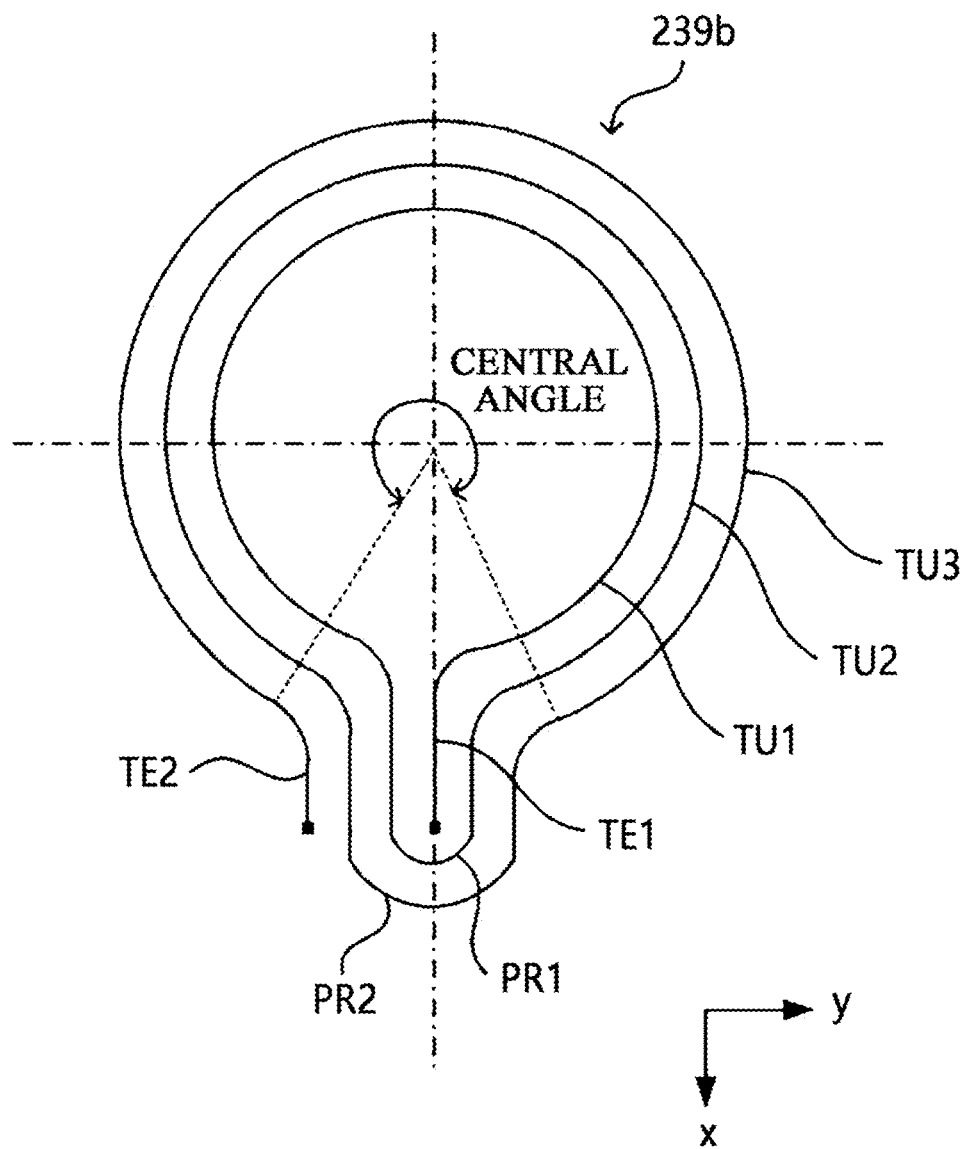
FIG. 12 is a diagram illustrating an antenna module according to an embodiment of the present disclosure.

FIG. 12 is a diagram illustrating the structure of the antenna module shown in (c) of FIG. 11. The antenna module according to an embodiment may include multiple unit coils 239b and interlayer capacitors 239c provided between the multiple unit coils. FIG. 12 shows a unit coil 239b of an antenna module according to an embodiment.

The unit coil 239b may include multiple turns TU1, TU2, and TU3. The unit coil 239b may include: a first terminal TE1; a first turn TU1 connected to the first terminal TE1; a first protrusion PR1 connected to the first turn TU1; a second turn TU2 connected to the first protrusion PR1; a second protrusion PR2 connected to the second turn TU2; a third turn TU3 connected to the second protrusion PR2; and a second terminal TE2 connected to the third turn TU3.

The unit coil 239b may have an opened part opened in one direction (the x-axis direction, see FIG. 12). The first terminal TE1 and the second terminal TE2 of the unit coil 239b may define the opened part opened in one direction.

The turns TU1, TU2, and TU3 may be provided on the same plane. Each of the turns TU1, TU2, and TU3 may have a predetermined central angle. The central angle of each turn may be equal to or greater than 270 degrees. The turns TU1, TU2, and TU3 may be provided to have the same central axis and may have different radii.

Each of the protrusions PR1 and PR2 connects the turns having different radii and may be provided in the shape of letter "U". The first protrusion PR1 may connect one end of the first turn TU1 to one end of the second turn TU2.

The first terminal TE1 or the second terminal TE2 may be connected to the interlayer capacitor 239c or the terminal capacitor 239a. For example, the first terminal TE1 may be connected to the terminal capacitor 239a and the second terminal TE2 may be connected to the interlayer capacitor 239c.

In the meantime, the antenna module may include multiple unit coils 239b. The multiple unit coils may be provided around the central axis of the discharge tube. For example, a first unit coil may be provided such that a protrusion PR protrudes in a first direction with respect to the central axis of the discharge tube. A second unit coil may be provided such that a protrusion PR protrudes in a second direction with respect to the central axis of the discharge tube. The first direction and the second direction may form a predetermined angle with respect to the central axis of the discharge tube. For example, the predetermined angle may be 90 degrees.

Figure 13:
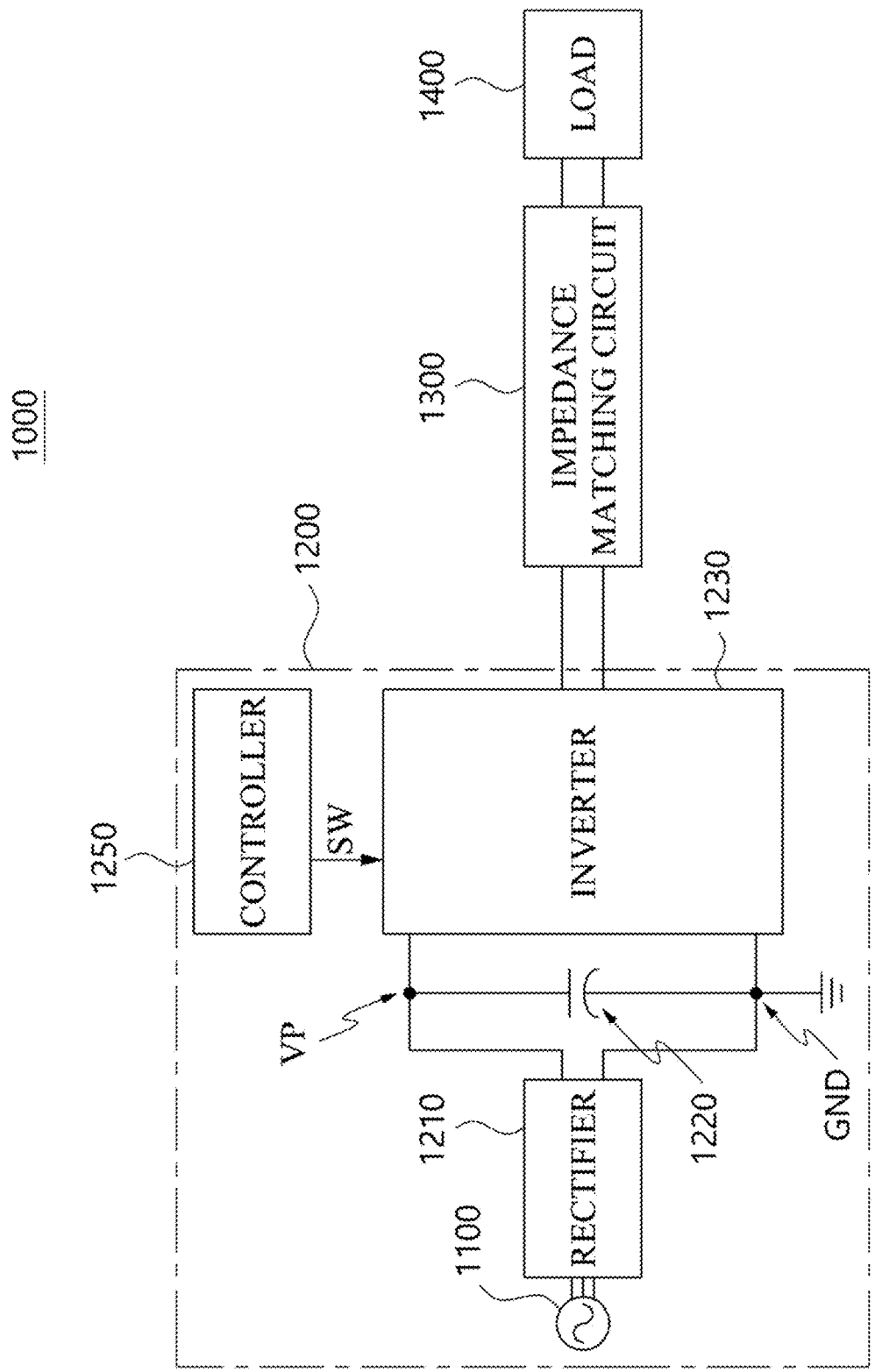
FIG. 13 is a diagram illustrating an RF power source according to an embodiment of the present disclosure.

FIG. 13 is a block diagram illustrating an RF power source according to an embodiment. Referring to FIG. 13, an RF power device 100 according to an embodiment may include an AC power source 1100, a power supply device 1200, and a load 1400.

The AC power source 1100 may be a typical power source of 60 Hz used at home or at industrial sites. The load 1400 may be an electric or electronic device used at home or at industrial sites. The load 1400 may be a device for generating plasma described in the present disclosure.

The power supply device 1200 may convert first AC power into second AC power and may supply the second AC power to the load 1400. For example, the second AC power may have a driving frequency of several hundreds of kHz to several tens of MHz and may provide power of several kW or greater. The power supply device 1200 may include a rectifier 1210, a capacitor 1220, an inverter 1230, an impedance matching circuit 1300, and a controller 1250.

The rectifier 1210 may convert the output of the AC power source 1100 into DC power. The rectifier 1210 may supply the DC power between a ground node GND and a power node VP. The capacitor 1220 may be connected between the power node VP and the ground node GND. The capacitor 1220 may discharge the AC component transmitted to the power node VP to the ground node GND.

The inverter 1230 may receive the DC power from the power node VP and the ground node GND. The inverter 1230 may receive a switching signal SW from the controller 1250. The inverter 1230 may convert the DC power into the second AC power in response to the switching signal SW. The second AC power may be supplied to the load 1400 through the impedance matching circuit 1300. The impedance matching circuit 1300 may provide impedance matching for impedance of the load 1400.

The controller 1250 may transmit a switching signal SW to the inverter 1230. The controller 1250 may control the switching signal SW such that the inverter 1230 converts the DC power into the second AC power. The controller 1250 may control the switching signal SW such that the amount of power supplied from the inverter 1230 to the load 1400 is adjusted.

1.3 Plasma Discharge Operation

According to an embodiment, a method of performing plasma discharge may be provided.

A method of performing plasma discharge according to an embodiment may include: providing a seed charge; and performing plasma discharge. The method of performing plasma discharge may include forming the seed charge inside a discharge tube by applying a high-voltage pulse to a DC electrode through a DC power source. The method of performing plasma discharge may include inducing plasma discharge inside the discharge tube by applying an RF voltage to an antenna module through an RF power source.

Hereinafter, with reference to FIG. 14, operation of a plasma discharge apparatus or a method of performing plasma discharge will be described. Hereinafter, for convenience, description is given for a case of one electrode, a DC electrode, but this is not essential, and the plasma discharge apparatus may further include a counter electrode.

Figure 14:
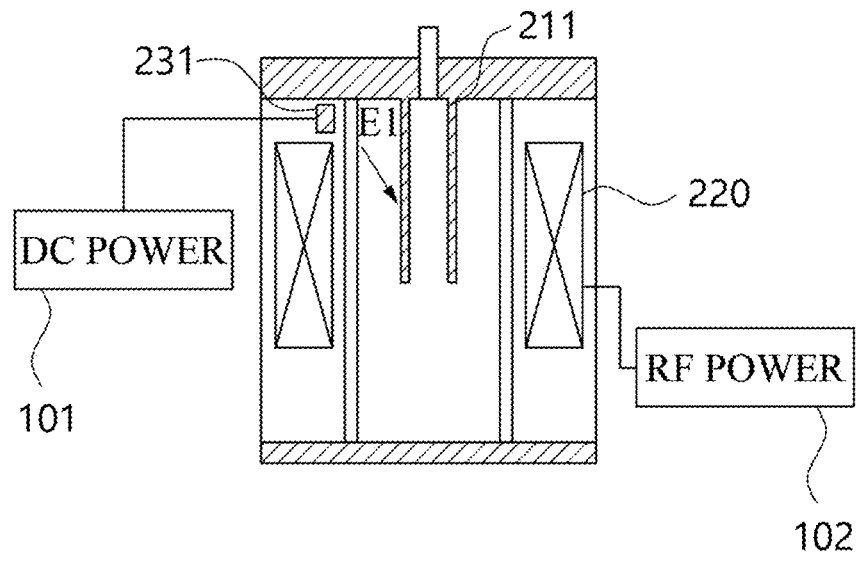
FIG. 14 is a diagram illustrating a plasma generation process according to an embodiment of the present disclosure.
Figure 14:
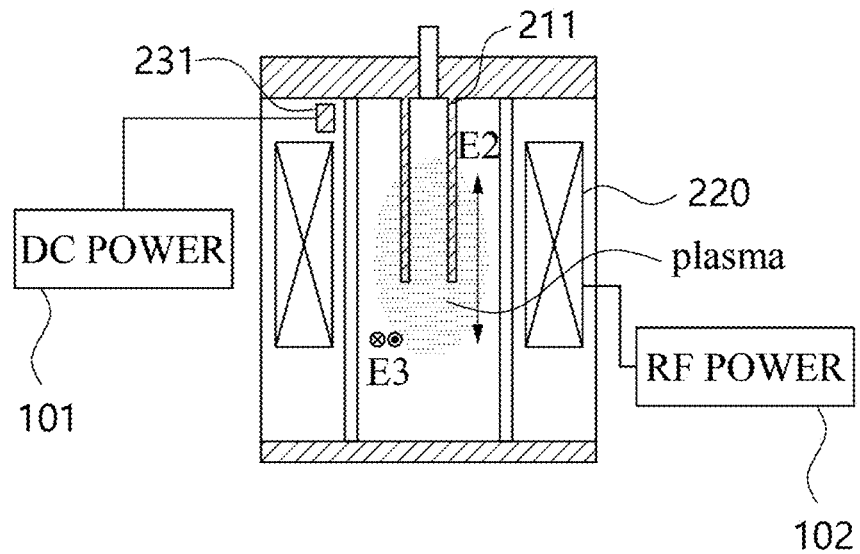

FIG. 14 is a diagram illustrating operation of a plasma discharge apparatus according to an embodiment, in a plasma discharge apparatus described in the present disclosure.

Referring to (a) of FIG. 14, a method of performing plasma discharge may include applying a high voltage to a DC electrode 231 through a DC power source 101 by a plasma discharge apparatus. The method of performing plasma discharge may include applying a high voltage to the DC electrode 231 through the DC power source 101 to form a first electric field E1. The first electric field E1 may be formed between the electrode 231 and the gas tube 211.

The method of performing plasma discharge may include applying a high voltage to the DC electrode 231 through the DC power source 101 by the plasma discharge apparatus to form a seed charge inside a discharge tube. The method of performing plasma discharge may include applying a high voltage to the DC electrode 231, forming a high-density electric field between the DC electrode 231 and the gas tube 211, and inducing concentration of electric charges, thereby forming the seed charge.

Referring to (b) of FIG. 14, the method of performing plasma discharge may include applying an RF voltage to an antenna module 220 through an RF power source 102.

The method of performing plasma discharge may including applying an RF voltage to the antenna module 220 through the RF power source 102 to form a second electric field E2 inside the discharge tube. The method of performing plasma discharge may include applying an RF voltage to the antenna module 220 through the RF power source 102 and forming the second electric field E2 to generate a seed charge and/or plasma. The method of performing plasma discharge may include forming the second electric field E2 to generate capacitively coupled plasma.

The second electric field E2 may be formed to be parallel to the axis of the discharge tube. The second electric field E2 may be formed to be parallel to a length direction of an induction coil of the antenna module 220.

The method of performing plasma discharge may include applying an RF voltage to the antenna module 220 through the RF power source 102 to form a third electric field E3 inside the discharge tube. The method of performing plasma discharge may include forming the third electric field E3 inside the discharge tube to generate plasma inside the discharge tube. The method of performing plasma discharge may include applying an RF voltage to the antenna module 220 through the RF power source 102 and forming the third electric field E3 to generate a seed charge and/or plasma.

The third electric field E3 may be formed in a direction parallel to the induction coil of the antenna module. The third electric field E3 may be formed to be parallel to the circumferential direction of the discharge tube.

2. Ignition Assistance Embodiment

As described above, in the case in which initial discharge (ignition) of plasma is performed by applying a DC voltage and supplying a seed charge, plasma generation is easily performed.

However, supply of the seed charge through application of the DC voltage is based on electric charge gathering through formation of a capacitive electric field, and may cause damage to the device in some cases. For example, an electric field formed by a DC voltage is directed toward an inner wall or other structures of a gas tube, so particles or electrons accelerated by the electric field may collide with the inner wall of the gas tube. Such unintentional collision may cause damage to the inner wall or other structures of the gas tube and production of impurities such as particles. The damage to the device leads to deterioration of the device and a bad influence on the device. The production of impurities is a factor that degrades the quality of active species generated by the device.

However, depending on a type of gas, the formation alone of an induced electric field (or capacitive electric field) through an RF power source and an antenna module may not sufficiently create the environment in which initial discharge of plasma is to occur. On the other hand, under a particular discharge condition, the formation alone of an induced electric field (or capacitive electric field) through the RF power source and the antenna module may achieve initial discharge of plasma smoothly without application of a DC voltage through a DC power source.

Therefore, there is a need for a method of assisting initial discharge of plasma while minimizing damage to the device and production of particles by appropriately changing whether a DC voltage is applied, the intensity of a DC high-voltage pulse, or the intensity of an RF voltage, according to a plasma discharge state.

Hereinafter, a device for generating plasma and/or a method of controlling a device for generating plasma according to several embodiments will be described, the device and the method assisting plasma generation by controlling output of a DC high-voltage pulse and/or AC power. Hereinafter, to achieve the above objective, a plasma device and/or a method of controlling the plasma device will be described, the device and the method applying a DC voltage and/or an RF voltage in stages based on change in a status of plasma.

A method of controlling a device for generating plasma described in the present disclosure may be performed by the device for generating plasma or a controller embedded in the device for generating plasma. The device for generating plasma may perform the method of controlling the device for generating plasma described in the present disclosure, or may include the controller performing the method.

In addition, it is apparent to those skilled in the art that a method of controlling a device for generating plasma corresponding to an embodiment of a device for generating plasma described in the present disclosure may be provided and a device for generating plasma corresponding to an embodiment of a method of controlling a device for generating plasma described in the present disclosure may be provided.

2.1 Device

Figure 15:
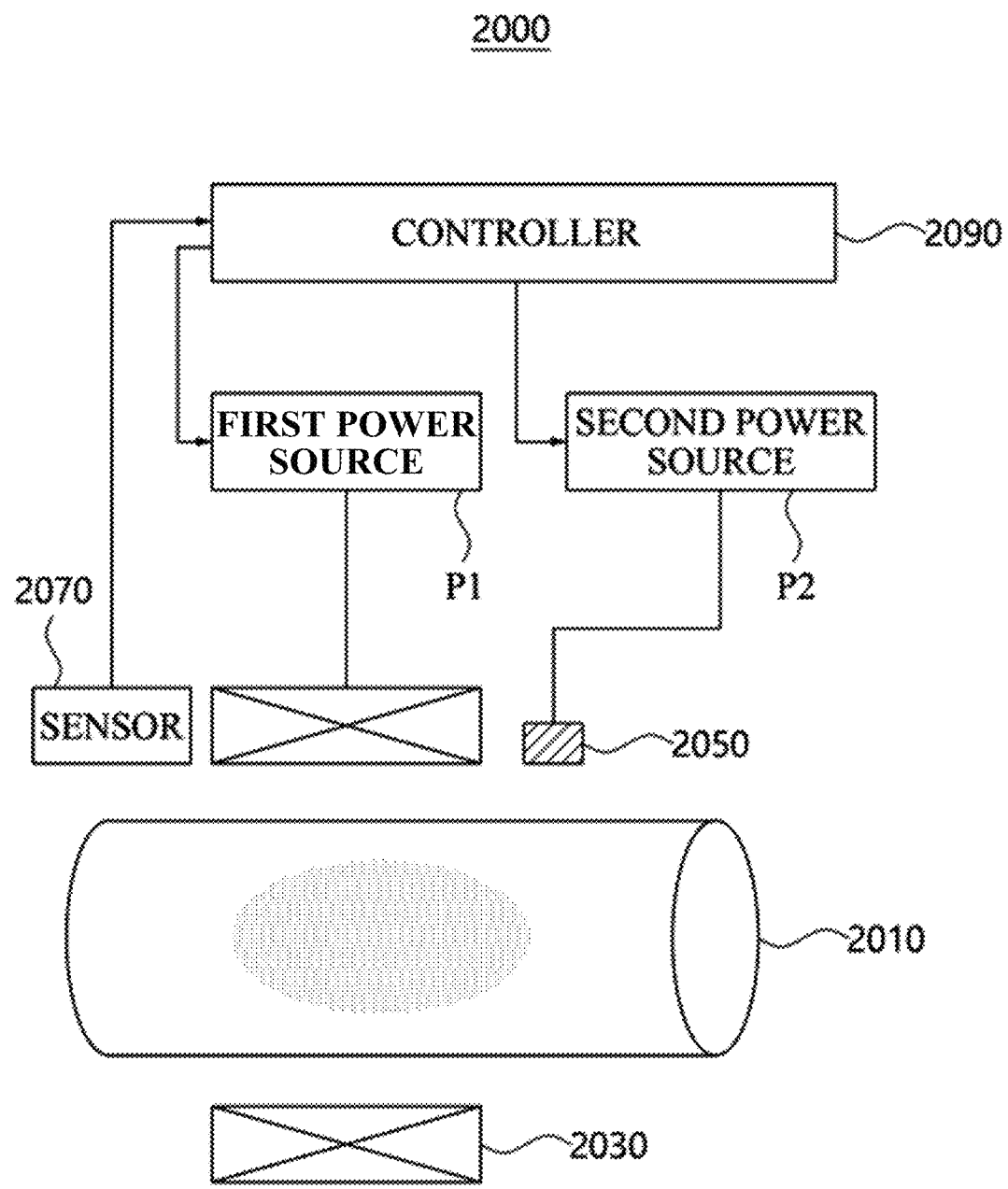
FIG. 15 is a diagram illustrating a device for generating plasma according to an embodiment of the present disclosure.

FIG. 15 is a diagram illustrating a device for generating plasma according to an embodiment.

Referring to FIG. 15, a device 2000 for generating plasma according to an embodiment may include: a chamber 2010 providing a generating space for the plasma; an antenna module 2030 located near the chamber 2010 and receiving power from a first power source P1; an electrode 2050 located near the chamber 2010 and receiving power from a second power source P2; a sensor 2070; and a controller 2090 controlling the first power source P1 and the second power source P2.

The antenna module 2030 may be provided near the chamber, may be connected to the first power source, and may form an induced electric field inside the chamber. The electrode 2050 may be provided near the chamber, may be connected to the second power source, and may assist plasma generation.

The sensor 2070 may obtain sensing information related to a status of plasma. The sensor 2070 may obtain power, current, or voltage, at one location in the device for generating plasma. For example, the sensor 2070 may obtain the sensing information indicating the power supplied to a load by the first power source. The sensor 2070 may obtain the sensing information indicating the current flowing through a load and/or the voltage applied to a load by the first power source.

The controller 2090 may provide AC power (or an AC voltage or RF power) to the antenna module 2030 through the first power source P1. The controller 2090 may generate a switching signal for controlling an inverter of the first power source P1, and may transmit the switching signal to the first power source P1 to control the output of the first power source P1.

The controller 2090 may apply a high-voltage pulse to the electrode 2050 through the second power source P2. The controller 2090 may generate a pulse control signal for controlling a pulse generator of the second power source P2, and may transmit the pulse control signal to the second power source P2 to control the second power source P2.

The controller 2090 may obtain sensing information related to a status of plasma through the sensor 2070. The controller 2090 may obtain the sensing information through the sensor 2070, and may change the operation state of the first power source P1 and/or the second power source P2 based on the obtained sensing information.

According to an embodiment, when the sensing information does not satisfy a predetermined condition at a second time point, the controller 2090 applies a high-voltage pulse of a first voltage to the electrode through the second power source. When the sensing information does not satisfy the predetermined condition at a third time point after the second time point, the controller 2090 applies a high-voltage pulse of a second voltage higher than the first voltage to the electrode through the second power source.

According to another embodiment, when the sensing information does not satisfy the predetermined condition at the second time point, the controller 2090 applies a high-voltage pulse to the electrode in a first period. When the sensing information does not satisfy the predetermined condition at a third time point that is after a first time from the second time point, the controller 2090 applies the high-voltage pulse to the electrode in a second period which is shorter than the first period.

According to still another embodiment, the controller 2090 applies an RF voltage of a first magnitude to the load, starting from a first time point. When the sensing information does not satisfy the predetermined condition at a third time point that is after the first time point and before the second time point, the controller 2090 applies an RF voltage of a second magnitude greater than the first magnitude to the load.

In the meantime, when the sensing information does not satisfy the predetermined condition at the second time point, the controller 2090 applies a high-voltage pulse of a first voltage to the electrode through the second power source. When the sensing information satisfies the predetermined condition at a third time point later than the second time point, the controller 2090 stops applying the high-voltage pulse.

2.2 Control Method

Figure 16:
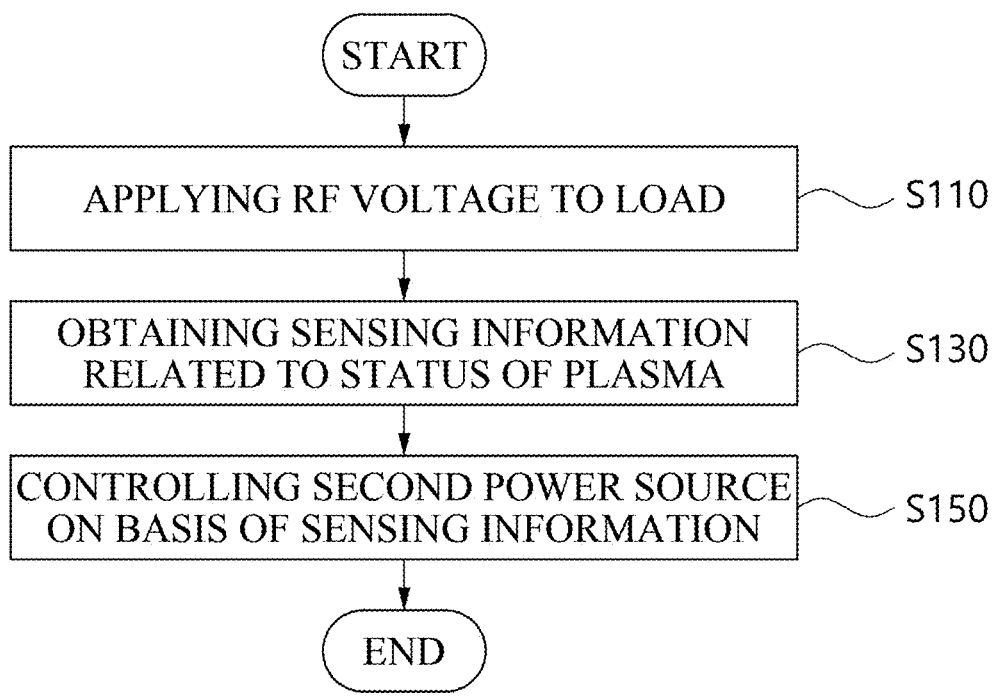
FIG. 16 is a diagram illustrating a plasma generation process according to an embodiment of the present disclosure.

FIG. 16 is a diagram illustrating a method of controlling a device for generating plasma according to an embodiment.

Referring to FIG. 16, a method of controlling a device for generating plasma according to an embodiment may include: applying an RF voltage to a load at step S110; obtaining sensing information related to a status of plasma at step S130; and controlling a second power source based on the sensing information at step S150.

According to an embodiment, there is provided a method of controlling a device 2000 for generating plasma, the device including: a chamber 2010 providing a generating space for the plasma; an antenna module 2030 located near the chamber 2010 and receiving power from a first power source P1; an electrode 2050 located near the chamber 2010 and receiving power from a second power source P2; a sensor 2070; and a controller 2090 controlling the first power source P1 and the second power source P2.

The applying of the RF voltage to the load at step S110 may include applying, by the controller 2090, the RF voltage to the load including the antenna module through the first power source P1, starting from a first time point.

The obtaining of the sensing information related to the status of plasma at step S130 may include obtaining, by the controller 2090, the sensing information related to the status of plasma according to the RF voltage.

The controlling of the second power source P2 based on the sensing information at step S150 may include controlling, by the controller 2090, the second power source P2 based on the sensing information, starting from a second time point that is after a predetermined time from the first time point.

The controlling of the second power source P2 by the controller 2090 at step S150 may include operating according to the predetermined condition wherein when the sensing information indicates that plasma is not generated inside the chamber, the controller 2090 applies a pulse to the electrode 2050 through the second power source P2, or when the sensing information indicates that plasma is generated inside the chamber, the controller 2090 does not apply the pulse to the electrode 2050.

According to an embodiment, the controlling of the second power source P2 by the controller 2090 at step S150 may include not applying, by the controller 2090, a high-voltage pulse to the electrode 2050 through the second power source P2 when the sensing information satisfies a predetermined condition at the second time point, or applying the high-voltage pulse to the electrode 2050 through the second power source P2 when the sensing information does not satisfy the predetermined condition at the second time point. In this regard, a detailed description will be given in Embodiment 1 below.

The controller 2090 may obtain, through the sensor 2070, sensing information related to the power supplied from the first power source P1 to the load. Herein, the controlling of the second power source P2 by the controller 2090 may include applying a pulsed voltage to the electrode 2050 when the sensing information indicates that the power supplied to the load is equal to or less than a reference power at the second time point, or not applying the pulsed voltage to the electrode 2050 when the sensing information indicates that the power supplied to the load is equal to or greater than the reference power at the second time point.

According to an embodiment, the first power source P1 includes a DC power source and an inverter converting DC power into RF power. The sensor 2070 is located between the DC power source and the inverter of the first power source P1, and may obtain a first voltage output by the DC power source and a first current output from the DC power source. Herein, the controlling of the second power source P2 by the controller 2090 may include controlling, by the controller 2090, the second power source P2 based on the power supplied to the load, wherein the power is determined based on the first voltage and the first current.

According to an embodiment, the sensor 2070 may obtain sensing information related to a second current flowing through the antenna module 2030. The controlling of the second power source P2 by the controller 2090 may include: acquiring the sensing information by the controller; and applying, by the controller, the pulsed voltage to the electrode when a phase difference between the second current and the RF voltage does not satisfy the predetermined condition at the second time point, or not applying the pulsed voltage to the electrode when the phase difference between the second current and the RF voltage satisfies the predetermined condition at the second time point.

The method of controlling a device for generating plasma may include applying, when plasma is not generated in response to applying a unit pulse to the electrode, a unit pulse of an increased voltage to the electrode.

According to an embodiment, the controlling of the second power source by the controller 2090 may further include: applying, by the controller, a high-voltage pulse of a first voltage to the electrode through the second power source when the sensing information does not satisfy the predetermined condition at the second time point, or not applying the high-voltage pulse to the electrode when the sensing information satisfies the predetermined condition; and applying, by the controller, a high-voltage pulse of a second voltage higher than the first voltage to the electrode through the second power source when the sensing information does not satisfy the predetermined condition at a third time point after the second time point.

The method of controlling a device for generating plasma may further include stopping the operation of the second power source when plasma discharge is generated, that is, when sensing information related to plasma discharge is obtained.

According to an embodiment, the controlling of the second power source by the controller 2090 may include: applying, by the controller 2090, a high-voltage pulse of a first voltage to the electrode through the second power source when the sensing information does not satisfy the predetermined condition at the second time point; and stopping, by the controller 2090, applying the high-voltage pulse when the sensing information satisfies the predetermined condition at a third time point after the second time point.

The method of controlling a device for generating plasma may include applying, when plasma is not generated in response to applying a unit pulse to the electrode, a unit pulse to the electrode at reduced time intervals.

According to an embodiment, the controlling of the second power source by the controller may further include: applying a high-voltage pulse to the electrode in a first period when the sensing information does not satisfy the predetermined condition at the second time point; and applying the high-voltage pulse to the electrode in a second period which is shorter than the first period when the sensing information does not satisfy the predetermined condition at a third time point that is after a first time from the second time point.

In the meantime, in the above embodiment, a description is given for the case in which the method of controlling a device for generating plasma includes controlling the second power source P2 based on the sensing information at step S150, but the content of the invention described in the present disclosure is not limited thereto. For example, the method of controlling a device for generating plasma may include controlling the first power source P1 based on the sensing information.

The method of controlling a device for generating plasma according to an embodiment may include applying, when plasma is not generated in response to applying a unit pulse to the electrode, an RF voltage to the antenna module with increased amplitude.

According to an embodiment, the applying of the RF voltage to the load through the first power source by the controller may further include: applying an RF voltage of a first magnitude to the load, starting from the first time point; and applying an RF voltage of a second magnitude greater than the first magnitude to the load when the sensing information does not satisfy the predetermined condition at a third time point that is after the first time point and before the second time point.

2.3 DC High-Voltage Application Modulation

According to an embodiment, a device for generating plasma may determine whether to apply a DC high-voltage pulse based on a predetermined condition. According to a status of plasma, whether to apply a DC high-voltage pulse may be determined. The device for generating plasma may determine whether to apply a DC high-voltage pulse according to whether plasma ignition (or generation) is performed.

As a specific example, the method of controlling a device for generating plasma may include applying an RF voltage to an antenna module to induce initial discharge, and assisting initial discharge by applying a high-voltage pulse to an electrode when initial discharge (or ignition) is not generated within a predetermined time. As described, a device for generating plasma applies an RF voltage to the antenna module first, and applies a high-voltage pulse to the electrode only when initial discharge is not generated, thereby inhibiting damage to the device or production of fine particles caused by the high-voltage pulse.

As another specific example, after applying a unit high-voltage pulse to the electrode at least one time, the device for generating plasma determines whether a predetermined condition related to plasma generation is satisfied, and changes an output state of the high-voltage pulse when the condition is not satisfied (that is, when plasma is not generated). For example, the device for generating plasma or the controller thereof is configured to: apply an RF voltage to the antenna module through the first power source, starting from a first time point; output a first power by applying the high-voltage pulse to the electrode through the second power source when sensing information does not satisfy a predetermined condition at a second time point (or after the second time point) after the first time point; and output a second power greater than the first power by applying the high-voltage pulse to the electrode through the second power source when the sensing information does not satisfy the predetermined condition at a third time point after the second time point. The outputting of the second power greater than the first power by applying the high-voltage pulse to the electrode by the device for generating plasma may include increasing the voltage of the high-voltage pulse or increasing the number of high-voltage pulses.

2.3.1 Embodiment 1

According to an embodiment, there is provided a device for generating plasma, wherein the device applies an RF voltage to an antenna module, obtains sensing information related to a status of plasma, and applies a high-voltage pulse to an electrode when the sensing information does not satisfy a predetermined condition within a predetermined time. According to an embodiment, a method of controlling a device for generating plasma may include applying a high-voltage pulse to an electrode when plasma generation is not detected.

The device for generating plasma or the controller thereof is configured to: apply an RF voltage to a load including the antenna module through a first power source, starting from a first time point; obtaining the sensing information related to the status of plasma according to the RF voltage; and controlling a second power source based on the sensing information, starting from a second time point that is after a predetermined time from the first time point.

The device for generating plasma or the controller thereof may obtain sensing information after the first time point. The device for generating plasma or the controller thereof may obtain, after the first time point, sensing information related to a status of plasma to which a change caused by the RF voltage applied after the first time point is applied. The device for generating plasma or the controller thereof may control the second power source based on sensing information obtained after the second time point that is after the predetermined time from the first time point. The device for generating plasma or the controller thereof may control the second power source based on the sensing information obtained after the second time point.

The device for generating plasma or the controller thereof applies a pulsed voltage to the electrode through the second power source when the sensing information does not satisfy the predetermined condition at the second time point, or does not apply the pulsed voltage to the electrode through the second power source when the sensing information satisfies the predetermined condition at the second time point.

The device for generating plasma or the controller thereof may operate according to the predetermined condition wherein when the sensing information indicates that plasma is not generated inside the chamber, the controller applies the pulse to the electrode through the second power source, or when the sensing information indicates that the plasma is generated inside the chamber, the controller does not apply the pulse to the electrode.

The device for generating plasma or the controller thereof applies the pulsed voltage to the electrode when the sensing information indicates that the power supplied to the load is equal to or less than a reference power at the second time point, or does not apply the pulsed voltage to the electrode when the sensing information indicates that the power supplied to the load is equal to or greater than the reference power at the second time point.

According to an embodiment, the first power source may include a DC power source and an inverter converting DC power into RF power. A sensor may be located between the DC power source and the inverter of the first power source, and may obtain a first voltage output by the DC power source and a first current output from the DC power source.

The controller may apply the pulsed voltage to the electrode based on the power supplied to the load, wherein the power is determined based on the first voltage and the first current.

For example, the device for generating plasma may obtain, through the sensor, a power value supplied to the load from the first power source, and may control the second power source based on whether the obtained power value exceeds a predetermined condition value. The device for generating plasma applies a high-voltage pulse to the electrode through the second power source when the obtained power value does not exceed the predetermined condition value, or does not apply a high-voltage pulse to the electrode through the second power source when the obtained power value exceeds the predetermined condition value. Alternatively, the device for generating plasma may control the second power source based on whether the obtained power value exceeds a predetermined ratio.

According to another embodiment, the sensor may obtain the sensing information based on the second current flowing through the antenna module.

The controller obtains the sensing information and applies the pulsed voltage to the electrode when a phase difference between the second current and the RF voltage does not satisfy a predetermined condition at the second time point, or does not apply the pulsed voltage to the electrode when the phase difference between the second current and the RF voltage satisfies the predetermined condition at the second time point.

For example, the device for generating plasma may obtain, through the sensor, phase information of the current flowing through the antenna module, may obtain phase information of the voltage applied to the antenna module from a switching signal generated by the controller, and may determine whether the predetermined condition is satisfied, based on the phase information of the current flowing through the antenna module and the phase information of the voltage applied to the antenna module.

Figure 17:
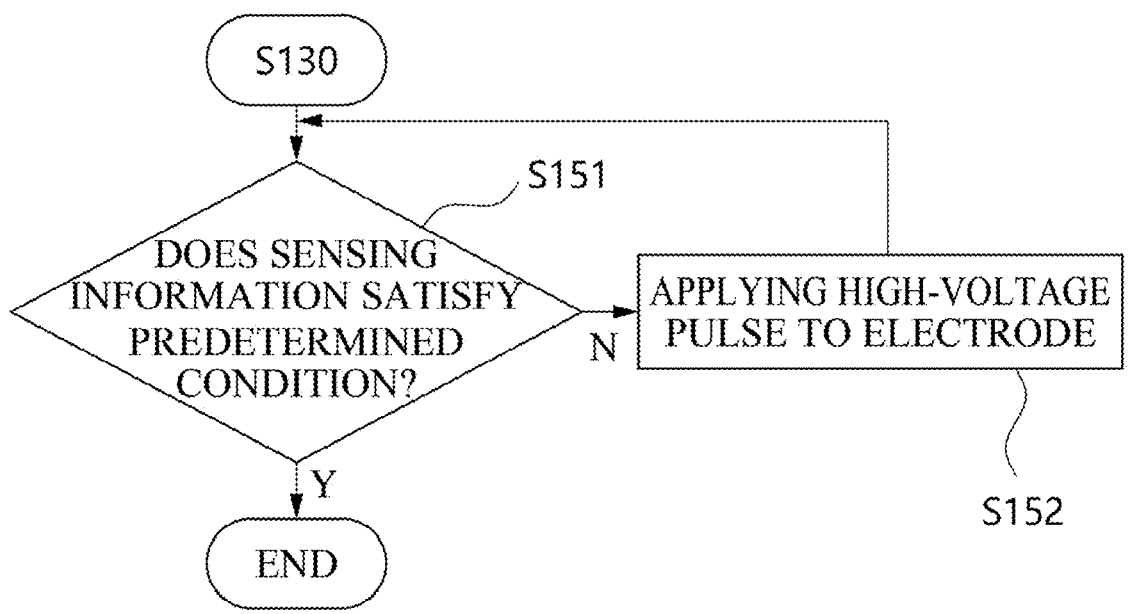
FIG. 17 is a diagram illustrating a plasma generation process according to an embodiment of the present disclosure.

FIG. 17 is a diagram illustrating a method of controlling a device for generating plasma according to an embodiment.

Referring to FIG. 17, a method of controlling a device for generating plasma according to an embodiment may include: applying an RF voltage to a load at step S110; obtaining sensing information related to a status of plasma at step S130; determining whether the sensing information satisfies a predetermined condition at step S151; and applying a high-voltage pulse to an electrode when the sensing information does not satisfy the predetermined condition at step S152.

The method of controlling a device for generating plasma may include: applying the RF voltage to the antenna module; obtaining the sensing information through a sensor at predetermined time intervals; and changing an operation state of a second power source including a pulse generator, based on the sensing information. For example, the method of controlling a device for generating plasma may include: applying the RF voltage to the antenna module; obtaining the sensing information through a sensor at predetermined time intervals; and changing an operation state of a second power source including a pulse generator, based on the sensing information.

Figure 18:
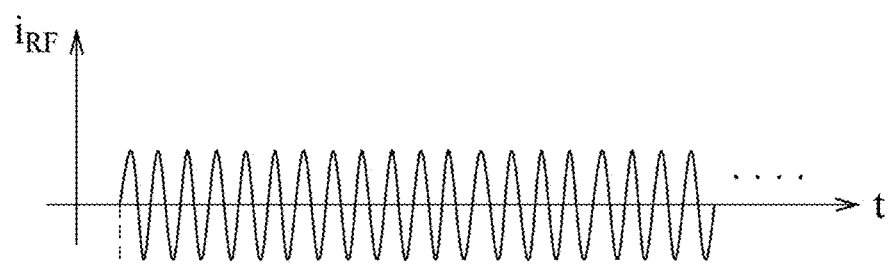
FIG. 18 is a diagram illustrating output of an output current and a high-voltage pulse according to a method of controlling a device for generating plasma according to an embodiment of the present disclosure.
Figure 18:
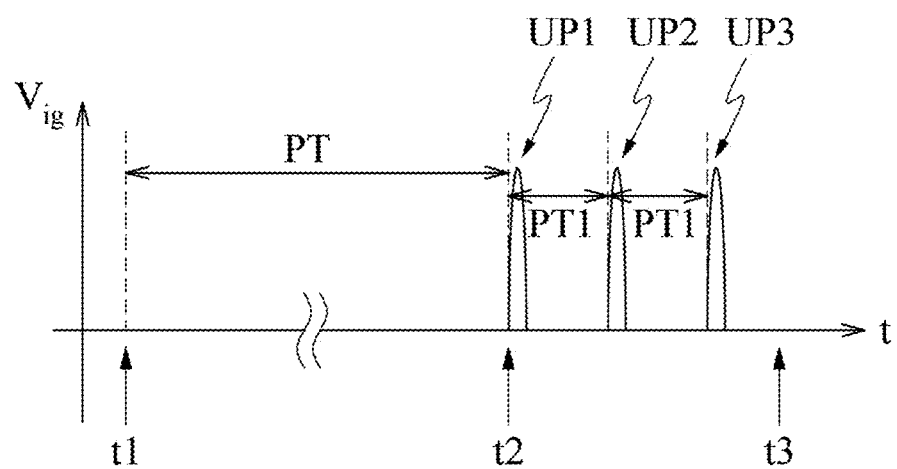

FIG. 18 is a diagram illustrating output of an output current and a high-voltage pulse according to a method of controlling the device 2000 for generating plasma according to an embodiment. Hereinafter, the output of an output current and a high-voltage pulse shown in FIG. 18 will be described with reference to FIG. 15.

(a) of FIG. 18 shows an output current $i_{RF}$ flowing through the antenna module (or load) according to a method of controlling the device 2000 for generating plasma according to an embodiment. The output current $i_{RF}$ may be a current flowing through the load or the antenna module as the device 2000 for generating plasma drives the first power source P1 (AC power source). The output current $i_{RF}$ may be an AC current measured at the antenna module (or load) as the device for generating plasma applies an AC voltage to the antenna module through the AC power source.

The method of controlling the device 2000 for generating plasma according to an embodiment may include applying an AC voltage to the antenna module 2030 through the first power source P1. Referring to (a) and (b) of FIG. 18, the method of controlling the device for generating plasma 200 may include applying an AC voltage to the antenna module 2030, starting from a first time point t1. The method of controlling the device 2000 for generating plasma may include: applying an AC voltage to the antenna module 2030 through the first power source P1, starting from the first time point; and obtaining the output current $i_{RF}$ flowing through the antenna module 2030.

The method of controlling the device 2000 for generating plasma according to an embodiment may include applying a high-voltage pulse to the electrode 2050 through the second power source P2. (b) FIG. 18 shows a waveform of a high-voltage pulse $V_{ig}$ according to a method of controlling the device 2000 for generating plasma according to an embodiment. Referring to (b) of FIG. 18, the method of controlling the device 2000 for generating plasma may include applying a high-voltage pulse to the electrode 2050 through the second power source P2 in a predetermined period. The method of controlling the device 2000 for generating plasma may include applying a high-voltage pulse to the electrode 2050 in a predetermined period (in the following example, a first time interval PT1) until plasma generation is detected after a second time point t2.

Referring to (b) of FIG. 18, the method of controlling the device 2000 for generating plasma according to an embodiment may include applying a high-voltage pulse to the electrode 2050, starting from the second time point t2 that is after a predetermined time PT from the first time point t1. The method of controlling the device 2000 for generating plasma may include applying a first unit pulse UP1 to the electrode 2050 at the second time point t2 (or at least after the second time point t2).

The method of controlling the device 2000 for generating plasma may include: obtaining information indicating whether plasma is generated, through a power sensor, a current sensor, or a voltage sensor; and controlling the second power source P2 based on the obtained information. The method of controlling the device 2000 for generating plasma may include determining whether to apply a high-voltage pulse, based on the information obtained through the sensor 2070.

The method of controlling the device 2000 for generating plasma may include applying the first unit pulse UP1 to the electrode 2050 at least after the second time point t2 when plasma is not generated inside the chamber 2010 at the second time point t2 in response to applying the AC voltage to the antenna module 2030 through the first power source P1, starting from the first time point t1.

The method of controlling the device 2000 for generating plasma may include: applying the first unit pulse UP1 to the electrode 2050 at the second time point t2; and applying a second unit pulse UP2 to the electrode 2050 after the first time interval PT1 from the second time point t2.

The method of controlling the device 2000 for generating plasma may include applying the second unit pulse UP2 to the electrode 2050 after the first time interval PT1 from the second time point t2 when plasma is not generated after the first unit pulse UP1 is applied to the electrode 2050 at the second time point t2. The method of controlling the device 2000 for generating plasma may include: applying the first unit pulse UP1 to the electrode 2050 at the second time point t2; and applying the second unit pulse UP2 to the electrode 2050 after the first time interval PT1 from the second time point t2 when plasma discharge is not generated in response to applying the first unit pulse UP1.

The method of controlling the device 2000 for generating plasma may include: applying the second unit pulse UP2; and applying a third unit pulse UP3 to the electrode 2050 after the first time interval PT1 from the time when the second unit pulse UP2 is applied.

The method of controlling the device 2000 for generating plasma may include stopping applying a high-voltage pulse. The method of controlling the device 2000 for generating plasma may include stopping applying a high-voltage pulse to the electrode 2050 when plasma generation inside the chamber 2010 is detected. Referring to (b) of FIG. 18, the method of controlling the device 2000 for generating plasma may include: applying the third unit pulse UP3; and stopping applying a high-voltage pulse to the electrode 2050 in response to plasma generation inside the chamber 2010.

The method of controlling the device 2000 for generating plasma may include stopping applying a high-voltage pulse based on a value obtained through a power sensor, a current sensor, or a voltage sensor. That is, the method of controlling the device 2000 for generating plasma may include: obtaining a measurement value indicating a status of plasma through the sensor 2070; and stopping applying a high-voltage pulse in response to obtaining the measurement value indicating that plasma is generated.

2.3.2 Embodiment 2

According to an embodiment, there is provided a device for generating plasma, wherein the device obtains sensing information related to a status of plasma, and increases a voltage of a pulse applied to an electrode when the sensing information does not satisfy a predetermined condition. According to an embodiment, a method of controlling a device for generating plasma may include increasing a voltage of a pulse applied to an electrode when plasma generation is not detected.

Figure 19:
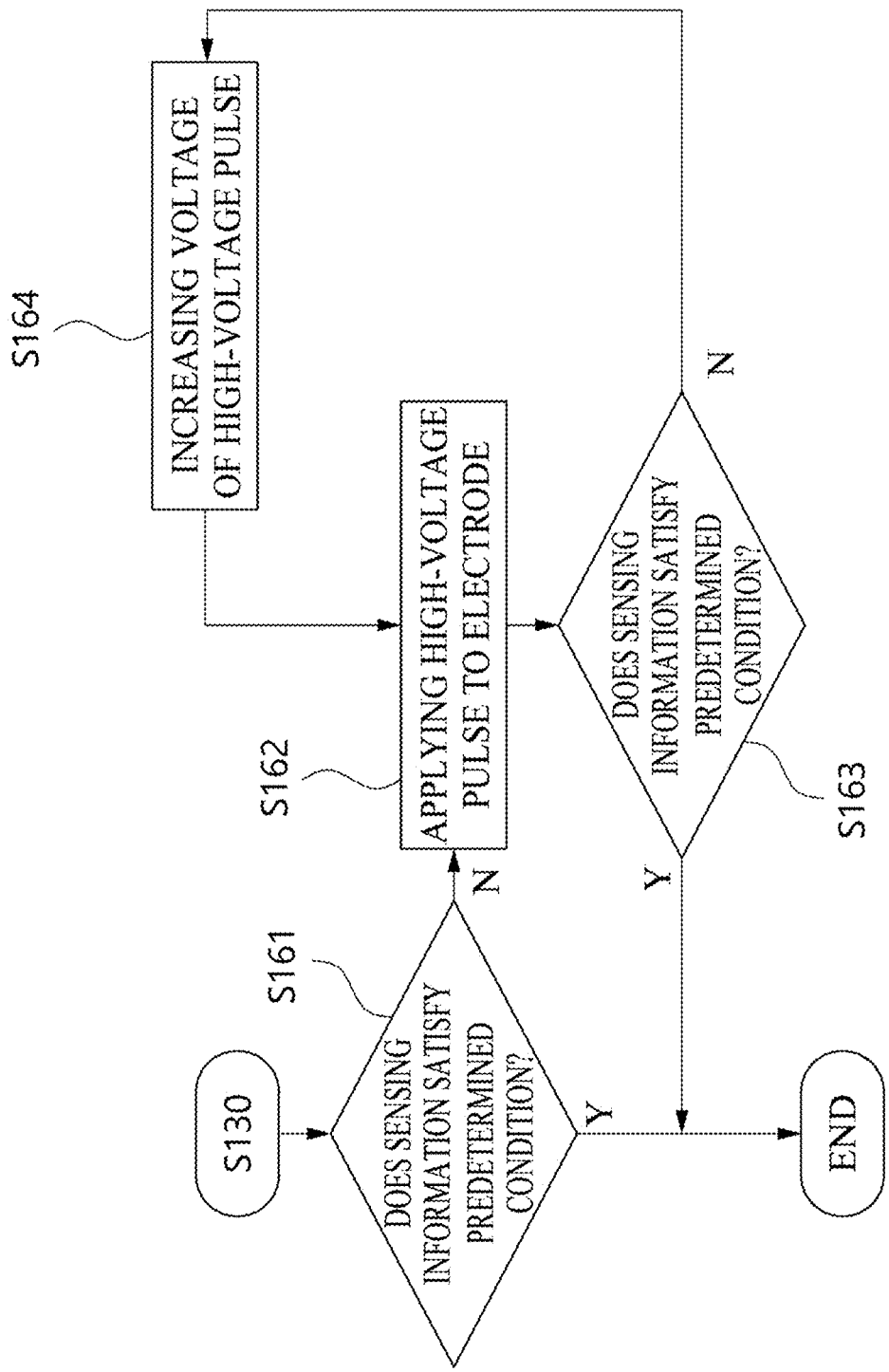
FIG. 19 is a diagram illustrating a plasma generation process according to an embodiment of the present disclosure.

FIG. 19 is a diagram illustrating a method of controlling a device for generating plasma according to an embodiment. The content of FIG. 16 may be similarly applied to a method of controlling a device for generating plasma described with reference to FIG. 19.

Referring to FIG. 19, a method of controlling a device for generating plasma according to an embodiment may include: after obtaining sensing information related to a status of plasma at step S130 as described above, determining whether the sensing information satisfies a predetermined condition at step S161; applying a high-voltage pulse to an electrode at step S162 when the sensing information does not satisfy the predetermined condition; obtaining sensing information again after applying the high-voltage pulse to the electrode, and determining whether the obtained sensing information satisfies the predetermined condition at step S163; and increasing a voltage of the high-voltage pulse at step S164.

The method of controlling a device for generating plasma may include: obtaining sensing information periodically; and determining whether the obtained sensing information satisfies the predetermined condition. The method of controlling a device for generating plasma may include: periodically determining whether sensing information satisfies the predetermined condition; and increasing a voltage value of the high-voltage pulse when the sensing information does not satisfy the predetermined condition.

Referring to FIG. 19, the method of controlling a device for generating plasma may include performing the following repeatedly: applying a high-voltage pulse to an electrode at step S162 when obtained sensing information does not satisfy the predetermined condition; obtaining sensing information again after applying the high-voltage pulse to the electrode, and determining whether the obtained sensing information satisfies the predetermined condition at step S163; and increasing a voltage of the high-voltage pulse at step S164.

Figure 20:
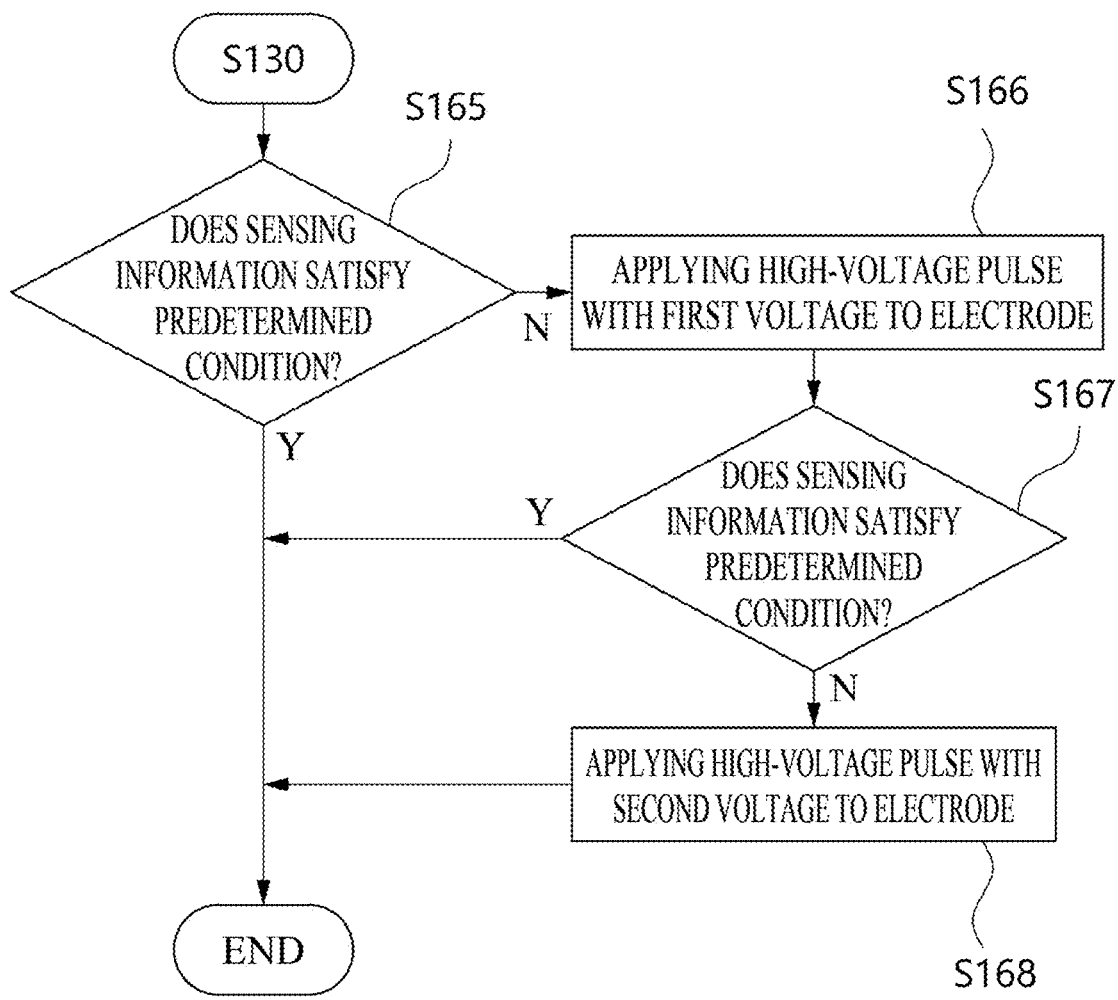
FIG. 20 is a diagram illustrating a plasma generation process according to an embodiment of the present disclosure.

FIG. 20 is a diagram illustrating output of an RF current and a high-voltage pulse according to a method of controlling a device for generating plasma according to an embodiment.

Referring to FIG. 20, the method of controlling a device for generating plasma according to an embodiment may include: after obtaining sensing information related to a status of plasma at step S130 as described above, determining whether the sensing information satisfies a predetermined condition at step S165; applying a high-voltage pulse of a first voltage to an electrode at step S166 when the sensing information does not satisfy the predetermined condition; determining whether the sensing information satisfies the predetermined condition at step S167; and applying a high-voltage pulse of a second voltage to the electrode at step S168.

Referring to FIG. 20, the method of controlling a device for generating plasma may include: obtaining first sensing information at a first time point at step S130; applying a high-voltage pulse of a first voltage to an electrode through a second power source at step S166 when the obtained first sensing information does not satisfy a predetermined condition; obtaining (not shown) second sensing information at a second time point after the first time point; applying a high-voltage pulse of a second voltage higher than the first voltage to the electrode through the second power source at step S168 when the obtained second sensing information does not satisfy the predetermined condition.

Figure 21:
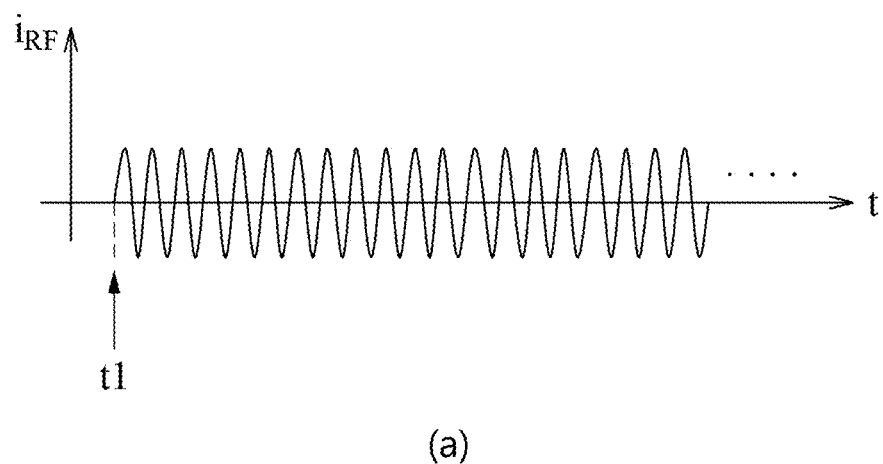
FIG. 21 is a diagram illustrating output of an output current and a high-voltage pulse according to a method of controlling a device for generating plasma according to an embodiment of the present disclosure.
Figure 21:
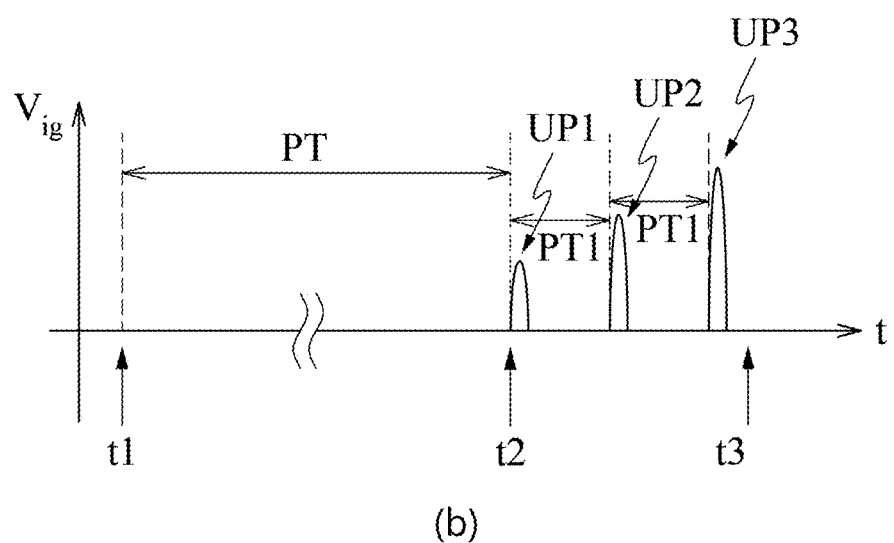

FIG. 21 is a diagram illustrating output of an output current and a high-voltage pulse according to a method of controlling the device 2000 for generating plasma according to an embodiment. Hereinafter, referring to the device 2000 for generating plasma shown in FIG. 15, an RF current and a high-voltage pulse output by the device 2000 for generating plasma according to an embodiment will be described.

(a) of FIG. 21 shows an output current $i_{RF}$ flowing through the antenna module (or load) according to a method of controlling the device 2000 for generating plasma according to an embodiment. A method of controlling the device 2000 for generating plasma according to an embodiment may include applying an AC voltage to an antenna module 2030 through a first power source P1, starting from a first time point t1. The content described with reference to FIG. 18 may be similarly applied to the device 2000 for generating plasma or the operation of the device 2000 for generating plasma, the device generating the output current $i_{RF}$ or applying an AC voltage to the antenna module 2030.

Referring to (b) of FIG. 21, the method of controlling the device 2000 for generating plasma according to an embodiment may include applying a high-voltage pulse to the electrode 2050 through the second power source P2. Regarding the operation of applying a high-voltage pulse, the content described with reference to FIG. 18 may be similarly applied unless otherwise specially described.

According to an embodiment, the method of controlling the device 2000 for generating plasma may include applying a high-voltage pulse to the electrode 2050 in a predetermined period (in the following example, a first time interval PT1) until plasma generation is detected after a second time point t2. Herein, the intensity of the applied unit high-voltage pulse may be changed.

The method of controlling the device 2000 for generating plasma may include: obtaining information indicating whether plasma is generated, through a power sensor, a current sensor, or a voltage sensor; and controlling the second power source P2 based on the obtained information. The method of controlling the device 2000 for generating plasma may include determining whether to apply a high-voltage pulse, based on the information obtained through the sensor 2070.

Referring to (b) of FIG. 21, the method of controlling the device 2000 for generating plasma may include applying a first unit pulse UP1 to the electrode 2050 at the second time point t2 (or at least after the second time point t2) that is after a predetermined time PT from the first time point t1. The method of controlling the device 2000 for generating plasma may include applying the first unit pulse UP1 to the electrode 2050 at least after the second time point t2 when plasma is not generated inside the chamber 2010 at the second time point t2 in response to applying the AC voltage to the antenna module 2030 through the first power source P1, starting from the first time point t1.

The method of controlling the device 2000 for generating plasma may include applying a second unit pulse UP2 to the electrode 2050 after the first time interval PT1 from the second time point t2. The second unit pulse UP2 may have a greater value than the first unit pulse UP1. The method of controlling the device 2000 for generating plasma may include applying the second unit pulse UP2 of a voltage higher than that of the first unit pulse UP1 to the electrode 2050 after the predetermined time interval PT1 from the second time point t2 when plasma is not generated within the predetermined time interval PT1 from the second time point t2.

The method of controlling the device 2000 for generating plasma may include: applying the second unit pulse UP2; and applying a third unit pulse UP3 of a voltage higher than that of the second unit pulse UP2 to the electrode 2050 after the first time interval PT1 from the time when the second unit pulse UP2 is applied.

The method of controlling the device 2000 for generating plasma may include stopping applying a high-voltage pulse to the electrode 2050, based on a value obtained through the sensor 2070. The method of controlling the device 2000 for generating plasma may include stopping applying a high-voltage pulse to the electrode 2050 when the value obtained through the sensor 2070 satisfies a predetermined condition. Referring to (b) of FIG. 21, the method of controlling the device 2000 for generating plasma may include stopping applying a high-voltage pulse to the electrode 2050 in response to plasma generation inside the chamber 2010 after the third unit pulse UP3 is applied (for example, at a third time point t3).

2.3.3 Embodiment 3

According to an embodiment, there is provided a device for generating plasma, wherein the device applies an RF voltage to an antenna module, obtains sensing information related to a status of plasma, and adjusts a period of a high-voltage pulse applied to an electrode when the sensing information does not satisfy a predetermined condition. According to an embodiment, a method of controlling a device for generating plasma may include reducing an operation period of a second power source generating a high-voltage pulse when plasma generation is not detected.

Figure 22:
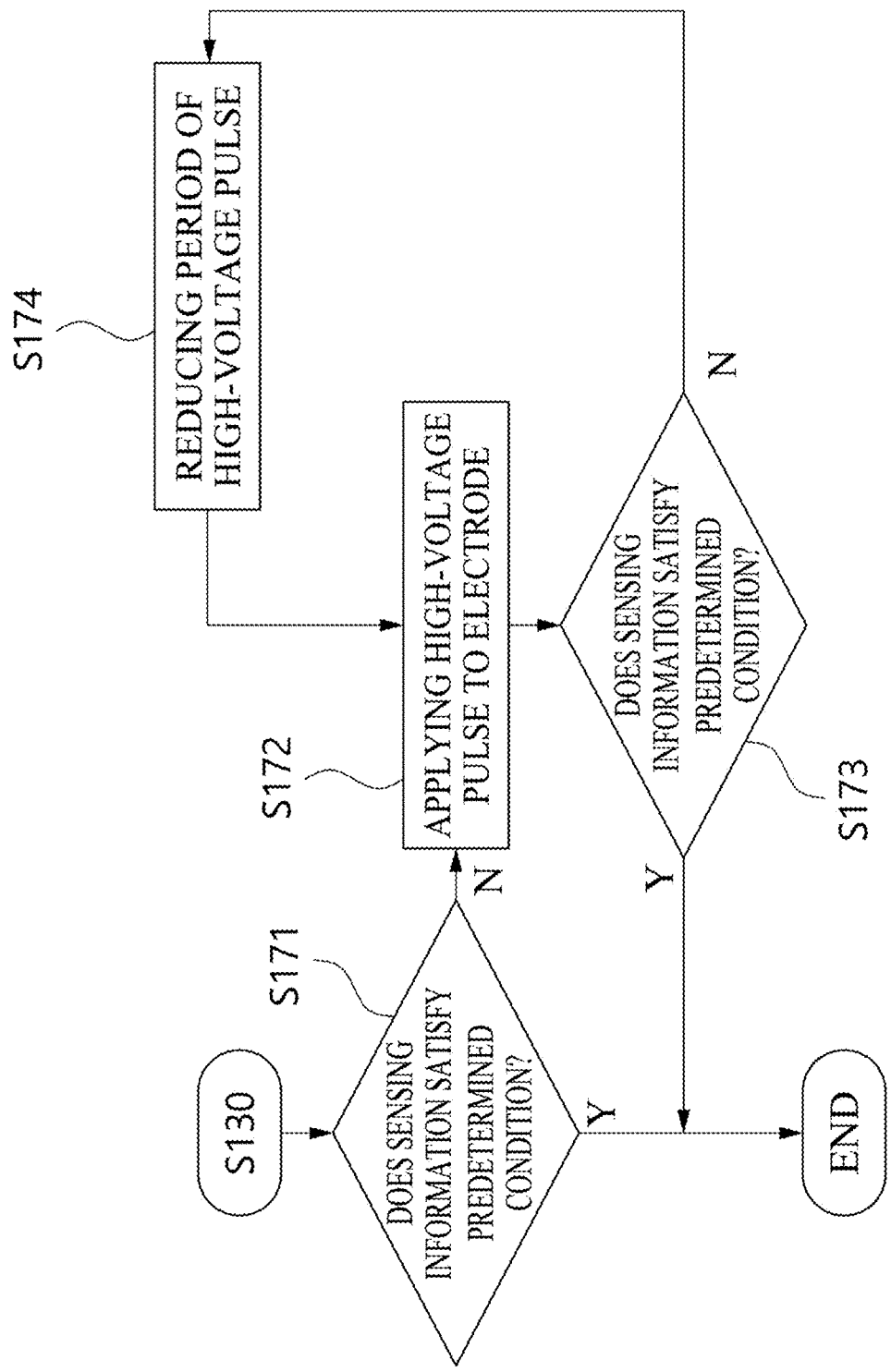
FIG. 22 is a diagram illustrating a plasma generation process according to an embodiment of the present disclosure.

FIG. 22 is a diagram illustrating a method of controlling a device for generating plasma according to an embodiment.

Referring to FIG. 22, a method of controlling a device for generating plasma according to an embodiment may include: after obtaining sensing information related to a status of plasma at step S130 as described above, determining whether the sensing information satisfies a predetermined condition at step S171; applying a high-voltage pulse to an electrode at step S172 when the sensing information does not satisfy the predetermined condition; determining whether sensing information satisfies the predetermined condition at step S173 after applying the high-voltage pulse to the electrode; and reducing a period of the high-voltage pulse at step S174 when the sensing information does not satisfy the predetermined condition.

The method of controlling a device for generating plasma may include: periodically obtaining sensing information; determining whether the obtained sensing information satisfies a predetermined condition; and reducing a period (a time interval between high-voltage pulses adjacent to each other in time series) of a high-voltage pulse applied to an electrode when the sensing information does not satisfy the predetermined condition.

Referring to FIG. 22, the method of controlling a device for generating plasma may include performing the following repeatedly: applying a high-voltage pulse to an electrode at step S172 when the sensing information does not satisfy the predetermined condition; obtaining sensing information again after applying the high-voltage pulse to the electrode, and determining whether the obtained sensing information satisfies the predetermined condition at step S173; and increasing a voltage of the high-voltage pulse at step S174 when the obtained sensing information does not satisfy the predetermined condition.

Figure 23:
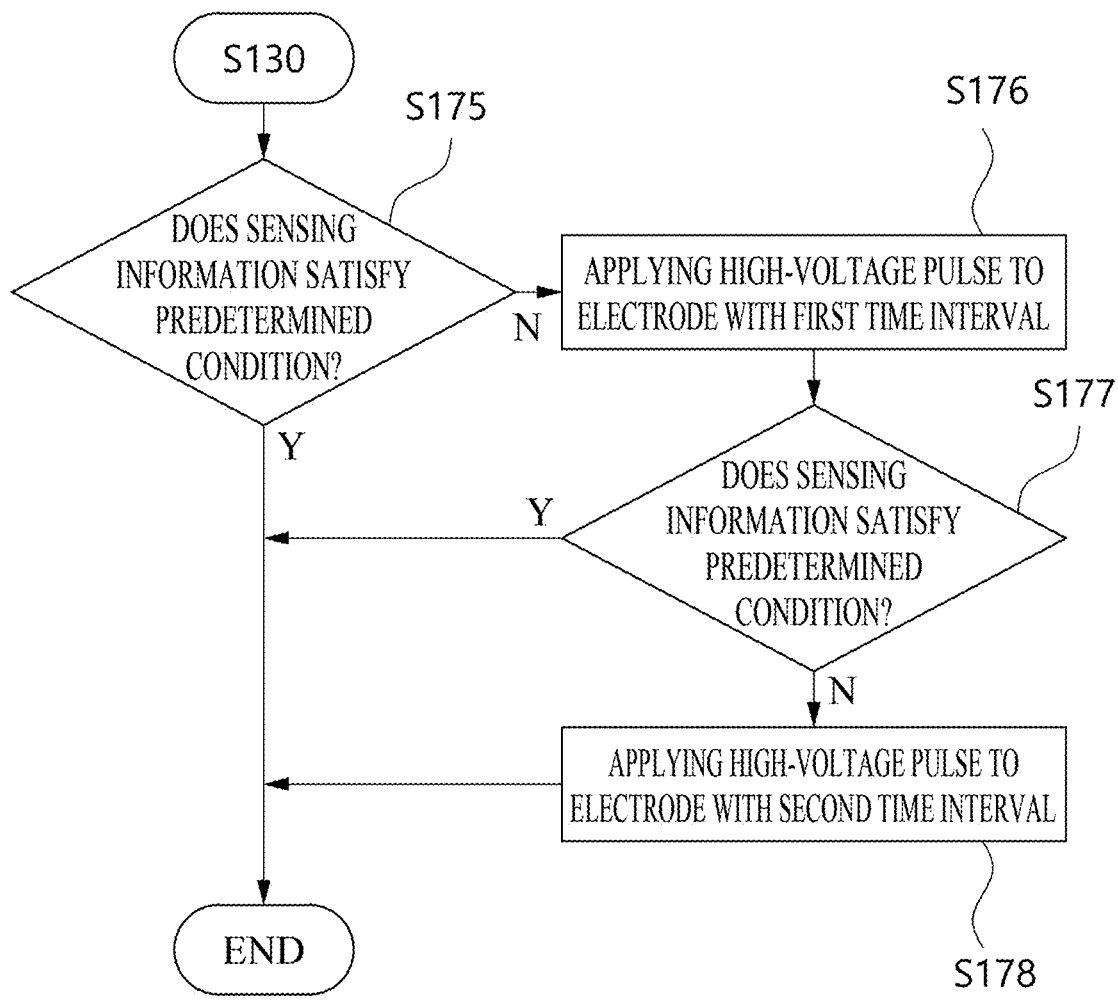
FIG. 23 is a diagram illustrating a plasma generation process according to an embodiment of the present disclosure.

FIG. 23 is a diagram illustrating output of an RF current and a high-voltage pulse according to a method of controlling a device for generating plasma according to an embodiment.

Referring to FIG. 23, the method of controlling a device for generating plasma according to an embodiment may further include: after obtaining sensing information related to a status of plasma at step S130 as described above, determining whether the sensing information satisfies a predetermined condition at step S175; applying a high-voltage pulse to an electrode at a first time interval at step S176 when the sensing information does not satisfy the predetermined condition; determining whether sensing information satisfies the predetermined condition at step S177 after applying the high-voltage pulse to the electrode at the first time interval; and applying a high-voltage pulse to the electrode at a second time interval at step S178 when the sensing information does not satisfy the predetermined condition.

Referring to FIG. 23, the method of controlling a device for generating plasma may include: obtaining first sensing information at a first time point at step S130; determining whether the obtained first sensing information satisfies a predetermined condition at step S175; applying a high-voltage pulse to an electrode through a second power source at a first time interval at step S176 when the obtained first sensing information does not satisfy the predetermined condition; obtaining (not shown) second sensing information at a second time point after the first time point; applying a high-voltage pulse to the electrode through the second power source at a second time interval shorter than the first time interval at step S178 when the obtained second sensing information does not satisfy the predetermined condition.

Figure 24:
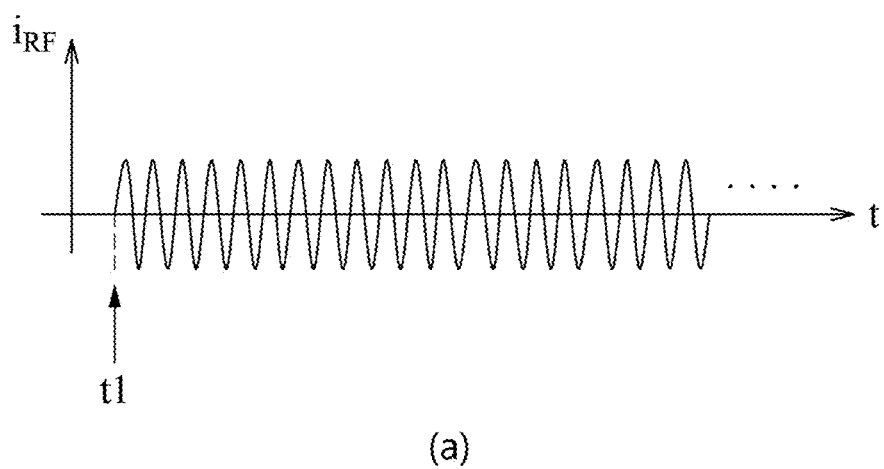
FIG. 24 is a diagram illustrating output of an output current and a high-voltage pulse according to a method of controlling a device for generating plasma according to an embodiment of the present disclosure.
Figure 24:
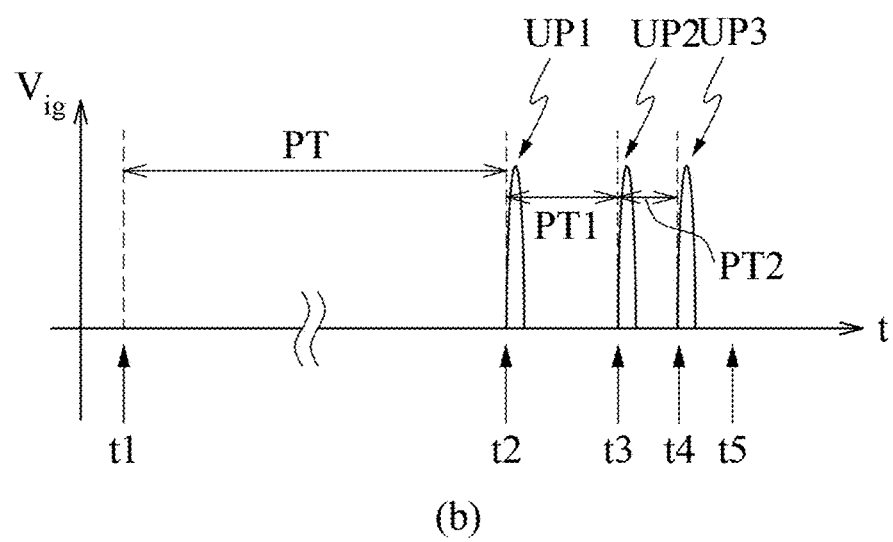

FIG. 24 is a diagram illustrating output of an output current and a high-voltage pulse according to a method of controlling the device 2000 for generating plasma according to an embodiment. Unless otherwise specially described, the content described with reference to FIG. 18, and FIG. 21 may be similarly applied to a method of controlling the device 2000 for generating plasma described with reference to FIG. 24.

(a) of FIG. 24 shows an output current $i_{RF}$ flowing through the antenna module (or load) as an AC voltage is applied to the antenna module 2030 through the first power source P1, starting from a first time point t1, according to a method of controlling the device 2000 for generating plasma according to an embodiment. Regarding (a) of FIG. 24, the content described with reference to (a) of FIG. 18 may be similarly applied.

According to a method of controlling the device 2000 for generating plasma may include generating a high-voltage pulse to induce plasma generation when plasma is not generated by an AC voltage within a predetermined time, and gradually reducing an application period of a high-voltage pulse, thereby minimizing damage to the device and production of a by-product. Regarding the operation of applying a high-voltage pulse, the content described with reference to FIG. 18 may be similarly applied unless otherwise specially described.

Referring to (b) of FIG. 24, a method of controlling the device 2000 for generating plasma according to an embodiment may include: applying a first unit pulse UP1 to the electrode 2050 at a second time point t2 after a predetermined time PT from a first time point; applying a second high-voltage pulse UP2 to the electrode at a third time point t3 after a first time interval PT1 from the second time point t2; and applying a third high-voltage pulse UP3 to the electrode at a fourth time point after a second time interval PT2 from the third time point t3. Herein, the second time interval PT2 may be shorter than the first time interval PT1.

The method of controlling the device 2000 for generating plasma according to an embodiment may include: applying the first unit pulse UP1 to the electrode 2050 at the second time point t2; obtaining sensing information indicating a status of plasma for the first time interval PT1 after the second time point t2; determining whether a predetermined condition is satisfied, based on the sensing information; and applying the second unit pulse UP2 to the electrode 2050 at the third time point t3 when the predetermined condition is not satisfied (that is, when plasma is not generated). The method of controlling the device 2000 for generating plasma may further include: obtaining sensing information indicating a status of plasma for the second time interval PT2 after the third time point t3; determining whether the predetermined condition is satisfied, based on the sensing information; and applying the third unit pulse UP3 to the electrode 2050 at the fourth time point t4 when the predetermined condition is not satisfied.

Regarding the method of controlling the device 2000 for generating plasma described with reference to FIG. 24, the content of stopping applying of a pulse may be similarly applied. Referring to (b) of FIG. 24, the method of controlling the device 2000 for generating plasma may include: obtaining sensing information related to generation of plasma after the third unit pulse UP3 is applied (for example, at a third time point t5); and stopping applying a high-voltage pulse to the electrode 2050.

In the meantime, in (b) of FIG. 24, a description is given for the embodiment in which a time interval between individual unit pulses is changed, but the content of the invention described in the present disclosure is not limited thereto. For example, the method of controlling the device 2000 for generating plasma according to an embodiment may include gradually reducing a period of a high-voltage pulse applied to the electrode 2050 until plasma generation is detected. In other words, the method of controlling the device 2000 for generating plasma may further include: applying one or more unit high-voltage pulses to the electrode 2050 in a first period; obtaining sensing information in response to applying the one or more unit high-voltage pulses in the first period; and applying one or more high-voltage pulses to the electrode 2050 in a second period which is shorter than the first period when plasma is not generated.

2.4 RF Signal Modulation

According to an embodiment, a device for generating plasma may control an RF power source based on sensing information and a predetermined condition. The device for generating plasma may control power output through the RF power source according to a status of plasma (for example, whether plasma ignition (or generation) is performed).

As a specific example, the device for generating plasma induces initial discharge by applying an RF voltage to an antenna module, and increases a size of the current provided by the RF power source in stages when initial discharge (or ignition) is not generated within a predetermined time. For example, the device for generating plasma changes the intensity of the RF voltage applied to the antenna module in stages when initial discharge (or ignition) is not generated within a predetermined time from the start of applying the RF voltage to the antenna module.

The device for generating plasma does not increase the RF voltage any more when initial discharge (or ignition) is generated, thereby preventing an excessive voltage from being applied to the antenna module.

As another specific example, after applying an RF voltage to the antenna module for a predetermined time, the device for generating plasma determines whether a predetermined condition related to plasma generation is satisfied, and changes an output state of the RF voltage when the condition is not satisfied (that is, when plasma is not generated). For example, the device for generating plasma or the controller thereof is configured to: output a first power by applying an RF voltage to the antenna module through a first power source, starting from a first time point; and output a second power greater than the first power by applying an RF voltage to the antenna module through the first power source when sensing information does not satisfy a predetermined condition at a second time point after the first time point. The outputting of the second power greater than the first power by applying the RF voltage to the antenna module by the device for generating plasma may include increasing the magnitude of the RF voltage, starting from the second time point.

The device for generating plasma according to an embodiment changes the frequency of an output RF current (or RF voltage) when initial discharge (or ignition) is not generated within a predetermined time from the start of applying the RF voltage to the antenna module. The device for generating plasma may increase the frequency of the RF current (or RF voltage). The device for generating plasma may change the frequency of the RF current (or RF voltage) based on a phase difference between the RF voltage and the RF current applied to the antenna module. The device for generating plasma may change the frequency of the RF current (or RF voltage) so that the phase difference between the RF voltage and the RF current applied to the antenna module is reduced.

As a specific example, after applying the RF voltage to the antenna module for a predetermined time, the device for generating plasma determines whether the predetermined condition related to plasma generation is satisfied, and changes the output frequency of the RF power when the condition is not satisfied. For example, the device for generating plasma or the controller thereof is configured to: provide RF power using a first frequency as a driving frequency to the antenna module through the first power source, starting from the first time point; and change the driving frequency to a second frequency when sensing information does not satisfy the predetermined condition at the second time point after the first time point. The second frequency may be higher than the first frequency. The device for generating plasma maintains the driving frequency of the RF power source when the initial discharge (or ignition) is generated.

2.4.1 Embodiment 4

According to an embodiment, there is provided a device for generating plasma, wherein the device applies an RF voltage to an antenna module, obtains sensing information related to a status of plasma, and applies a high-voltage pulse to an electrode when the sensing information does not satisfy a predetermined condition. According to an embodiment, a method of controlling a device for generating plasma may include applying a high-voltage pulse to an electrode when plasma generation is not detected.

Figure 25:
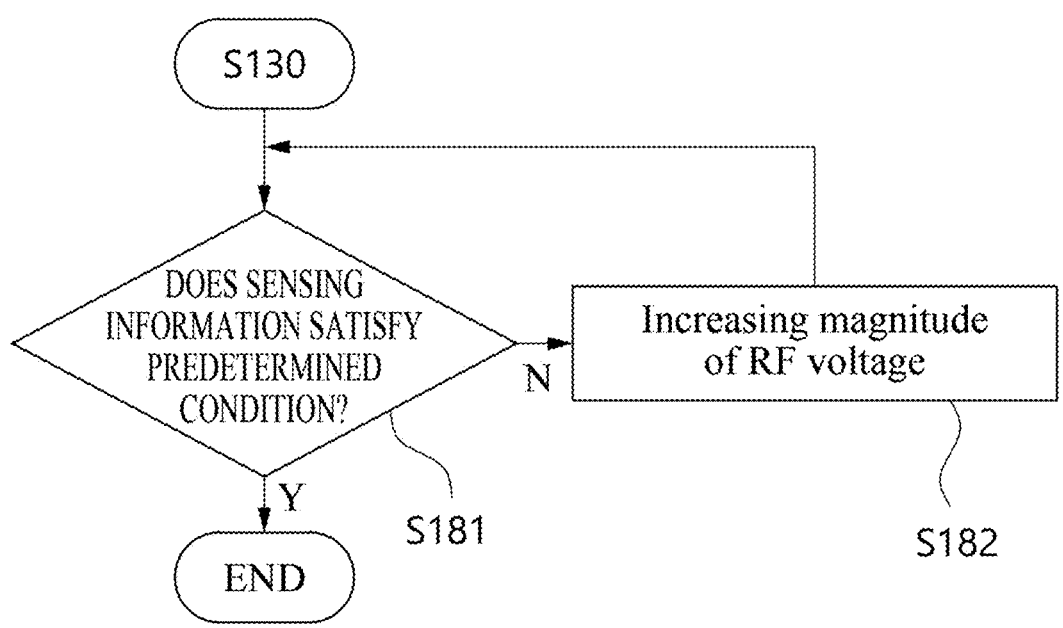
FIG. 25 is a diagram illustrating a plasma generation process according to an embodiment of the present disclosure.

FIG. 25 is a diagram illustrating a method of controlling a device for generating plasma according to an embodiment.

Referring to FIG. 25, a method of controlling a device for generating plasma according to an embodiment may include: after obtaining sensing information related to a status of plasma at step S130 as described above, determining whether the sensing information satisfies a predetermined condition at step S181; and increasing the magnitude of an RF voltage at step S182 when the sensing information does not satisfy the predetermined condition.

The method of controlling a device for generating plasma may include: periodically obtaining sensing information; determining whether the obtained sensing information satisfies a predetermined condition; and increasing a magnitude (the maximum value or effective value) of a voltage output by an RF power source when the sensing information does not satisfy the predetermined condition.

Referring to FIG. 25, the method of controlling a device for generating plasma may include performing the following repeatedly: applying, when sensing information does not satisfy a predetermined condition, an AC voltage to an antenna module and obtaining sensing information; determining whether the obtained sensing information satisfies the predetermined condition at step S181; and increasing a voltage of an RF power source at step S182 when the obtained sensing information does not satisfy the predetermined condition.

Figure 26:
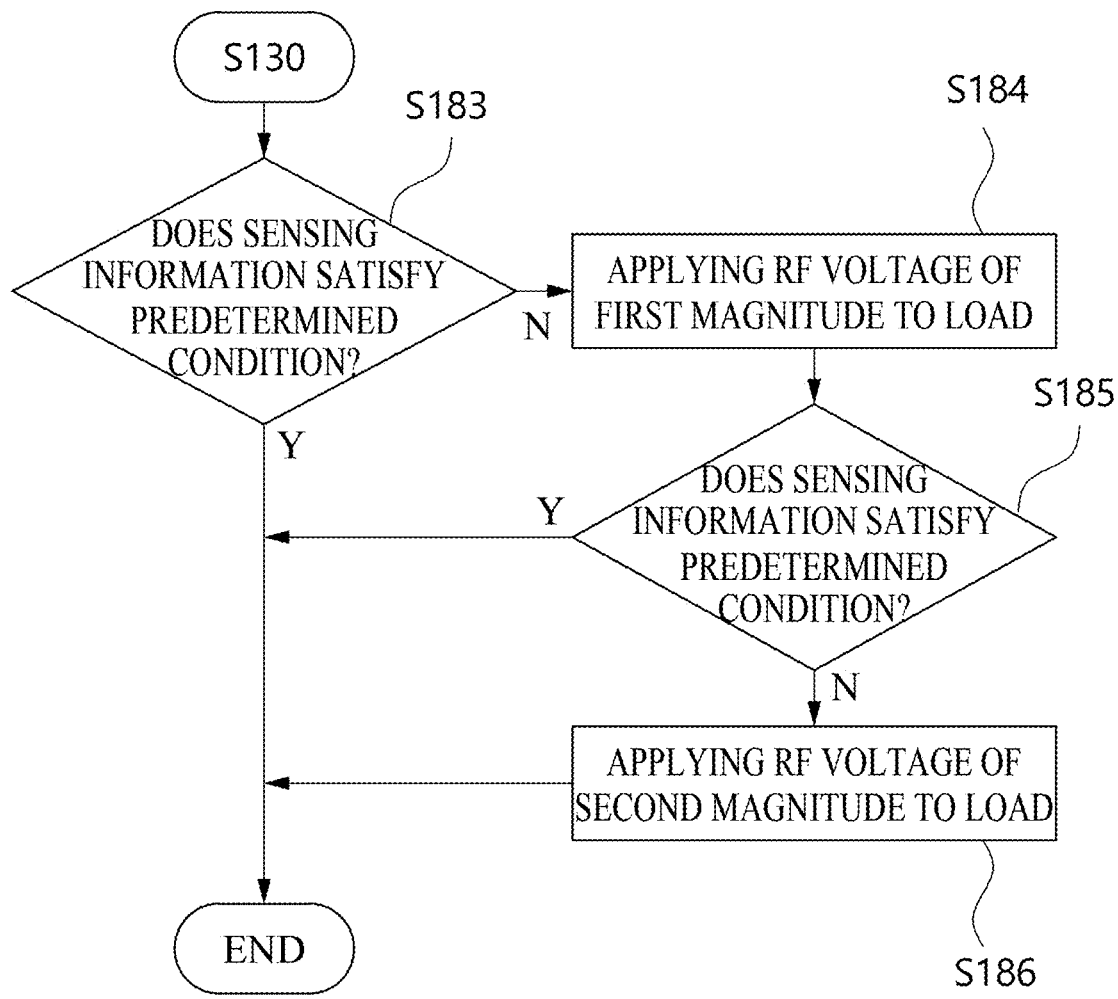
FIG. 26 is a diagram illustrating a plasma generation process according to an embodiment of the present disclosure.

FIG. 26 is a diagram illustrating output of an RF current and a high-voltage pulse according to a method of controlling a device for generating plasma according to an embodiment.

Referring to FIG. 26, the method of controlling a device for generating plasma according to an embodiment may further include: after obtaining sensing information related to a status of plasma at step S130 as described above, determining whether the sensing information satisfies a predetermined condition at step S183; applying an RF voltage of a first magnitude to a load at step S184 when the sensing information does not satisfy the predetermined condition; determining whether the sensing information satisfies the predetermined condition at step S185 after applying the RF voltage of the first magnitude to the load; and applying an RF voltage of a second magnitude to the load at step S186 when the sensing information does not satisfy the predetermined condition.

Referring to FIG. 26, the method of controlling a device for generating plasma according to an embodiment may include: obtaining first sensing information at a first time point at step S130; determining whether the obtained first sensing information satisfies a predetermined condition at step S183; applying an AC voltage of a first magnitude to an antenna module through a first power source at step S184 when the obtained first sensing information does not satisfy the predetermined condition; obtaining (not shown) second sensing information at a second time point after the first time point; determining whether the obtained second sensing information satisfies the predetermined condition at step S185; and applying an AC voltage of a second magnitude greater than the first magnitude to the antenna module through the first power source at step S186 when the second sensing information does not satisfy the predetermined condition.

Figure 27:
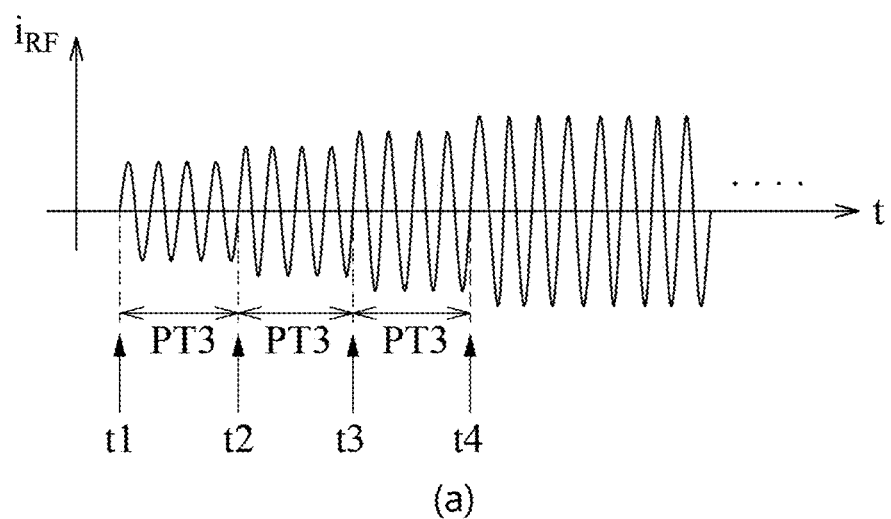
FIG. 27 is a diagram illustrating output of an output current and a high-voltage pulse according to a method of controlling a device for generating plasma according to an embodiment of the present disclosure.
Figure 27:
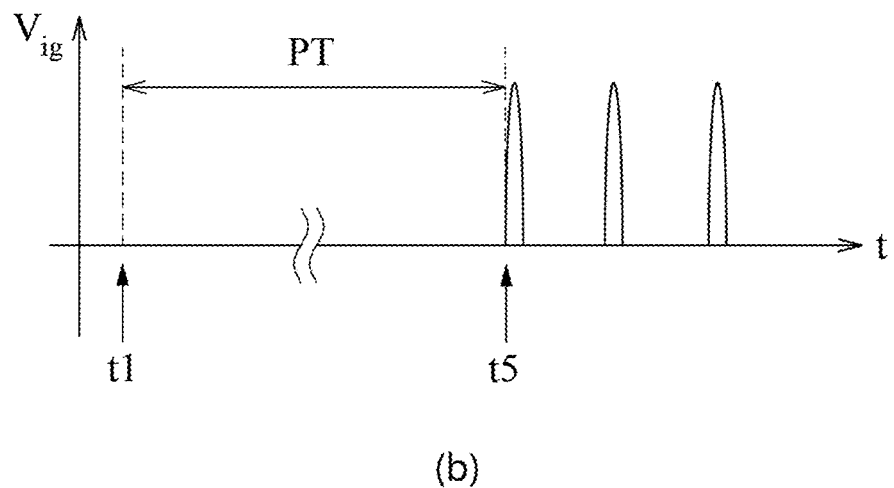

FIG. 27 is a diagram illustrating output of an output current and a high-voltage pulse according to a method of controlling the device 2000 for generating plasma according to an embodiment. Hereinafter, referring to the device 2000 for generating plasma shown in FIG. 15, a method of controlling the device 2000 for generating plasma will be described.

Regarding the current $i_{RF}$ and the high-voltage pulse $V_{ig}$ of the antenna module 2030 shown in (a) and (b) of FIG. 27, the content described with reference to (a) and (b) of FIG. 18 may be similarly applied unless otherwise specially described.

Referring to (a) of FIG. 27, a method of controlling the device 2000 for generating plasma according to an embodiment may include sequentially increasing a magnitude of an AC voltage applied to the antenna module 2030 through the first power source P1. As the intensity of the voltage applied to the antenna module 2030 is increased, the measured intensity of the current $i_{RF}$ of the antenna module is increased. Hereinafter, referring to (a) of FIG. 27, a method of controlling the device 2000 for generating plasma, through change in a magnitude of an AC voltage will be described.

A method of controlling the device 2000 for generating plasma according to an embodiment may include: applying an AC voltage having a first voltage as the maximum voltage to the antenna module 2030, starting from a first time point t1; and applying an AC voltage having a second voltage as the maximum voltage to the antenna module 2030, starting from a second time point t2.

The method of controlling the device 2000 for generating plasma may include changing a magnitude of an AC voltage applied to the antenna module 2030 through the first power source P1, based on whether plasma is generated.

For example, the method of controlling the device 2000 for generating plasma according to an embodiment may include: applying an AC voltage having the first voltage as the maximum voltage to the antenna module 2030, starting from the first time point t1; and in response to applying the AC voltage having the first voltage as the maximum voltage to the antenna module 2030, obtaining sensing information indicating a status of plasma between the first time point t1 and the second time point t2. The method of controlling the device 2000 for generating plasma may further include: when the sensing information obtained between the first time point t1 and the second time point t2 indicates that plasma is not generated, applying an AC voltage having the second voltage as the maximum voltage to the antenna module 2030, starting from the second time point. The second voltage may be higher than the first voltage. Accordingly, the maximum value (or effective value) of the current $i_{RF}$ flowing through the antenna module 2030 after the second time point may have a greater value than the maximum value (or effective value) of the current $i_{RF}$ flowing through the antenna module 2030 before the second time point.

The second time point t2 may be after a third time interval PT3 from the first time point t1. The third time interval PT3 may be an integer multiple of a period (or half period) of the AC voltage applied by the first power source P1.

Referring to (a) of FIG. 27, at a third time point, and a fourth time point after the second time point, the AC voltage (and the current $i_{RF}$ of the antenna module 2030 in accordance to therewith) may be changed in a manner similar to the above-described embodiment. The third time point t3 may be after the third time interval PT3 from the second time point t2, and the fourth time point t4 may be after the third time interval PT3 from the third time point t3.

Referring to (b) of FIG. 27, the method of controlling the device 2000 for generating plasma may further include applying a high-voltage pulse to the electrode 2050 while maintaining the intensity of the voltage applied to the antenna module 2030 while a predetermined time PT has elapsed.

The method of controlling the device 2000 for generating plasma may further include increasing the intensity of the voltage applied to the antenna module 2030 through the first power source P1 in stages for the predetermined time PT, but applying a high-voltage pulse to the electrode 2050 through the second power source P2 when plasma is not generated for the predetermined time PT.

For example, referring to (b) of FIG. 27, the method of controlling the device 2000 for generating plasma may include applying a high-voltage pulse to the electrode 2050 by using the second power source P2 at a fifth time point t5 after the fourth time point t4. The fifth time point t5 may be after the third time interval PT3 from the fourth time point t4. The method of controlling the device 2000 for generating plasma may further include controlling the second power source P2 after the fifth time point t5 in a manner similar to that described with reference to FIGS. 18, 21, and 24.

2.5 Composite Control

The embodiments in which whether to apply a high-voltage pulse is adjusted or an intensity of a voltage applied by an RF AC power source is adjusted based on a change in a status of plasma have been described above, but the content of the invention described in the present disclosure is not limited thereto.

For example, the device for generating plasma in the embodiment described with reference to FIG. 27 may adjust whether to apply a high-voltage pulse through the second power source P2, application intervals, or the intensity of a high-voltage pulse after the predetermined time PT, as in the embodiment described above with reference to FIG. 18, FIG. 21, or FIG. 24.

As a specific example, a method of controlling a device for generating plasma according to an embodiment may include assisting plasma discharge by adjusting an intensity and an interval of a high-voltage pulse. For example, the method of controlling a device for generating plasma may include: applying an AC voltage to an antenna module, starting from a first time point; applying a first high-voltage pulse of a first voltage to an electrode at a second time point when plasma generation is not detected after the first time point and before the second time point; applying a second high-voltage pulse of a second voltage higher than the first voltage to the electrode at a third time point when plasma generation is not detected after the second time point and before the third time point; and applying a second high-voltage pulse of a third voltage higher than the third voltage to the electrode at a fourth time point when plasma generation is not detected after the third time point and before the fourth time point. Herein, the time interval between the second time point and the third time point may be longer than the time interval between the third time point and the fourth time point.

As another specific example, a method of controlling a device for generating plasma according to an embodiment may include assisting plasma discharge by adjusting an intensity (or interval) of a high-voltage pulse and an intensity of RF power. For example, a method of controlling a device for generating plasma may include: increasing a magnitude of a voltage output by an AC power source in stages between a first time point and a second time point; and increasing a magnitude of a voltage of a high-voltage pulse generated by a pulse generator in stages after the second time point.

3. Detection of Plasma Generation

A device for generating plasma and a method of controlling the device according to several embodiments have been described above, the device and the method controlling a high-voltage pulse or an AC voltage based on a status of plasma to efficiently assist plasma generation and inhibit production of a by-product.

In order to effectively inhibit production of a by-product according to the above-described embodiments, detection of a change in a status of plasma needs to be preceded as the base of controlling power (a high-voltage pulse or an AC voltage).

Hereinafter, a means or a method for detecting a change in a status of plasma according to several embodiments will be described.

3.1 Detection of Power Change

According to an embodiment, there is provided a device for generating plasma, wherein the device includes a sensor that obtains sensing information related to power supplied to a load, based on a change in power information transmitted to the load according to whether plasma is generated, and the device detects whether plasma is generated, based on a change of the power supplied to the load by a power source, and controls the operation of the power source accordingly.

Hereinafter, a device for generating plasma or a method of controlling the device according to several embodiments will be described, the device and the method controlling a power source based on power change.

Figure 28:
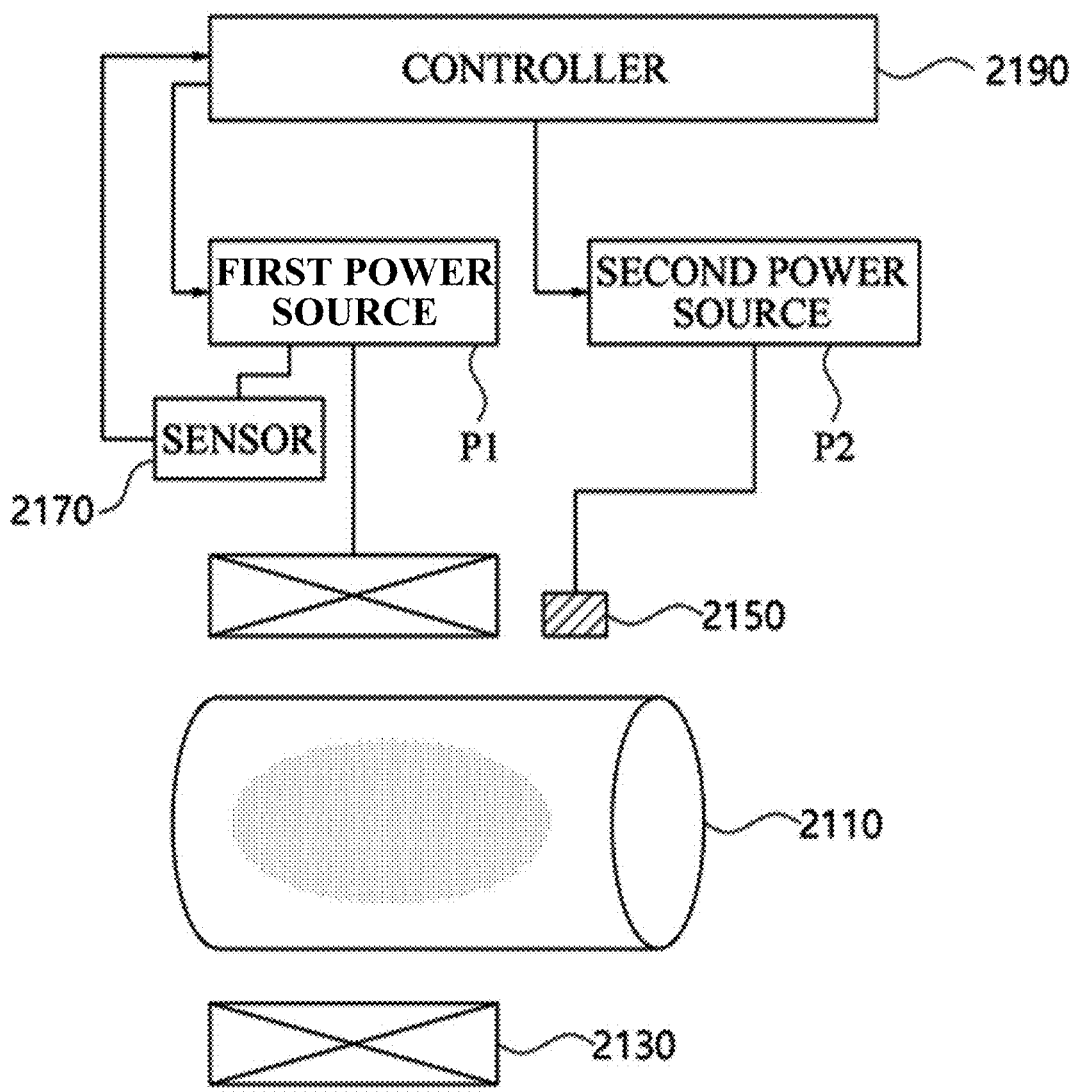
FIG. 28 is a diagram illustrating a device for generating plasma according to an embodiment of the present disclosure.

FIG. 28 is a diagram illustrating a device 2100 for generating plasma according to an embodiment, the device including a sensor.

Referring to FIG. 28, a device 2100 for generating plasma according to an embodiment may include a chamber 2110, an antenna module 2130, an electrode 2150, a sensor 2170, and a controller 2190. For each configuration and operation of the device 2100 for generating plasma, the content described for the device 2000 for generating plasma shown in FIG. 15 may be applied by analogy.

Referring to FIG. 28, the sensor 2170 may obtain sensing information from a first power source P1 and may transmit the obtained information to the controller 2190. The controller 2190 may control the first power source P1 and/or the second power source P2 based on information obtained through the sensor 2170.

Figure 29:
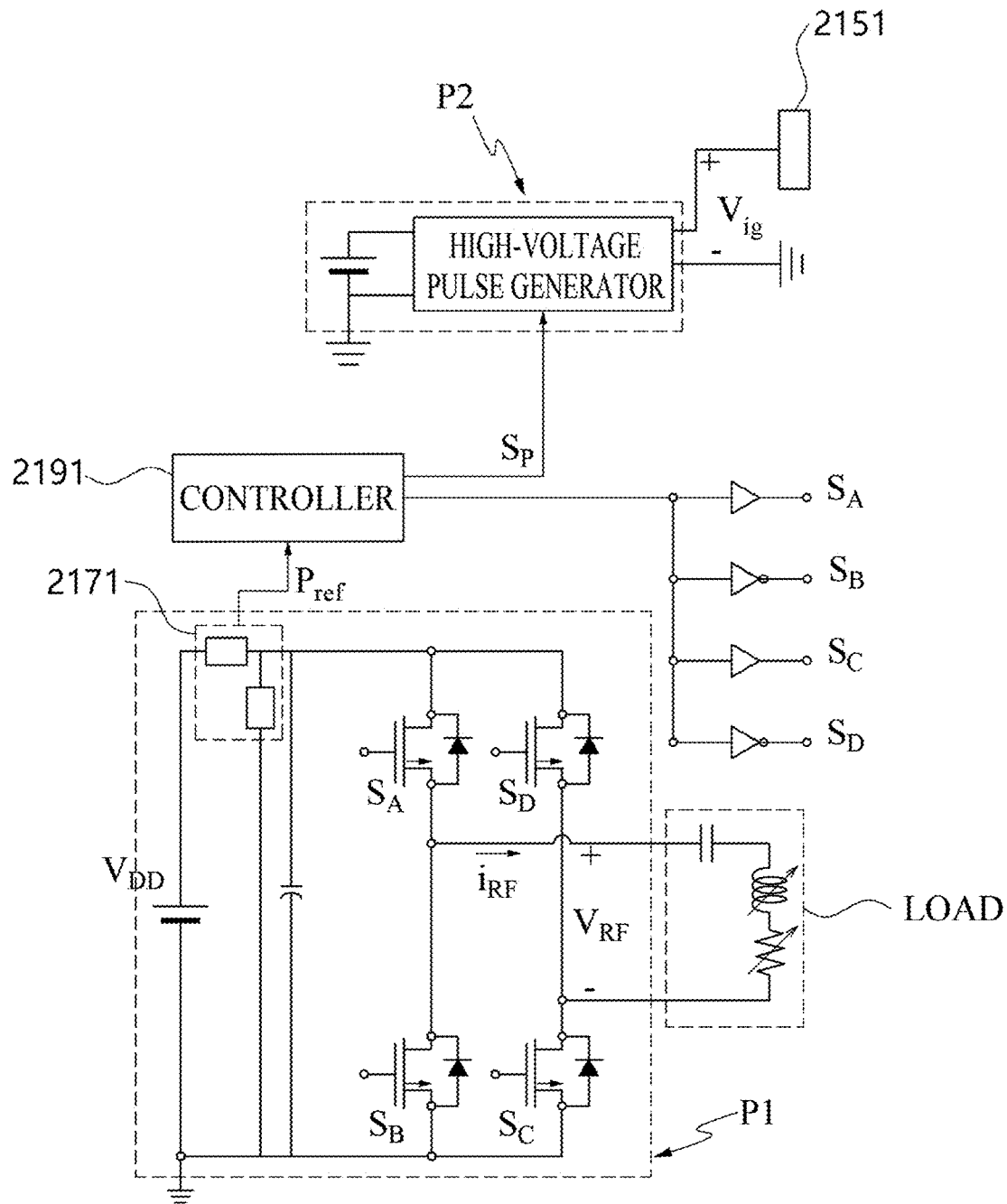
FIG. 29 is a diagram illustrating a device for generating plasma according to an embodiment of the present disclosure.

FIG. 29 is a simple circuit diagram illustrating a device for generating plasma according to an embodiment, the device including a sensor.

Referring to FIG. 29, a device for generating plasma according to an embodiment may include: a first power source P1 in which a sensor 2171 is located, the first power source P1 including a DC power source $V_{DD}$ and an inverter; a controller 2191; a second power source P2 including a high-voltage pulse generator; an electrode 2151; and a variable load.

The inverter of the first power source P1 may operate according to switching signals $S_A$, $S_B$, $S_C$, and $S_D$. According to the switching signals $S_A$, $S_B$, $S_C$, and $S_D$, the inverter may provide an AC voltage $V_{RF}$ to the load based on the DC power source $V_{DD}$.

The high-voltage pulse generator of the second power source P2 may operate according to a pulse control signal $S_P$ and may apply a high-voltage pulse to the electrode 2151.

The variable load may be a load of which a value changes according to reactance and inductance caused by the antenna module and plasma generated inside the chamber.

The sensor 2171 may be located between the DC power source $V_{DD}$ and the inverter and may obtain sensing information related to the power transmitted to the load. The sensor 2171 may obtain a voltage and/or a current output by the DC power source $V_{DD}$. The sensor 2171 may obtain a voltage and/or a current and may transmit the same to the controller 2191. The sensor 2171 may obtain the amount of power $P_{ref}$ determined according to the voltage and/or the current and may transmit the same to the controller 2191. The sensor 2171 may include a voltmeter and/or an amperemeter.

The controller 2191 may generate the switching signals $S_A$, $S_B$, $S_C$, and $S_D$. The controller 2191 may generate the switching signals $S_A$, $S_B$, $S_C$, and $S_D$ to apply an AC voltage to the load (or antenna module) through the first power source P1.

The controller 2191 may generate the pulse control signal $S_P$. The controller 2191 may generate the pulse control signal $S_P$ to apply a high-voltage pulse to the electrode 2151 through the second power source P2.

The controller 2191 may control the high-voltage pulse generator of the second power source P2 based on the sensing information obtained through the sensor 2171, to apply a high-voltage pulse $V_{ig}$ to the electrode 2151. The controller 2191 may generate the pulse control signal $S_P$ based on the sensing information obtained through the sensor 2171. The controller 2191 may adjust the magnitude and/or period of the high-voltage pulse $V_{ig}$ applied to the electrode 2151, based on the sensing information obtained through the sensor 2171. The controller 2191 may adjust the magnitude of an AC voltage applied to the antenna module, based on the sensing information obtained through the sensor 2171.

For example, when sensing information is obtained and the sensing information does not satisfy a predetermined condition, the controller 2191 generates a pulse control signal $S_P$ to apply a high-voltage pulse to the electrode 2151.

In addition, for example, when sensing information is obtained and the sensing information satisfies a predetermined condition, the controller 2191 does not apply a high-voltage pulse to the electrode 2151.

In addition, for example, when sensing information is periodically obtained and the sensing information that has not satisfied a predetermined condition satisfies the predetermined condition, the controller 2191 stops generating a pulse control signal $S_P$ and stops applying a high-voltage pulse to the electrode 2151 after the time point at which the sensing information satisfying the condition is obtained.

In addition, for example, when sensing information is periodically obtained and sensing information that has satisfied a predetermined condition does not satisfy the predetermined condition, the controller 2191 generates a pulse control signal $S_P$ to apply a high-voltage pulse to the electrode 2151 after the time point at which the sensing information not satisfying the condition is obtained.

Determining whether sensing information satisfies a predetermined condition by the controller 2191 may include determining whether the sensing information satisfies a condition related to plasma generation. Determining whether a predetermined condition is satisfied by the controller 2191 may include comparing a value obtained through the sensor 2171 with a reference value. Herein, the reference value may be a value for determining a plasma generation state. For example, the reference value may be a threshold value or threshold section for determining that plasma is generated when a sensed value is equal to or greater than the reference value, or for determining that plasma is not generated when the sensed value is equal to or less than the reference value.

As a specific example, the controller 2191 may obtain power information $P_{ref}$ from the sensor 2171, and may determine, based on the power information $P_{ref}$, whether the power provided to the load by the first power source P1 is equal to or greater than the reference value. The controller 2191 may determine whether plasma discharge is performed, based on whether the power provided to the load by the first power source P1 is equal to or greater than the reference value. The controller 2191 may obtain a power value (or a power value equal to or greater than the reference value) indicating that plasma is generated, and may perform the operation corresponding to the case in which a predetermined condition is satisfied. Alternatively, the controller 2191 may obtain a power value (or a power value less than the reference value) indicating that plasma is not generated, and may perform the operation corresponding to the case in which the predetermined condition is not satisfied.

Figure 30:
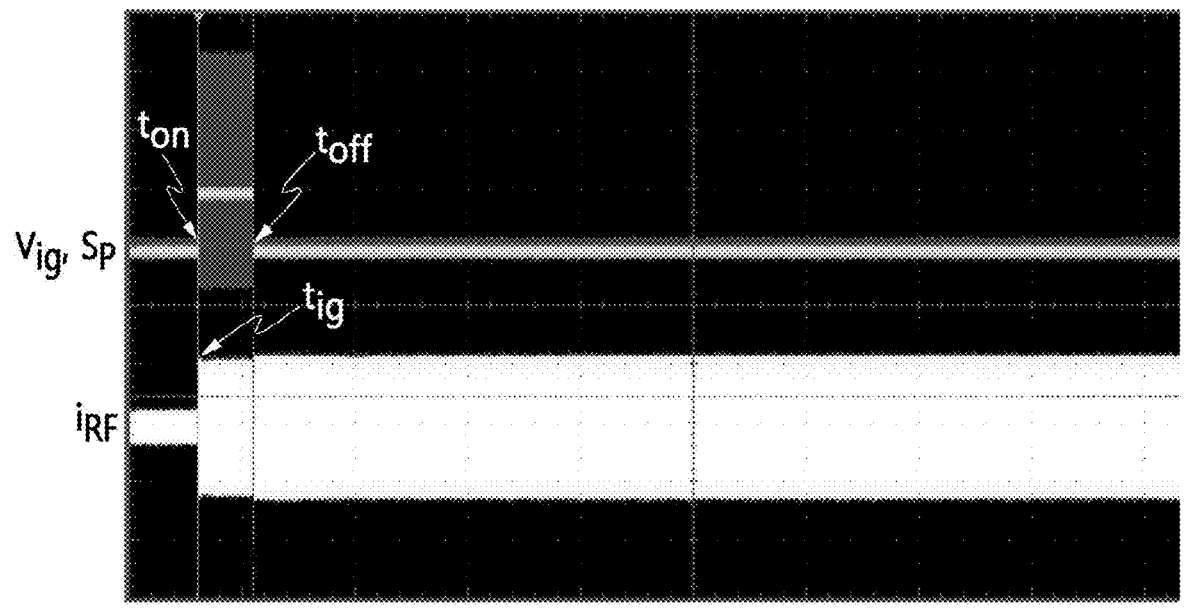
FIG. 30 is a diagram illustrating a power signal and a control signal of a high-voltage pulse changed based on the power signal, in a device for generating plasma according to an embodiment of the present disclosure, the device including a sensor.
Figure 30:
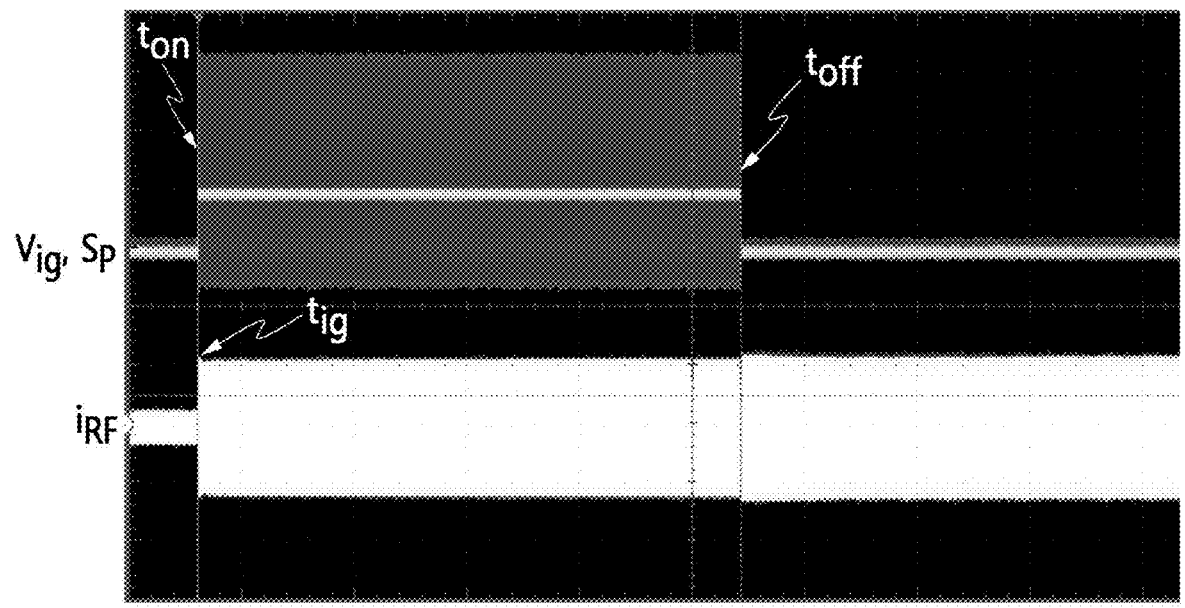

FIG. 30 shows a power signal and a control signal of a high-voltage pulse changed based on the power signal, in a device for generating plasma according to an embodiment, the device including a sensor.

(a) and (b) of FIG. 30 show changes over time in the current $i_{RF}$ flowing through the load, the pulse control signal $S_p$, and the high-voltage pulse $V_{ig}$ applied to a voltage by the pulse control signal $S_p$, in the device for generating plasma shown in FIG. 28 or FIG. 29.

Referring to (a) and (b) of FIG. 30, the device for generating plasma may apply an AC voltage to the antenna module, and may apply a high-voltage pulse to the electrode, starting from a first time point $t_{on}$. The device for generating plasma obtains a power signal, and stops ($t_{off}$) applying a high-voltage pulse when plasma discharge (generated at $t_{ig}$) is detected based on the power signal.

Referring to (a) of FIG. 30, the device for generating plasma according to an embodiment may stop ($t_{off}$) applying a high-voltage pulse after 98 ms from the time point $t_{ig}$ at which plasma discharge is generated. Referring to (b) of FIG. 30, the device for generating plasma according to an embodiment may stop ($t_{off}$) applying a high-voltage pulse after 960 ms from the time point $t_{ig}$ at which plasma discharge is generated.

3.2 Detection of Phase Change

In the meantime, in the time period from when plasma is generated to when applying a high-voltage pulse (or other plasma discharge assistance operations) is stopped based on plasma generation, although plasma is generated, a high-voltage pulse is applied to an electrode. This causes unnecessary power wasting and collision of plasma with a chamber wall, resulting in damage to the device and production of impurities.

Therefore, by minimizing time delay, damage to equipment or production of impurities may be inhibited as much as possible. However, in the case of using power as sensing information based on plasma generation, because of the time taken to remove noise from a voltage or current signal, the delay time from when power change occurs to when power control is achieved in response to power change may be relatively long. The delay time may be further reduced by controlling the operation of a power source based on a phase difference between the voltage and the current measured at an antenna module rather than by using power change.

Hereinafter, as a method for reducing the time delay, a device for generating plasma or a method of controlling the device according to several embodiments will be described, the device and the method controlling the operation of a first power source or a second power source based on a phase difference between the voltage and the current applied to an antenna module (or a load).

Figure 31:
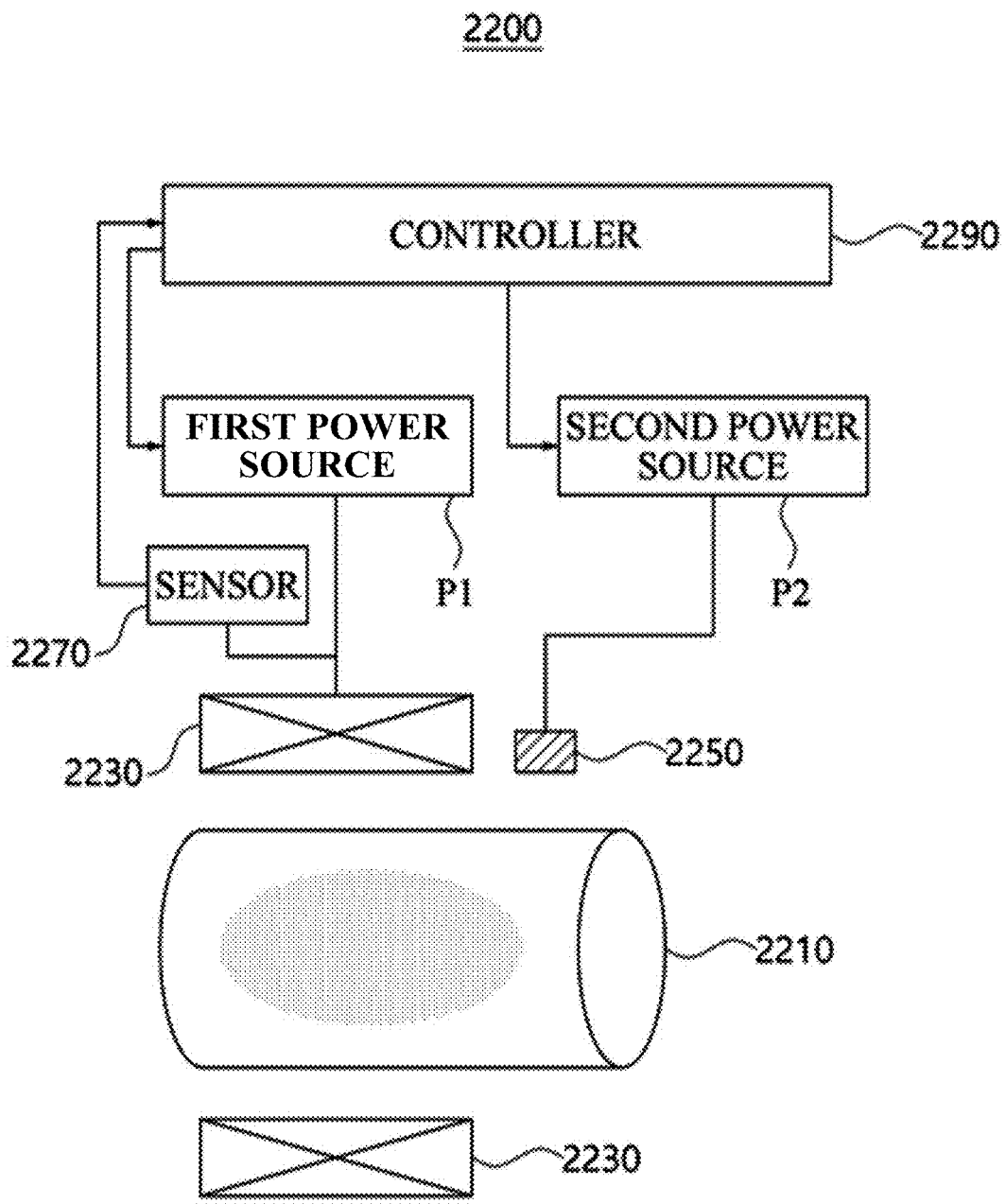
FIG. 31 is a diagram illustrating a device for generating plasma according to an embodiment of the present disclosure.

FIG. 31 is a diagram illustrating a device 2200 for generating plasma according to an embodiment, the device including a sensor.

Referring to FIG. 31, a device 2200 for generating plasma according to an embodiment may include a chamber 2210, an antenna module 2230, an electrode 2250, a sensor 2270, and a controller 2290. For each configuration and operation of the device 2200 for generating plasma, the content described for the device 2000 for generating plasma shown in FIG. 15 may be applied by analogy.

Referring to FIG. 31, the sensor 2270 may obtain sensing information from the antenna module 2230 (or the load) and may transmit the obtained information to the controller 2290. The controller 2290 may control the first power source P1 and/or the second power source P2 based on the information obtained through the sensor 2270. The sensor 2270 may obtain sensing information including at least one selected from the group of the current flowing through the antenna module 2230 (or the load), a phase of the current, the voltage applied to the antenna module 2230 (or the load), and a phase of the voltage. The sensor 2270 may transmit the sensing information to the controller 2290.

Figure 32:
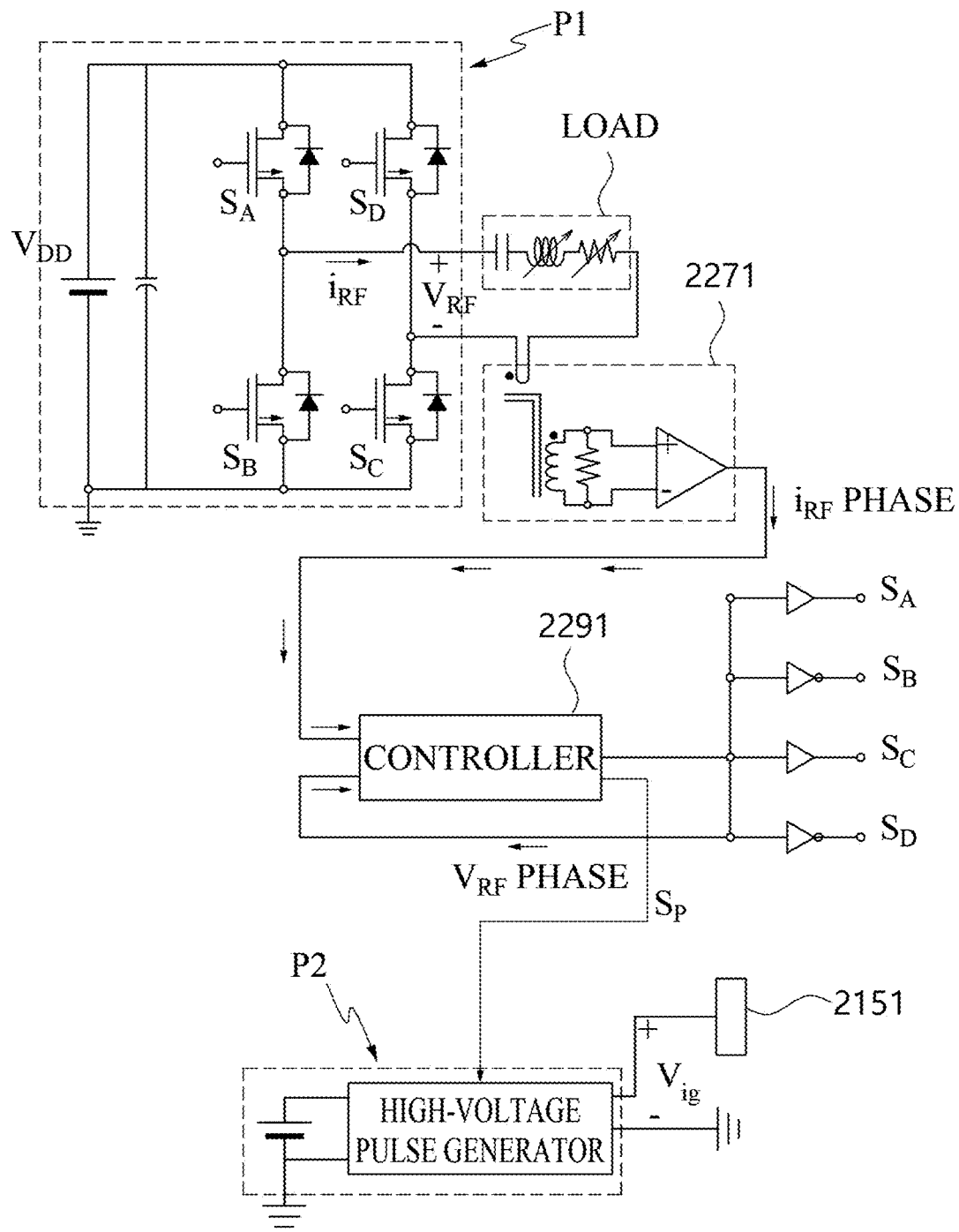
FIG. 32 is a diagram illustrating a device for generating plasma according to an embodiment of the present disclosure.

FIG. 32 is a simple circuit diagram illustrating a device for generating plasma according to an embodiment, the device including a sensor.

Referring to FIG. 32, a device for generating plasma according to an embodiment may include: a first power source P1 including a DC power source $V_{DD}$ and an inverter; a controller 2291; a second power source P2 including a high-voltage pulse generator; an electrode 2251; a sensor 2271 obtaining the current flowing through a load; and a variable load. Regarding the device for generating plasma shown in FIG. 32, the content described with reference to FIG. 29 may be similarly applied for the DC power source $V_{DD}$, the first power source P1, the controller 2291, the second power source P2, the electrode 2251, and the variable load.

Referring to FIG. 32, the device for generating plasma according to an embodiment may include the sensor 2271 obtaining the current $i_{RF}$ flowing through the antenna module (or the load) or a phase of the current $i_{RF}$. The sensor 2271 may include a current transformer, a filter, and a comparator.

The sensor 2271 may be located near the load or may be connected to the antenna module, and may obtain the current $i_{RF}$ flowing through the antenna module (or the load) or a phase of the current $i_{RF}$. The sensor 2271 may obtain the current $i_{RF}$ or a phase of the current $i_{RF}$ and may transmit the same to the controller 2291.

The controller 2291 may control the first power source P1 or the second power source P2 based on the sensing information obtained through the sensor 2271. The controller 2291 may obtain the current $i_{RF}$ or the phase of the current $i_{RF}$ through the sensor 2271, may determine whether the current $i_{RF}$ or the phase of the current $i_{RF}$ satisfies a predetermined condition, and may control the first power source P1 or the second power source P2.

In the meantime, whether plasma is generated may be determined from the phase difference between the current $i_{RF}$ flowing through the load and the voltage $V_{RF}$ applied to the load. For example, according to an embodiment, in a state in which plasma discharge is not generated inside the chamber, as an AC voltage $V_{RF}$ is applied to the antenna module, the current $i_{RF}$ flowing through the antenna module may have a phase almost similar to that of the voltage $V_{RF}$ applied to the antenna module. In a state in which plasma discharge is generated inside the chamber, as an AC voltage $V_{RF}$ is applied to the antenna module, the current $i_{RF}$ flowing through the antenna module may have a phase different from that of the voltage $V_{RF}$ applied to the antenna module.

The controller 2291 may control the first power source P1 or the second power source P2 based on the phase difference between the current $i_{RF}$ flowing through the load and the voltage $V_{RF}$ applied to the load.

The controller 2291 may obtain the voltage $V_{RF}$ or the phase of the voltage $V_{RF}$ applied to the load, from switching signals $S_A$, $S_B$, $S_C$, and $S_D$ output from the inverter. The controller 2291 may obtain the current $i_{RF}$ or the phase of the current $i_{RF}$ through the sensor 2271, and may control the first power source P1 or the second power source P2 based on the phase difference between the voltage $V_{RF}$ applied to the load and the current $i_{RF}$ flowing through the load.

Determining whether sensing information satisfies a predetermined condition by the controller 2291 may include determining whether information on the current $i_{RF}$ satisfies a condition related to plasma generation. Determining whether a predetermined condition is satisfied by the controller 229 may include obtaining, through the sensor 2271, the phase of the current $i_{RF}$ flowing through the load, and comparing the phase of the current $i_{RF}$ flowing through the load with the phase of the voltage $V_{RF}$ applied to the load. Determining whether sensing information satisfies a predetermined condition by the controller 2291 may include determining whether the phase difference between the phase of the current $i_{RF}$ flowing through the load and the phase of the voltage $V_{RF}$ applied to the load is equal to or greater than a reference value.

In order to control the first power source P1 and/or the second power source P2 according to whether plasma discharge is performed, the controller 2291 determines whether the phase difference between the phase of the current $i_{RF}$ flowing through the load and the phase of the voltage $V_{RF}$ applied to the load is equal to or greater than the reference value, and does not perform a discharge assistance operation when the phase difference is equal to or greater than the reference value (that is, plasma discharge is generated), or performs the discharge assistance operation when the phase difference is equal to or less than the reference value (that is, plasma discharge is not generated).

The controller 2291 determines whether the phase difference between the phase of the current $i_{RF}$ flowing through the load and the phase of the voltage $V_{RF}$ applied to the load is equal to or greater than the reference value, and does not apply a high-voltage pulse to the electrode 2251 through the second power source P2 when the phase difference is greater than the reference value.

Regarding determining whether the sensing information satisfies the predetermined condition, the controller 2291 determines whether the phase difference between the phase of the current $i_{RF}$ flowing through the load and the phase of the voltage $V_{RF}$ applied to the load is equal to or greater than the reference value, and applies a high-voltage pulse to the electrode 2251 through the second power source P2 when the phase difference is less than the reference value.

Figure 33:
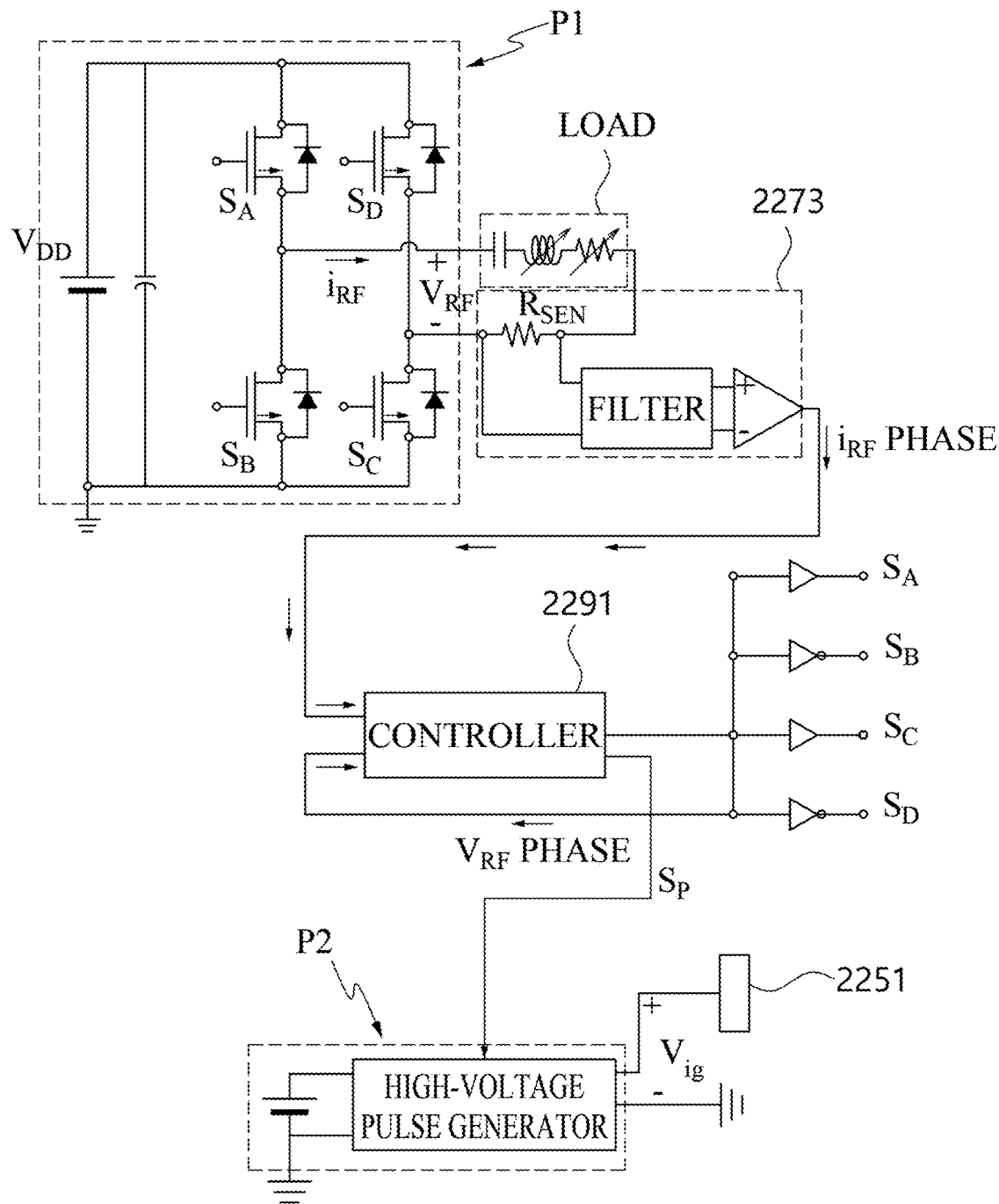
FIG. 33 is a diagram illustrating a device for generating plasma according to an embodiment of the present disclosure.

FIG. 33 is a simple circuit diagram illustrating a device for generating plasma according to an embodiment, the device including a sensor. Regarding the device for generating plasma shown in FIG. 33, the content described with reference to FIGS. 29 and 32 may be similarly applied.

Referring to FIG. 33, the device for generating plasma according to an embodiment may include a sensor 2273 obtaining the current $i_{RF}$ flowing through the antenna module (or the load) or the phase of the current $i_{RF}$. The sensor 2273 may include a filter, a comparator, and a sensor resistor $R_{SEN}$ connected to the antenna module (or the load) in series. The sensor 2273 may measure the voltage of the sensing resistor $R_{SEN}$ to obtain the current $i_{RF}$ or the phase of the current $i_{RF}$ flowing through the antenna module (or the load).

In the meantime, in the above embodiments, a description is given for the case in which the controller obtains the phase of the voltage applied to the antenna module, from the switching signals, but this is not an essential configuration. The device for generating plasma described in the present disclosure may further include a sensor obtaining the phase of the voltage applied to the antenna module. Hereinafter, a sensor according to several embodiments will be described, the sensor obtaining the phase of the voltage applied to the antenna module.

Figure 34:
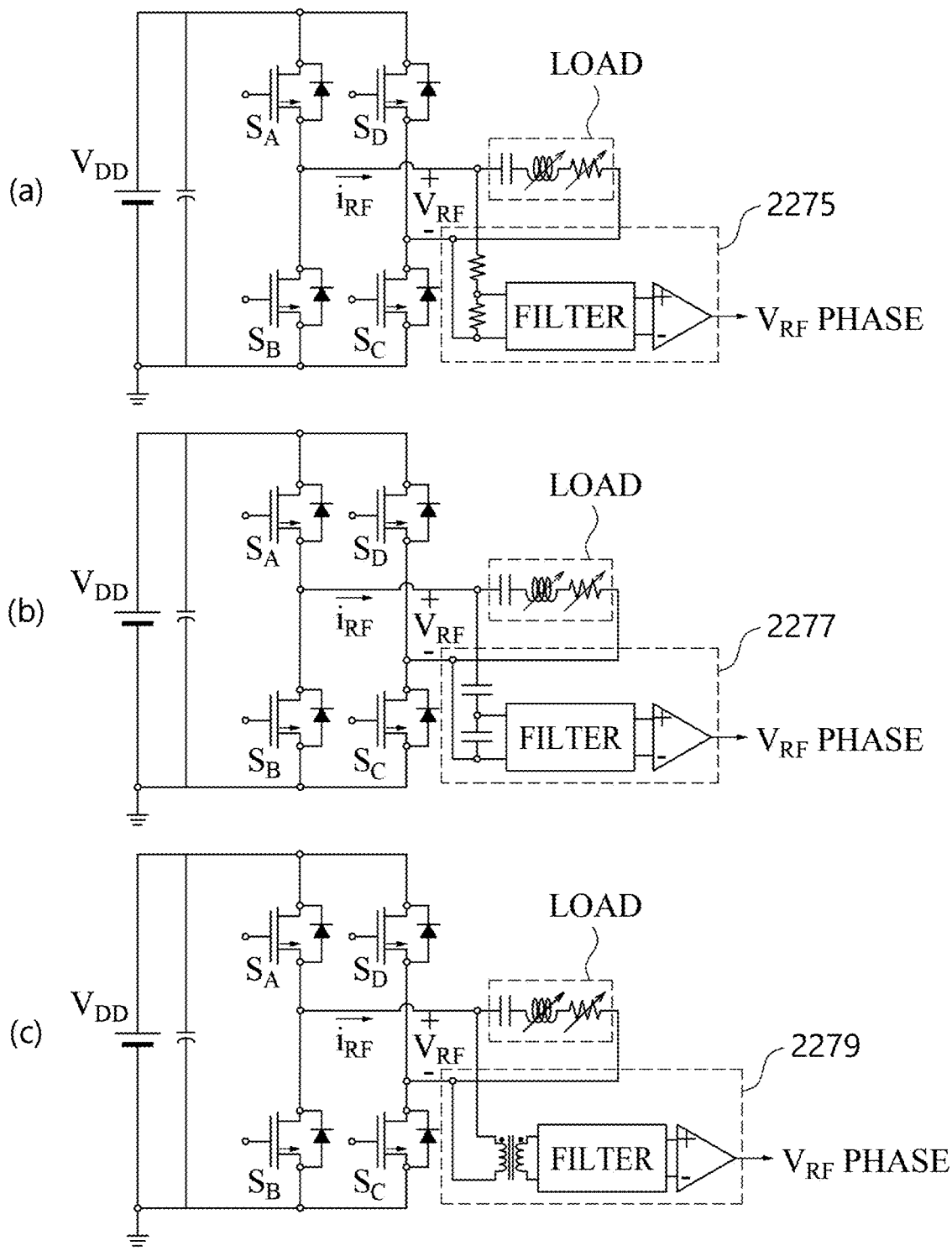
FIG. 34 is a diagram illustrating a device for generating plasma according to several embodiments of the present disclosure.

FIG. 34 is a simple circuit diagram illustrating a device for generating plasma according to several embodiments, the device including a sensor. (a), (b), and (c) of FIG. 34 are diagrams illustrating apparatuses for generating plasma including respective sensors 2275, 2277, and 2279 obtaining the phase of the voltage $V_{RF}$ applied to the antenna module.

Referring to (a) of FIG. 34, the sensor 2275 according to an embodiment may include a resistor divider circuit connected to opposite ends of the antenna module. The sensor 2275 may obtain the phase of the voltage $V_{RF}$ applied to the antenna module through the resistor divider circuit. As needed, the sensor 2275 may further include a filter and/or a comparator.

Referring to (b) of FIG. 34, the sensor 2277 according to an embodiment may include a capacitor divider circuit connected to opposite ends of the antenna module. The sensor 2277 may obtain the phase of the voltage $V_{RF}$ applied to the antenna module through the capacitor divider circuit. As needed, the sensor 2277 may further include a filter and/or a comparator.

Referring to (c) of FIG. 34, the sensor 2279 according to an embodiment may include a transformer connected to opposite ends of the antenna module. The sensor 2279 may obtain the phase of the voltage $V_{RF}$ applied to the antenna module through the transformer. As needed, the sensor 2279 may further include a filter and/or a comparator.

In the meantime, although not shown in FIG. 34, each apparatus for generating plasma may include a controller, a second power source, and an electrode. The controller may obtain, through each sensor 2275, 2277, or 2279, the phase of the voltage $V_{RF}$ applied to the antenna module, and may control the operation of the inverter and/or the high-voltage pulse generator based on the difference between the phase of the current $i_{RF}$ flowing through the antenna module and the phase of the voltage $V_{RF}$ applied to the antenna module.

Figure 35:
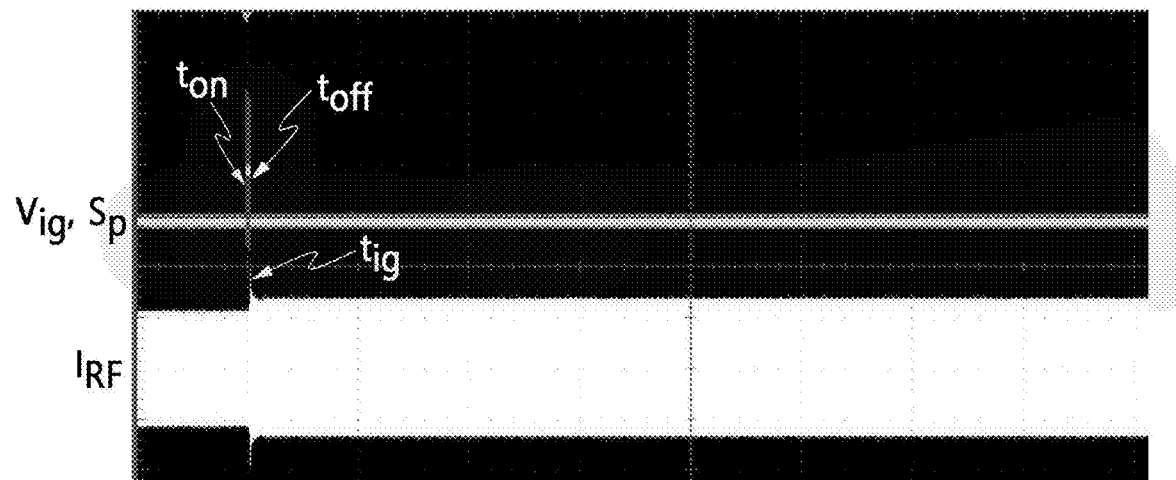
FIG. 35 is a diagram illustrating a power signal and a control signal of a high-voltage pulse changed based on the power signal, in a device for generating plasma according to an embodiment of the present disclosure, the device including a sensor.
Figure 35:
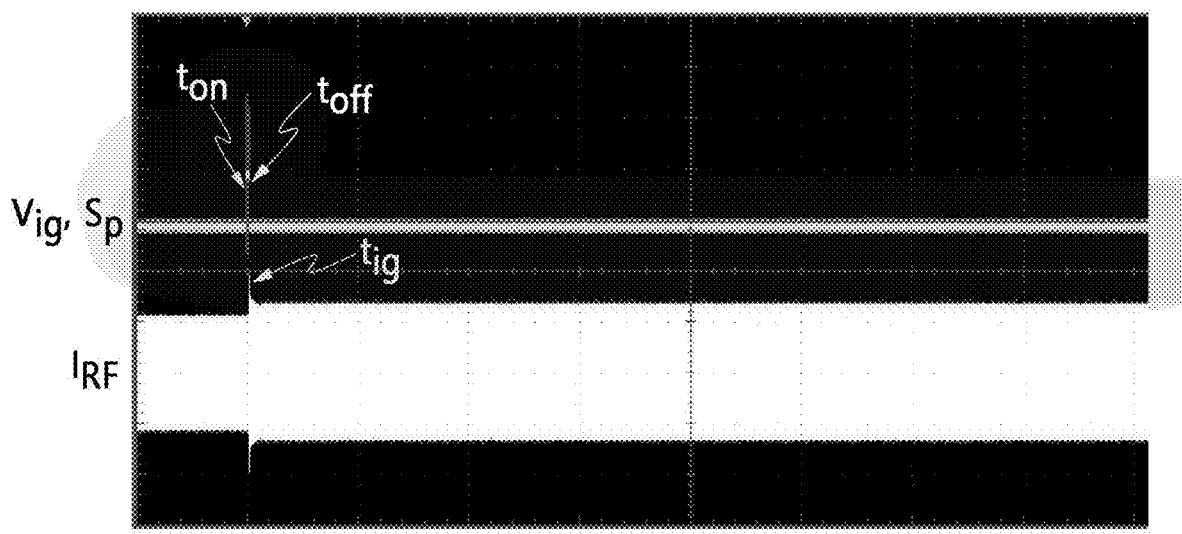

(a) and (b) of FIG. 35 show changes over time in the current $i_{RF}$ flowing through the load, the pulse control signal $S_p$, and the high-voltage pulse $V_{ig}$ applied to a voltage, in the device for generating plasma shown in FIG. 31.

FIG. 35 shows a control signal of a high-voltage pulse changed based on a phase difference between the voltage applied to the antenna module and the current flowing through the antenna module, in the device for generating plasma according to an embodiment, the device including the sensor.

(a) and (b) of FIG. 35 show changes over time in the current $i_{RF}$ flowing through the load, the pulse control signal $S_p$, and the high-voltage pulse $V_{ig}$ applied to a voltage by the pulse control signal $S_p$, in the device for generating plasma shown in FIG. 28 or FIG. 29.

Referring to (a) and (b) of FIG. 35, the device for generating plasma may apply an AC voltage to the antenna module, and may apply a high-voltage pulse to the electrode, starting from a first time point $t_{on}$. The device for generating plasma obtains the phase of the voltage applied to the antenna module and the phase of the current flowing through the antenna module, and stops ($t_{off}$) applying a high-voltage pulse when plasma discharge (generated at $t_{ig}$) is detected based on a signal of the phase difference. For example, the device for generating plasma stops ($t_{off}$) applying a high-voltage pulse when the phase difference exceeds a reference value.

Referring to (a) of FIG. 35, the device for generating plasma according to an embodiment may stop ($t_{off}$) applying a high-voltage pulse after 0.8 ms from the time point $t_{ig}$ at which plasma discharge is generated. Referring to (b) of FIG. 30, the device for generating plasma according to an embodiment may stop ($t_{off}$) applying a high-voltage pulse after 0.6 ms from the time point $t_{ig}$ at which plasma discharge is generated.

Referring to (a), (b) of FIG. 35, and (a), (b) of FIG. 30, it is found that the time from when plasma discharge is generated ($t_{ig}$) to when applying a high-voltage pulse is stopped ($t_{off}$) is shorter in the case of stopping applying a high-voltage pulse based on the phase difference between the current and the voltage of the antenna module (FIG. 35) than in the case of stopping applying a high-voltage pulse based on power consumption (FIG. 30). That is, by stopping ($t_{off}$) applying a high-voltage pulse based on the phase difference, the time from when plasma discharge is generated ($t_{ig}$) to when applying a high-voltage pulse is stopped ($t_{off}$) is minimized, whereby damage to the device or production of unnecessary particles is minimized.

As described in the above embodiment, by using multiple antenna modules having different discharge characteristics, plasma discharge is performed selectively according to various discharge environments. There is provided a device for generating plasma that performs plasma discharge by using multiple antenna modules, thereby being capable of performing discharge in various environments.

Although embodiments have been described and shown, various modifications and variations are possible from the above description by those of skilled in the art. For example, although the described techniques are performed in a different order than the described method, and/or the elements of the described system, structure, apparatus, and circuit are coupled or combined in a different form that the described method, or replaced or substituted by other elements or equivalents, appropriate results may be achieved.

Therefore, other implementations, embodiments, and equivalents to the claims are also within the scope of the following claims.

What is claimed is:

1. An apparatus for generating plasma, comprising:
a chamber configured to provide a generating space for the plasma;
a first power source configured to output an RF voltage;
a second power source configured to output a pulsed DC voltage;
an antenna module placed adjacent to the chamber and surrounding an outer surface of a side wall of the chamber and configured to be connected to the first power source such that an induced electric field is generated in the chamber when the RF voltage is supplied to the antenna module from the first power source;
an electrode placed adjacent to the chamber and configured to be connected to the second power source such that electrons are supplied into the chamber when a voltage difference is supplied between the electrode and a counter electrode from the second power source;
a sensor configured to obtain sensing information related to a status of the plasma; and
a controller configured to control the first power source and the second power source,
wherein, for igniting plasma in the chamber, the controller is further configured to:
control the first power source to output the RF voltage to the antenna module for igniting plasma without supplying the pulsed DC voltage to the electrode from the second power source,
obtain the sensing information related to the status of the plasma while maintaining the RF voltage output,
monitor, during a first time period, whether plasma is ignited based on the sensing information or not, and
control the second power source to output a first pulsed DC voltage to the electrode for supplying electrons into the chamber while maintaining the RF voltage output for assisting the ignition of plasma in response to plasma not being ignited with the induced electric field in the chamber, or control the second power source not to output the pulsed DC voltage to the electrode in response to the plasma being ignited with the induced electric field in the chamber.

2. The apparatus of claim 1,
wherein the sensing information obtained by the sensor indicates a power supplied to the antenna module via the first power source.

3. The apparatus of claim 2,
wherein the first power source comprises a DC power source and an inverter configured to convert a DC power from the DC power source into an RF power,
wherein the sensor is placed between the DC power source and the inverter and configured to obtain a first voltage output from the DC power source and a first current output from the DC power source, and
wherein the controller is configured to apply the pulsed DC voltage to the electrode based on a power supplied to the antenna module which is determined based on the first voltage and the first current.

4. The apparatus of claim 1,
wherein the sensor is configured to obtain the sensing information based on a second current which flows through the antenna module.

5. The apparatus of claim 2,
wherein the controller is configured to determine that the plasma is not ignited with the induced electric field in the chamber in response to the sensing information obtained during the first time period indicating that a power supplied to the antenna module is more than or equal to a reference power, and
wherein the controller is configured to determine that the plasma is ignited with the induced electric field in the chamber in response to the sensing information obtained during the first time period indicating that a power supplied to the antenna module is less than the reference power.

6. The apparatus of claim 4,
wherein the controller is configured to determine that the plasma is not ignited with the induced electric field in the chamber in response to a phase difference between the second current and the RF voltage not satisfying a predetermined condition, and wherein the controller is configured to determine that the plasma is ignited with the induced electric field in the chamber in response to the phase difference between the second current and the RF voltage satisfying the predetermined condition.

7. The apparatus of claim 1, wherein the controller is further configured to:
monitor, during a second time period, whether plasma is ignited based on the sensing information or not, and
control the second power source to output a second pulsed DC voltage having a power higher than the first pulsed DC voltage in response to the plasma not being ignited with the first pulsed DC voltage, or control the second power source to stop outputting the first pulsed DC voltage in response to the plasma being ignited with the first pulsed DC voltage.

8. The apparatus of claim 1, wherein the controller is further configured to:
monitor, during a second time period, whether plasma is ignited based on the sensing information or not, and
control the second power source to output a second pulsed DC voltage having a power higher than the first pulsed DC voltage in response to the plasma not being ignited with the first pulsed DC voltage, or control the second power source to stop outputting the first pulsed DC voltage in response to the plasma being ignited with the first pulsed DC voltage.

9. The apparatus of claim 1, wherein the controller is further configured to:
monitor, during a third time period, whether plasma is ignited based on the sensing information or not, and
control the second power source to output a third pulsed DC voltage having a higher voltage than the first pulsed DC voltage in response to the plasma not being ignited with the first pulsed DC voltage, or control the second power source to stop outputting the first pulsed DC voltage in response to the plasma being ignited with the first pulsed DC voltage.

10. The apparatus of claim 1, wherein the controller is further configured to:
monitor, during a fourth time period, whether the plasma is ignited based on the sensing information or not, and
control the second power source to output a fourth pulsed DC voltage having a period shorter than the first pulsed DC voltage if plasma is not ignited with the first pulsed DC voltage, or control the second power source to stop outputting the first pulsed DC voltage if plasma is ignited with the first pulsed DC voltage.

11. A method of controlling a plasma generating apparatus, wherein the plasma generating apparatus comprises:
a chamber providing a generating space for plasma,
a first power source configured to output an RF voltage,
a second power source configured to output a pulsed DC voltage,
an antenna module placed adjacent to the chamber and surrounding an outer surface of a side wall of the chamber and configured to be connected to the first power source such that an induced electric field is generated in the chamber when the RF voltage is supplied to the antenna module from the first power source,
an electrode placed adjacent to the chamber and configured to be connected to the second power source such that electrons are supplied into the chamber when a voltage difference is supplied between the electrode and a counter electrode from the second power source,
a sensor configured to obtain sensing information related to a status of the plasma, and
a controller configured to control the first power source and the second power source,
wherein, for igniting the plasma in the chamber, the method further comprises:
controlling, by the controller, the first power source to output the RF voltage to the antenna module for igniting the plasma without supplying the pulsed DC voltage to the electrode from the second power source,
obtaining, by the controller, the sensing information related to the status of the plasma while maintaining the RF voltage output,
monitoring, during a first time period, by the controller, whether plasma is ignited based on the sensing information or not, and
controlling, by the controller, the second power source to output a first pulsed DC voltage to the electrode for supplying electrons into the chamber while maintaining the RF voltage output for assisting the ignition of plasma in response to the plasma not being ignited with the induced electric field in the chamber, or controlling, by the controller, the second power source not to output the pulsed DC voltage to the electrode in response to the plasma being ignited with the induced electric field in the chamber.

12. The method of claim 11,
wherein the sensing information obtained by the sensor indicates a power supplied to the antenna module via the first power source,
wherein the first power source comprises a DC power source and an inverter configured to convert a DC power from the DC power source into an RF power,
wherein the sensor is placed between the DC power source and the inverter and configured to obtain a first voltage output from the DC power source and a first current output from the DC power source, and
wherein the controlling, by the controller, the second power source comprises controlling the second power source based on a power supplied to the antenna module which is determined based on the first voltage and the first current.

13. The method of claim 11,
wherein the sensor is configured to obtain the sensing information based on a second current which flows through the antenna module,
wherein the controller is configured to determine that the plasma is not ignited with the induced electric field in the chamber in response to a phase difference between the second current and the RF voltage not satisfying a predetermined condition, and
wherein the controller is configured to determine that the plasma is ignited with the induced electric field in the chamber in response to the phase difference between the second current and the RF voltage satisfying the predetermined condition.

14. The method of claim 11,
wherein the controller is further configured to determine that the plasma is not ignited with the induced electric field in the chamber in response to the sensing information obtained during the first time period indicating that a power supplied to the antenna module is more than or equal to a reference power, and
wherein the controller is configured to determine that the plasma is ignited with the induced electric field in the chamber in response to the sensing information obtained during the first time period indicating that a power supplied to the antenna module is less than the reference power.

15. The method of claim 11, wherein the method further comprises:
monitoring, during a second time period, by the controller, whether plasma is ignited based on the sensing information or not, and
controlling the second power source to output a second pulsed DC voltage having a power higher than the first pulsed DC voltage in response to the plasma not being ignited with the first pulsed DC voltage, or controlling the second power source to stop outputting of the first pulsed DC voltage in response to the plasma being ignited with the first pulsed DC voltage.

16. The method of claim 11, wherein the method further comprising:
monitoring, during a third time period, whether the plasma is ignited based on the sensing information or not, and
controlling the second power source to output a third pulsed DC voltage having a higher voltage than the first pulsed DC voltage in response to the plasma not being ignited with the first pulsed DC voltage, or controlling the second power source to stop outputting the first pulsed DC voltage in response to the plasma being ignited with the first pulsed DC voltage.

* * * * *